US008828170B2

(12) United States Patent
Stamatiou et al.

(10) Patent No.: US 8,828,170 B2
(45) Date of Patent: Sep. 9, 2014

(54) APPARATUS AND METHOD FOR MANUFACTURING REINFORCED CONTAINERS

(75) Inventors: Dimitri Stamatiou, Orland Park, IL (US); Shawn L. Petera, Grayslake, IL (US); Evan L. Ryan, Chicago, IL (US)

(73) Assignee: Pactiv LLC, Lake Forest, IL (US)

( * ) Notice: Subject to any disclaimer, the term of this patent is extended or adjusted under 35 U.S.C. 154(b) by 661 days.

(21) Appl. No.: 12/717,728

(22) Filed: Mar. 4, 2010

(65) Prior Publication Data
US 2011/0217492 A1 Sep. 8, 2011

(51) Int. Cl.
B29C 47/06 (2006.01)
C09J 5/00 (2006.01)
B29C 65/00 (2006.01)
B29C 65/10 (2006.01)
B32B 37/00 (2006.01)
B65C 9/18 (2006.01)
B65D 3/00 (2006.01)
B29C 63/04 (2006.01)
B32B 27/10 (2006.01)

(52) U.S. Cl.
CPC ............... *B29C 63/04* (2013.01); *B32B 27/10* (2013.01)
USPC ........... 156/243; 156/311; 156/497; 156/542; 156/499; 229/403; 229/4.5

(58) Field of Classification Search
USPC .......... 156/311, 243, 497, 542, 499; 229/403, 229/4.5
See application file for complete search history.

(56) References Cited

U.S. PATENT DOCUMENTS

| 261,131 A | 7/1882 | Bonshire |
| 496,131 A | 4/1893 | Peirce |
| 1,068,460 A | 7/1913 | Smith |
| 1,209,191 A | 12/1916 | Miller |
| 1,312,611 A | 8/1919 | Chess |
| 1,545,580 A | 7/1925 | Campbell |
| 1,573,826 A | 2/1926 | Hageman |

(Continued)

FOREIGN PATENT DOCUMENTS

| DE | 1786171 | 2/1972 |
| DE | 2330737 | 1/1975 |

(Continued)

OTHER PUBLICATIONS

Quaker® Instant Oatmeal Express container, printed from www.quakeroatmeal.com/qo_ourProducts/oatmealExpress/index.cfm on Sep. 18, 2006 and distributed by the Quaker Oats Company, P.O. Box 049003, Chicago, IL 60604-9003 available prior to May 2005.

(Continued)

*Primary Examiner* — Richard Crispino
*Assistant Examiner* — Matthew Hoover
(74) *Attorney, Agent, or Firm* — Neal, Gerber & Eisenberg LLP

(57) ABSTRACT

Various embodiments of the apparatus and methods are configured to make containers such as disposable reinforced cups using reinforcing members configured to be respectively attached to cups. The apparatus and method of various embodiments of the present disclosure sequentially heat different or selective portions of the heat activated adhesive on the reinforcing member at multiple sequential stages, steps or times to attach the reinforcing member to the container.

38 Claims, 38 Drawing Sheets

(56) References Cited

U.S. PATENT DOCUMENTS

| | | |
|---|---|---|
| 1,617,707 A | 2/1927 | Geer |
| 1,752,705 A | 4/1930 | Smith |
| 1,770,118 A | 7/1930 | Williams |
| 1,976,971 A | 10/1934 | Thom |
| 2,013,616 A | 9/1935 | Rettenmeyer |
| 2,129,364 A | 9/1938 | Simons et al. |
| 2,178,948 A | 11/1939 | Brozek |
| 2,201,207 A | 5/1940 | Schmidt et al. |
| 2,246,426 A | 6/1941 | Wickstrom |
| 2,266,828 A | 12/1941 | Sykes |
| 2,279,724 A | 4/1942 | Von Hofe |
| 2,349,317 A | 5/1944 | Weida |
| 2,385,751 A | 9/1945 | Whipple et al. |
| 2,395,267 A | 2/1946 | Gilbert |
| 2,489,837 A | 11/1949 | Von Hofe |
| 2,524,945 A | 10/1950 | Von Hofe |
| 2,525,741 A | 10/1950 | Von Hofe et al. |
| 2,563,352 A | 8/1951 | Morse |
| 2,569,101 A | 9/1951 | Hoppe |
| 2,613,007 A | 10/1952 | Von Hofe |
| 2,621,823 A | 12/1952 | Perry |
| 2,661,889 A | 12/1953 | Phinney |
| 2,676,726 A | 4/1954 | Von Hofe |
| 2,677,477 A | 5/1954 | Eisengrein et al. |
| 2,685,860 A | 8/1954 | Plakas |
| 2,692,063 A | 10/1954 | Ketchpel |
| 2,709,742 A | 5/1955 | Perry |
| 2,722,332 A | 11/1955 | Carter |
| 2,723,643 A | 11/1955 | Weiss |
| 2,844,893 A | 7/1958 | Keller |
| 2,853,222 A | 9/1958 | Gallagher |
| 2,860,431 A | 11/1958 | Barnum, Jr. |
| 2,917,217 A | 12/1959 | Sisson |
| 2,983,692 A | 5/1961 | D'Alelio |
| 3,023,175 A | 2/1962 | Rodman, Jr. |
| 3,057,125 A | 10/1962 | Jensen et al. |
| 3,082,900 A | 3/1963 | Goodman |
| 3,091,360 A | 5/1963 | Edwards |
| 3,126,139 A | 3/1964 | Schechter |
| 3,139,213 A | 6/1964 | Edwards |
| 3,141,595 A | 7/1964 | Edwards |
| 3,208,631 A | 9/1965 | Edwards |
| 3,232,804 A | 2/1966 | Klopfenstein et al. |
| 3,237,834 A | 3/1966 | Davis et al. |
| 3,262,625 A | 7/1966 | Russell et al. |
| 3,290,198 A | 12/1966 | Lux et al. |
| 3,291,675 A | 12/1966 | Orloff et al. |
| 3,333,515 A | 8/1967 | McGlynn |
| 3,374,922 A | 3/1968 | Shelby |
| 3,410,552 A | 11/1968 | Collier et al. |
| 3,468,467 A | 9/1969 | Amberg |
| 3,471,075 A | 10/1969 | Wolf |
| 3,514,887 A | 6/1970 | Jacob |
| 3,519,165 A | 7/1970 | Hawley |
| 3,574,957 A | 4/1971 | Bello-Bridick |
| 3,580,468 A | 5/1971 | McDevitt |
| 3,591,047 A | 7/1971 | Buhle |
| 3,696,987 A | 10/1972 | Schuff et al. |
| 3,733,002 A | 5/1973 | Fujio |
| 3,754,699 A | 8/1973 | Moore |
| 3,759,437 A | 9/1973 | Amberg |
| 3,766,882 A | 10/1973 | Babbitt, III |
| 3,767,507 A | 10/1973 | Stahlecker et al. |
| 3,769,056 A | 10/1973 | Sincock |
| 3,796,366 A | 3/1974 | Hahn |
| 3,815,898 A | 6/1974 | Haifley et al. |
| 3,860,473 A | 1/1975 | Wesen |
| 3,869,330 A | 3/1975 | Anderson et al. |
| 3,897,899 A | 8/1975 | Schuff et al. |
| 3,908,523 A | 9/1975 | Shikaya |
| 3,908,877 A | 9/1975 | Kosisky |
| 3,919,368 A | 11/1975 | Seto |
| 3,930,917 A | 1/1976 | Esakov et al. |
| 3,951,266 A | 4/1976 | Brewer |
| 3,955,020 A | 5/1976 | Cavanagh et al. |
| 3,959,189 A | 5/1976 | Kitamori |
| 3,983,392 A | 9/1976 | Armstrong |
| 3,984,511 A | 10/1976 | Lammers |
| 3,988,521 A | 10/1976 | Fumel et al. |
| 4,007,670 A | 2/1977 | Albano et al. |
| 4,008,347 A | 2/1977 | Amberg et al. |
| 4,016,327 A | 4/1977 | Fumei et al. |
| 4,021,286 A | 5/1977 | Amberg |
| 4,024,951 A | 5/1977 | Green |
| 4,035,222 A | 7/1977 | Amberg |
| 4,039,098 A | 8/1977 | Stilts |
| 4,040,537 A | 8/1977 | Edwards |
| 4,052,161 A | 10/1977 | Atwood et al. |
| 4,073,231 A | 2/1978 | Roser |
| 4,088,250 A | 5/1978 | Schaefer |
| 4,097,325 A | 6/1978 | Schnier |
| 4,121,956 A | 10/1978 | Sample |
| 4,130,234 A | 12/1978 | Schmidt |
| 4,134,492 A | 1/1979 | Lucas |
| 4,168,353 A | 9/1979 | Kitamori |
| 4,187,276 A | 2/1980 | Amberg |
| 4,190,187 A | 2/1980 | Nelms |
| 4,193,494 A | 3/1980 | Green |
| 4,203,240 A | 5/1980 | Goodwin |
| 4,206,249 A | 6/1980 | Suzuki et al. |
| 4,206,845 A | 6/1980 | Christian |
| 4,238,033 A | 12/1980 | Artzt |
| 4,238,267 A | 12/1980 | Konstantin |
| 4,261,501 A | 4/1981 | Watkins et al. |
| 4,264,657 A | 4/1981 | Tollette |
| 4,268,567 A | 5/1981 | Harmony |
| 4,273,816 A | 6/1981 | Tollette |
| 4,288,026 A | 9/1981 | Wilhelm |
| 4,303,756 A | 12/1981 | Kajimura et al. |
| 4,303,757 A | 12/1981 | Kajimura et al. |
| 4,325,058 A | 4/1982 | Wagner et al. |
| 4,332,635 A | 6/1982 | Holbrook et al. |
| 4,347,934 A | 9/1982 | Goodman |
| 4,359,160 A | 11/1982 | Myers et al. |
| 4,368,818 A | 1/1983 | Day |
| 4,383,422 A | 5/1983 | Gordon et al. |
| 4,394,917 A | 7/1983 | Looser |
| 4,398,650 A | 8/1983 | Holmes et al. |
| 4,405,045 A | 9/1983 | Villa-Real |
| 4,405,401 A | 9/1983 | Stahl |
| 4,409,045 A | 10/1983 | Busse |
| 4,414,055 A | 11/1983 | Young |
| 4,427,744 A | 1/1984 | Hume, III |
| D272,794 S | 2/1984 | Dart |
| 4,435,344 A | 3/1984 | Iioka |
| 4,468,274 A | 8/1984 | Adachi |
| 4,479,770 A | 10/1984 | Slat et al. |
| 4,486,366 A | 12/1984 | Reddy |
| 4,500,386 A | 2/1985 | Hoffman |
| 4,518,639 A | 5/1985 | Phillips |
| 4,519,428 A | 5/1985 | Moody |
| 4,528,221 A | 7/1985 | Komatsuzaki et al. |
| 4,534,391 A | 8/1985 | Ventimiglia et al. |
| 4,546,911 A | 10/1985 | Clauss |
| 4,551,366 A | 11/1985 | Maruhashi et al. |
| 4,567,681 A | 2/1986 | Fumei |
| 4,574,020 A | 3/1986 | Fosnaught |
| 4,592,884 A | 6/1986 | Thomson |
| 4,602,977 A | 7/1986 | Voltmer et al. |
| 4,626,455 A | 12/1986 | Karabedian |
| 4,627,219 A | 12/1986 | Omori |
| 4,639,207 A | 1/1987 | Slat et al. |
| D289,483 S | 4/1987 | Wetter |
| D289,499 S | 4/1987 | Drummond et al. |
| 4,658,974 A | 4/1987 | Fujita |
| 4,661,188 A | 4/1987 | Fumei |
| 4,662,965 A | 5/1987 | DiFrank et al. |
| D291,040 S | 7/1987 | Dart |
| 4,679,724 A | 7/1987 | Inagaki |
| 4,680,000 A | 7/1987 | Nowicki et al. |
| 4,684,036 A | 8/1987 | Brewer |
| 4,685,583 A | 8/1987 | Noon |
| 4,707,211 A | 11/1987 | Shibata |
| 4,709,800 A | 12/1987 | Olsen |

(56) References Cited

U.S. PATENT DOCUMENTS

| | | |
|---|---|---|
| 4,715,527 A | 12/1987 | Tsuzuki et al. |
| 4,724,029 A | 2/1988 | Kontz |
| 4,726,493 A | 2/1988 | Wallace et al. |
| 4,727,667 A | 3/1988 | Ingle |
| 4,731,147 A | 3/1988 | Mohn |
| 4,737,209 A | 4/1988 | Tomashauser et al. |
| 4,743,469 A | 5/1988 | Lehmann |
| 4,747,509 A | 5/1988 | Florkiewicz et al. |
| 4,753,365 A | 6/1988 | Seppala |
| 4,793,891 A | 12/1988 | Freeman et al. |
| 4,801,017 A | 1/1989 | Artusi |
| 4,806,197 A | 2/1989 | Harvey |
| 4,818,461 A | 4/1989 | Batson et al. |
| 4,832,774 A | 5/1989 | DiFrank et al. |
| 4,832,775 A | 5/1989 | Park et al. |
| 4,832,783 A | 5/1989 | Nechay et al. |
| 4,834,641 A | 5/1989 | Keyser |
| 4,877,119 A | 10/1989 | Hosking |
| 4,877,391 A | 10/1989 | Batson et al. |
| 4,878,970 A | 11/1989 | Schubert et al. |
| 4,909,394 A | 3/1990 | Stewart |
| 4,909,723 A | 3/1990 | Slat et al. |
| 4,911,285 A | 3/1990 | Rogall et al. |
| 4,913,692 A | 4/1990 | Miller |
| 4,944,825 A | 7/1990 | Gifford et al. |
| 4,944,830 A | 7/1990 | Zodrow et al. |
| 4,973,241 A | 11/1990 | Keyser |
| 4,973,374 A | 11/1990 | Karlyn |
| 4,976,803 A | 12/1990 | Tomashauer et al. |
| 4,981,547 A | 1/1991 | Zodrow et al. |
| 4,982,872 A | 1/1991 | Avery |
| 4,983,238 A | 1/1991 | Yoshida et al. |
| 4,993,580 A | 2/1991 | Smith |
| 4,994,135 A | 2/1991 | Orlandi |
| 5,004,518 A | 4/1991 | Zodrow |
| 5,007,578 A | 4/1991 | Simone |
| 5,017,261 A | 5/1991 | Zodrow et al. |
| 5,021,116 A | 6/1991 | Milgram, Jr. et al. |
| 5,022,235 A | 6/1991 | Grissom |
| 5,025,981 A | 6/1991 | Schellenberg |
| 5,037,499 A | 8/1991 | Bright et al. |
| 5,043,130 A | 8/1991 | Fujio |
| 5,044,922 A | 9/1991 | Plenzler et al. |
| 5,045,255 A | 9/1991 | Kurz |
| 5,062,917 A | 11/1991 | Zodrow |
| 5,062,918 A | 11/1991 | Zodrow |
| 5,076,613 A | 12/1991 | Kovacs |
| 5,078,826 A | 1/1992 | Rogall |
| 5,082,520 A | 1/1992 | West et al. |
| 5,087,317 A | 2/1992 | Rogall |
| 5,092,485 A | 3/1992 | Lee |
| 5,104,306 A | 4/1992 | Gordon et al. |
| 5,110,402 A | 5/1992 | Zodrow et al. |
| 5,120,392 A | 6/1992 | Butkevich et al. |
| 5,121,827 A | 6/1992 | Ribordy |
| 5,129,984 A | 7/1992 | Tomashauer et al. |
| 5,145,107 A | 9/1992 | Silver et al. |
| 5,154,448 A | 10/1992 | Griffin et al. |
| 5,160,570 A | 11/1992 | Dickey |
| 5,163,608 A | 11/1992 | Block |
| 5,167,755 A | 12/1992 | Zodrow et al. |
| 5,174,851 A | 12/1992 | Zodrow et al. |
| 5,185,053 A | 2/1993 | Tomashauer et al. |
| 5,186,350 A | 2/1993 | McBride |
| 5,188,696 A | 2/1993 | Good, Jr. |
| 5,188,775 A | 2/1993 | Hornback et al. |
| 5,191,979 A | 3/1993 | Nemeroff |
| 5,201,984 A | 4/1993 | Bedin |
| 5,203,490 A | 4/1993 | Roe |
| 5,205,473 A | 4/1993 | Coffin, Sr. |
| 5,213,858 A | 5/1993 | Tanner et al. |
| 5,217,538 A | 6/1993 | Buchholz et al. |
| 5,223,315 A | 6/1993 | Katsura et al. |
| 5,226,585 A | 7/1993 | Varano |
| 5,227,005 A | 7/1993 | Zodrow et al. |
| 5,244,861 A | 9/1993 | Campbell et al. |
| 5,259,529 A | 11/1993 | Coale |
| 5,266,149 A | 11/1993 | Collette et al. |
| 5,271,783 A | 12/1993 | Potter |
| 5,301,802 A | 4/1994 | Nemeroff |
| 5,308,693 A | 5/1994 | Ryle et al. |
| 5,316,777 A | 5/1994 | Toyoda et al. |
| 5,322,380 A | 6/1994 | Crocker |
| 5,324,153 A | 6/1994 | Chess |
| 5,362,436 A | 11/1994 | Wagner |
| 5,363,982 A | 11/1994 | Sadlier |
| 5,384,174 A | 1/1995 | Ward et al. |
| 5,385,260 A | 1/1995 | Gatcomb |
| 5,385,764 A | 1/1995 | Andersen et al. |
| 5,405,667 A | 4/1995 | Heider |
| 5,454,484 A | 10/1995 | Chelossi |
| 5,458,714 A | 10/1995 | Brandt et al. |
| 5,460,323 A | 10/1995 | Titus |
| 5,467,891 A | 11/1995 | Perry |
| 5,470,420 A | 11/1995 | Yokajty |
| 5,478,422 A | 12/1995 | Bright et al. |
| 5,486,253 A | 1/1996 | Otruba |
| 5,490,631 A | 2/1996 | Iioka et al. |
| 5,512,120 A | 4/1996 | Hinton et al. |
| 5,524,817 A | 6/1996 | Meier et al. |
| 5,538,575 A | 7/1996 | Hinton |
| 5,542,599 A | 8/1996 | Sobol |
| 5,547,124 A | 8/1996 | Mueller |
| 5,569,353 A | 10/1996 | Zodrow |
| 5,580,409 A | 12/1996 | Andersen et al. |
| 5,580,624 A | 12/1996 | Andersen et al. |
| 5,586,087 A | 12/1996 | Silverson |
| 5,605,597 A | 2/1997 | Plenzler |
| 5,628,453 A | 5/1997 | MacLaughlin |
| D381,558 S | 7/1997 | Schaefer et al. |
| 5,647,188 A | 7/1997 | Weder et al. |
| 5,650,028 A | 7/1997 | Brandt et al. |
| 5,651,233 A | 7/1997 | Weder et al. |
| 5,655,353 A | 8/1997 | Weder et al. |
| 5,660,326 A | 8/1997 | Varano et al. |
| D383,942 S | 9/1997 | Rench et al. |
| 5,665,439 A | 9/1997 | Andersen et al. |
| 5,685,480 A | 11/1997 | Choi |
| 5,697,550 A | 12/1997 | Varano et al. |
| 5,702,559 A | 12/1997 | Bright |
| 5,705,237 A | 1/1998 | Andersen et al. |
| 5,705,242 A | 1/1998 | Andersen et al. |
| 5,706,948 A | 1/1998 | Hughes |
| 5,713,403 A | 2/1998 | Clüsserath et al. |
| 5,713,512 A | 2/1998 | Barrett |
| 5,725,916 A | 3/1998 | Ishii et al. |
| 5,735,996 A | 4/1998 | Asghar et al. |
| 5,749,990 A | 5/1998 | Rello et al. |
| 5,752,653 A | 5/1998 | Razzaghi |
| 5,753,308 A | 5/1998 | Andersen et al. |
| RE35,830 E | 6/1998 | Sadlier |
| 5,759,624 A | 6/1998 | Neale et al. |
| 5,762,379 A | 6/1998 | Salmon et al. |
| 5,765,716 A | 6/1998 | Cai et al. |
| 5,766,401 A | 6/1998 | Campbell et al. |
| 5,766,709 A | 6/1998 | Geddes et al. |
| 5,769,311 A | 6/1998 | Morita et al. |
| 5,775,577 A | 7/1998 | Titus |
| 5,779,835 A | 7/1998 | Rello et al. |
| 5,792,296 A | 8/1998 | Soltysiak |
| 5,792,536 A | 8/1998 | Whipp |
| 5,800,656 A | 9/1998 | Geurtsen et al. |
| 5,805,969 A | 9/1998 | Elsermans et al. |
| 5,808,681 A | 9/1998 | Kitajima |
| 5,809,674 A | 9/1998 | Key |
| 5,820,016 A | 10/1998 | Stropkay |
| 5,824,176 A | 10/1998 | Stein et al. |
| 5,839,581 A | 11/1998 | Vagedes |
| 5,840,139 A | 11/1998 | Geddes et al. |
| 5,842,633 A | 12/1998 | Nurse |
| 5,846,358 A | 12/1998 | Nagamoto et al. |
| 5,853,965 A | 12/1998 | Haydock et al. |
| 5,855,710 A | 1/1999 | Hinton |
| 5,857,615 A | 1/1999 | Rose |

(56) References Cited

U.S. PATENT DOCUMENTS

| | | |
|---|---|---|
| 5,862,977 A | 1/1999 | Hirano |
| 5,866,282 A | 2/1999 | Bourdelais et al. |
| 5,868,310 A | 2/1999 | Leszczynski |
| 5,871,430 A | 2/1999 | Mueller |
| 5,874,205 A | 2/1999 | Bourdelais et al. |
| 5,879,496 A | 3/1999 | Bright et al. |
| 5,882,474 A | 3/1999 | Gomes et al. |
| 5,884,421 A | 3/1999 | Key |
| 5,888,643 A | 3/1999 | Aylward et al. |
| 5,888,683 A | 3/1999 | Gula et al. |
| 5,888,714 A | 3/1999 | Bourdelais et al. |
| 5,895,552 A | 4/1999 | Matsuguchi |
| 5,897,722 A | 4/1999 | Bright |
| 5,908,590 A | 6/1999 | Yoshimi et al. |
| 5,908,694 A | 6/1999 | Makar et al. |
| 5,911,904 A | 6/1999 | Shih et al. |
| 5,934,501 A | 8/1999 | Wright et al. |
| 5,940,009 A | 8/1999 | Loy et al. |
| 5,950,917 A | 9/1999 | Smith |
| 5,952,068 A | 9/1999 | Neale et al. |
| 5,964,400 A | 10/1999 | Varano et al. |
| 5,968,616 A | 10/1999 | Kakemura et al. |
| 5,974,843 A | 11/1999 | Burkholder |
| 5,975,336 A | 11/1999 | Hart |
| 5,976,655 A | 11/1999 | Sykes |
| 5,993,705 A | 11/1999 | Grishchenko et al. |
| 5,996,887 A | 12/1999 | Cai et al. |
| 6,007,759 A | 12/1999 | Ten Tje et al. |
| 6,022,570 A | 2/2000 | Richmond |
| 6,030,476 A | 2/2000 | Geddes et al. |
| 6,031,553 A | 2/2000 | Nagamoto et al. |
| 6,032,826 A | 3/2000 | Libit et al. |
| 6,039,682 A | 3/2000 | Dees et al. |
| 6,042,676 A | 3/2000 | Stein |
| 6,042,930 A | 3/2000 | Kelch et al. |
| 6,050,319 A | 4/2000 | Hinton |
| 6,053,352 A | 4/2000 | Cai |
| 6,054,006 A | 4/2000 | Pilon et al. |
| 6,058,985 A | 5/2000 | Petri et al. |
| 6,063,564 A | 5/2000 | Ishikawa et al. |
| 6,066,375 A | 5/2000 | Shanton |
| 6,066,594 A | 5/2000 | Gunn et al. |
| 6,068,182 A | 5/2000 | Tokunaga |
| 6,083,620 A | 7/2000 | Laprade et al. |
| 6,085,970 A | 7/2000 | Sadlier |
| 6,089,180 A | 7/2000 | Nichols, Jr. |
| D429,446 S | 8/2000 | Toussant et al. |
| 6,096,408 A | 8/2000 | Laprade et al. |
| 6,109,518 A | 8/2000 | Mueller et al. |
| 6,116,503 A | 9/2000 | Varano |
| 6,126,584 A | 10/2000 | Zadravetz |
| 6,127,439 A | 10/2000 | Berghmans et al. |
| 6,129,653 A | 10/2000 | Fredricks et al. |
| 6,136,396 A | 10/2000 | Gilmer |
| 6,138,862 A | 10/2000 | Tai |
| 6,139,665 A | 10/2000 | Schmelzer et al. |
| 6,140,614 A | 10/2000 | Padamsee |
| 6,142,331 A | 11/2000 | Breining et al. |
| 6,152,363 A | 11/2000 | Rule, Jr. |
| 6,160,027 A | 12/2000 | Crevecoeur et al. |
| D436,295 S | 1/2001 | Furman et al. |
| 6,167,935 B1 | 1/2001 | Heider et al. |
| 6,186,394 B1 | 2/2001 | Dees et al. |
| 6,193,098 B1 | 2/2001 | Mochizuki et al. |
| D439,472 S | 3/2001 | Wang |
| 6,196,454 B1 | 3/2001 | Sadlier |
| 6,212,803 B1 | 4/2001 | Key |
| 6,213,309 B1 | 4/2001 | Dadisho |
| 6,224,954 B1 | 5/2001 | Mitchell et al. |
| 6,235,345 B1 | 5/2001 | Williamson et al. |
| 6,242,540 B1 | 6/2001 | Crevecoeur et al. |
| 6,253,995 B1 | 7/2001 | Blok et al. |
| 6,257,485 B1 | 7/2001 | Sadlier et al. |
| 6,260,756 B1 | 7/2001 | Mochizuki et al. |
| 6,267,837 B1 | 7/2001 | Mitchell et al. |
| D446,687 S | 8/2001 | Furman et al. |
| 6,277,454 B1 | 8/2001 | Neale et al. |
| 6,286,709 B1 | 9/2001 | Hudson |
| 6,286,754 B1 | 9/2001 | Stier et al. |
| 6,287,247 B1 | 9/2001 | Dees et al. |
| 6,298,894 B1 | 10/2001 | Nagamoto et al. |
| 6,302,994 B1 | 10/2001 | Kamiya et al. |
| 6,308,883 B1 | 10/2001 | Schmelzer et al. |
| 6,319,590 B1 | 11/2001 | Geddes et al. |
| 6,325,879 B1 | 12/2001 | Heckman et al. |
| 6,328,557 B1 | 12/2001 | Grishchenko et al. |
| 6,341,471 B2 | 1/2002 | Weder et al. |
| 6,344,269 B1 | 2/2002 | Makar et al. |
| 6,364,149 B1 | 4/2002 | Smith |
| 6,364,201 B1 | 4/2002 | Varano |
| 6,378,590 B1 | 4/2002 | Allen et al. |
| 6,378,766 B2 | 4/2002 | Sadlier |
| 6,379,761 B1 | 4/2002 | Brandt et al. |
| 6,386,756 B1 | 5/2002 | Rice |
| 6,401,787 B1 | 6/2002 | Tsutsumi et al. |
| 6,416,829 B2 | 7/2002 | Breining et al. |
| 6,422,456 B1 | 7/2002 | Sadlier |
| 6,423,169 B1 | 7/2002 | Cobb |
| 6,423,406 B1 | 7/2002 | Bilodeau |
| 6,439,368 B1 | 8/2002 | Kortge |
| 6,467,620 B1 | 10/2002 | Heckman et al. |
| 6,471,802 B1 | 10/2002 | Williamson |
| 6,474,390 B1 | 11/2002 | Vandevoorde |
| 6,474,499 B2 | 11/2002 | Donelson et al. |
| 6,482,481 B1 | 11/2002 | Fredricks et al. |
| 6,485,803 B1 | 11/2002 | Bright |
| 6,488,066 B1 | 12/2002 | Frey |
| 6,488,794 B1 | 12/2002 | Bright et al. |
| 6,491,214 B2 | 12/2002 | Plummer et al. |
| 6,508,902 B2 | 1/2003 | Lind |
| 6,516,548 B2 | 2/2003 | Lage et al. |
| 6,536,657 B2 | 3/2003 | Van Handed |
| 6,546,958 B1 | 4/2003 | Parker et al. |
| 6,554,154 B1 | 4/2003 | Chauhan et al. |
| 6,565,934 B1 | 5/2003 | Fredricks et al. |
| 6,572,016 B2 | 6/2003 | Saveliev et al. |
| D477,751 S | 7/2003 | Chuang |
| 6,586,075 B1 | 7/2003 | Mitchell et al. |
| 6,601,728 B1 | 8/2003 | Newkirk et al. |
| 6,607,800 B1 | 8/2003 | Brandt et al. |
| 6,620,281 B1 | 9/2003 | Sommers |
| 6,622,878 B1 | 9/2003 | Frey |
| 6,644,846 B2 | 11/2003 | Willat |
| 6,648,217 B2 | 11/2003 | Schein |
| 6,652,936 B1 | 11/2003 | Bright et al. |
| 6,663,926 B1 | 12/2003 | Okushita et al. |
| 6,663,927 B2 | 12/2003 | Breining et al. |
| 6,676,585 B1 | 1/2004 | Stahlecker et al. |
| 6,676,586 B2 | 1/2004 | Breining et al. |
| 6,703,090 B2 | 3/2004 | Breining et al. |
| 6,729,534 B2 | 5/2004 | Van Handed |
| 6,731,319 B2 | 5/2004 | Ichikawa et al. |
| 6,740,373 B1 | 5/2004 | Swoboda et al. |
| 6,811,843 B2 | 11/2004 | DeBraal et al. |
| 6,814,253 B2 | 11/2004 | Wong |
| D500,343 S | 12/2004 | McRobbie |
| 6,844,041 B2 | 1/2005 | Squier et al. |
| 6,844,079 B2 | 1/2005 | Holzer et al. |
| 6,849,147 B2 | 2/2005 | Havard et al. |
| 6,852,381 B2 | 2/2005 | Debraal et al. |
| 6,877,504 B2 | 4/2005 | Schreff et al. |
| 6,889,483 B2 | 5/2005 | Compton et al. |
| 6,893,717 B1 | 5/2005 | Tsai et al. |
| 6,902,641 B1 | 6/2005 | Patel et al. |
| 6,908,949 B2 | 6/2005 | Arch et al. |
| 6,919,111 B2 | 7/2005 | Swoboda et al. |
| 6,926,197 B2 | 8/2005 | Hed et al. |
| 6,971,219 B2 | 12/2005 | Krämer et al. |
| 7,021,594 B2 | 4/2006 | Exler |
| 7,081,286 B2 | 7/2006 | Benim et al. |
| 7,108,906 B2 | 9/2006 | Benim et al. |
| D531,854 S | 11/2006 | Bresler |
| 7,144,542 B2 | 12/2006 | Holzer et al. |
| 7,175,585 B2 | 2/2007 | Okushita et al. |

(56) References Cited

U.S. PATENT DOCUMENTS

| | | |
|---|---|---|
| D537,677 S | 3/2007 | Bresler |
| D537,748 S | 3/2007 | Bulgari |
| 7,387,698 B2 | 6/2008 | Hoogland |
| 7,478,514 B2 | 1/2009 | Wenz |
| 7,481,356 B2 | 1/2009 | Stahlecker |
| 7,536,767 B2 | 5/2009 | Hollis et al. |
| 7,549,273 B2 | 6/2009 | Dart et al. |
| 7,552,841 B2 | 6/2009 | Hollis et al. |
| 7,677,435 B2 | 3/2010 | Stahlecker |
| 7,694,843 B2 | 4/2010 | Hollis et al. |
| 7,704,347 B2 | 4/2010 | Hollis et al. |
| 7,856,793 B2 | 12/2010 | Dart et al. |
| 2001/0013391 A1 | 8/2001 | Amrine |
| 2001/0013537 A1 | 8/2001 | Sadlier |
| 2001/0038014 A1 | 11/2001 | Donelson et al. |
| 2001/0042729 A1 | 11/2001 | Gale |
| 2001/0050287 A1 | 12/2001 | Namba et al. |
| 2002/0041046 A1 | 4/2002 | Hartjes et al. |
| 2002/0043555 A1 | 4/2002 | Mader |
| 2002/0088550 A1* | 7/2002 | Allen et al. .................. 156/497 |
| 2002/0121456 A1 | 9/2002 | Mannion et al. |
| 2002/0134831 A1 | 9/2002 | Saveliev et al. |
| 2002/0144769 A1 | 10/2002 | DeBraal et al. |
| 2002/0148832 A1 | 10/2002 | Breining et al. |
| 2002/0172784 A1 | 11/2002 | DeBraal et al. |
| 2002/0172818 A1 | 11/2002 | DeBraal et al. |
| 2002/0182347 A1 | 12/2002 | DeBraal et al. |
| 2003/0003249 A1 | 1/2003 | Benim et al. |
| 2003/0003251 A1 | 1/2003 | DeBraal et al. |
| 2003/0015582 A1 | 1/2003 | Handel |
| 2003/0021921 A1 | 1/2003 | DeBraal et al. |
| 2003/0041489 A1 | 3/2003 | Murphy et al. |
| 2003/0108696 A1 | 6/2003 | Frisk et al. |
| 2003/0116576 A1 | 6/2003 | Lang-Boecker |
| 2003/0121963 A1 | 7/2003 | Van Handel |
| 2003/0134061 A1 | 7/2003 | Benim et al. |
| 2003/0134073 A1 | 7/2003 | Sellars |
| 2003/0146533 A1 | 8/2003 | Gomell |
| 2003/0146549 A1 | 8/2003 | Dunlap et al. |
| 2003/0157224 A1 | 8/2003 | Westerhof et al. |
| 2003/0207059 A1 | 11/2003 | Benim et al. |
| 2003/0228336 A1 | 12/2003 | Gervasio |
| 2003/0234255 A1 | 12/2003 | Hagopian et al. |
| 2004/0013830 A1 | 1/2004 | Nonomura et al. |
| 2004/0015582 A1 | 1/2004 | Pruthi |
| 2004/0037980 A1 | 2/2004 | DeBraal |
| 2004/0055189 A1 | 3/2004 | Giraud |
| 2004/0060212 A1 | 4/2004 | Murphy et al. |
| 2004/0060840 A1 | 4/2004 | Williams et al. |
| 2004/0064983 A1 | 4/2004 | Joseph |
| 2004/0070222 A1 | 4/2004 | Wong |
| 2004/0096601 A1 | 5/2004 | Raymond |
| 2004/0112949 A1 | 6/2004 | Hed et al. |
| 2004/0121101 A1 | 6/2004 | Tang et al. |
| 2004/0123955 A1* | 7/2004 | Kramer et al. ................ 156/564 |
| 2004/0185235 A1 | 9/2004 | Emery et al. |
| 2004/0197524 A1 | 10/2004 | Rochford et al. |
| 2004/0238989 A1 | 12/2004 | DeBraal et al. |
| 2004/0244242 A1 | 12/2004 | Maliner et al. |
| 2005/0003122 A1 | 1/2005 | DeBraal et al. |
| 2005/0024858 A1 | 2/2005 | Johnson |
| 2005/0227029 A1 | 10/2005 | Dart et al. |
| 2005/0236468 A1 | 10/2005 | Sadlier |
| 2006/0005917 A1 | 1/2006 | Alvarez |
| 2006/0038001 A1 | 2/2006 | Stepanek, Jr. |
| 2006/0124718 A1 | 6/2006 | Matty |
| 2006/0131316 A1 | 6/2006 | Bresler |
| 2006/0131317 A1 | 6/2006 | Bresler |
| 2006/0144915 A1* | 7/2006 | Sadlier .......................... 229/403 |
| 2006/0177410 A1 | 8/2006 | Gervasio |
| 2006/0177411 A1 | 8/2006 | Gervasio |
| 2006/0189030 A1 | 8/2006 | Chambers et al. |
| 2006/0281618 A1 | 12/2006 | Hollis et al. |
| 2006/0281619 A1* | 12/2006 | Hollis et al. .................. 493/155 |
| 2006/0283855 A1 | 12/2006 | Hollis et al. |
| 2007/0006962 A1 | 1/2007 | Hollis et al. |
| 2007/0042144 A1 | 2/2007 | Teensma et al. |
| 2007/0107187 A1 | 5/2007 | Hollis et al. |
| 2007/0235140 A1 | 10/2007 | Schuler et al. |
| 2008/0020156 A1 | 1/2008 | Teensma et al. |
| 2008/0178988 A1 | 7/2008 | Ambartsoumian |
| 2008/0280743 A1 | 11/2008 | Stahlecker et al. |
| 2008/0311331 A1 | 12/2008 | Laprade et al. |
| 2009/0095372 A1 | 4/2009 | Deckert et al. |
| 2009/0095648 A1 | 4/2009 | Junkins |
| 2009/0145550 A1 | 6/2009 | Dellevigne et al. |
| 2009/0162588 A1 | 6/2009 | Palmer et al. |
| 2010/0154983 A1 | 6/2010 | Messerschmid |
| 2010/0160130 A1 | 6/2010 | Messerschmid |

FOREIGN PATENT DOCUMENTS

| | | |
|---|---|---|
| DE | 4409952 | 2/1995 |
| DE | 29611301 | 8/1996 |
| EM | 1065040 | 1/2001 |
| EP | 0254446 | 1/1988 |
| EP | 0395585 | 10/1990 |
| EP | 0511562 | 11/1992 |
| EP | 1155971 | 11/2001 |
| FR | 993163 | 10/1951 |
| FR | 2206240 | 6/1974 |
| FR | 2229612 | 12/1974 |
| FR | 2397987 | 2/1979 |
| FR | 2481229 | 10/1981 |
| GB | 666115 | 2/1952 |
| GB | 865024 | 4/1961 |
| GB | 865025 | 4/1961 |
| GB | 866801 | 5/1961 |
| GB | 1291371 | 10/1972 |
| GB | 1351099 | 4/1974 |
| GB | 1391371 | 4/1975 |
| GB | 1441666 | 7/1976 |
| GB | 1545578 | 5/1979 |
| GB | 1545579 | 5/1979 |
| GB | 1575806 | 10/1980 |
| GB | 2130471 | 6/1984 |
| GB | 21725880 | 10/1986 |
| GB | 2352612 | 2/2001 |
| GB | 2363776 | 1/2002 |
| JP | 52148384 | 12/1977 |
| JP | 11179810 | 7/1999 |
| WO | WO9013708 | 11/1990 |
| WO | WO9404330 | 3/1994 |
| WO | WO9507648 | 3/1995 |
| WO | WO9515849 | 6/1995 |
| WO | WO9707034 | 2/1997 |
| WO | WO0037322 | 6/2000 |
| WO | WO0117893 | 3/2001 |
| WO | WO0185420 | 11/2001 |
| WO | WO0185421 | 11/2001 |
| WO | WO2004058490 | 7/2004 |
| WO | WO2006033036 | 6/2006 |
| WO | WO2006065849 | 6/2006 |

OTHER PUBLICATIONS

Insulair Cup Brochure, printed from www.insulair.com on Apr. 5, 2006, available prior to May 2005.

KL 2090/60 Label Operation Manual, written by KHS, published in 2004.

KL 2090/60 Label Operation Manual—Encode Disassembly and Maintenance, written by KHS, published in 2004.

Applied Plastic Label—Training Manual, written by KHS, available prior to May 2005.

KHS-APL Maintenance Change Out Procedures, written by KHS, available prior to May 2005.

\* cited by examiner

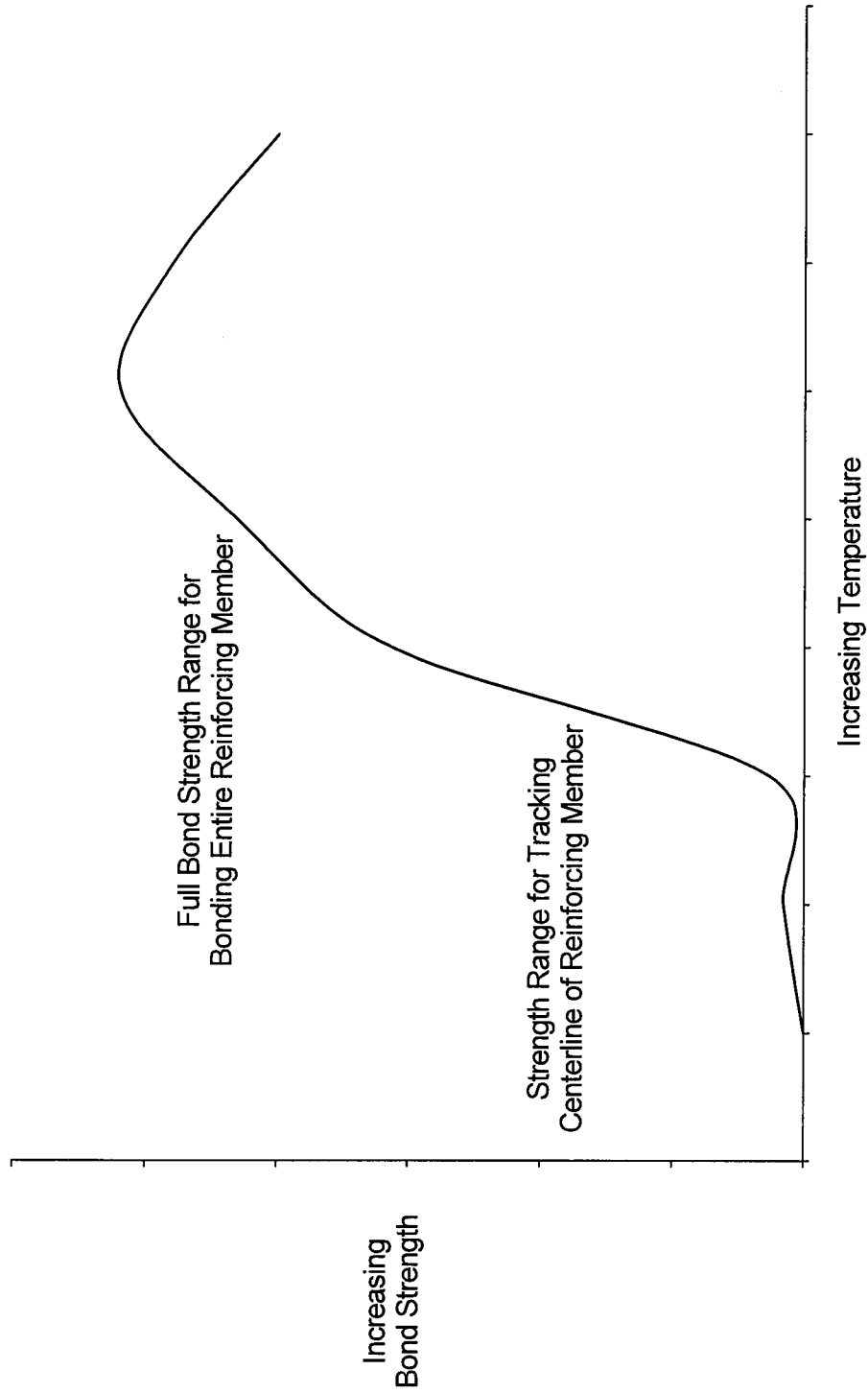

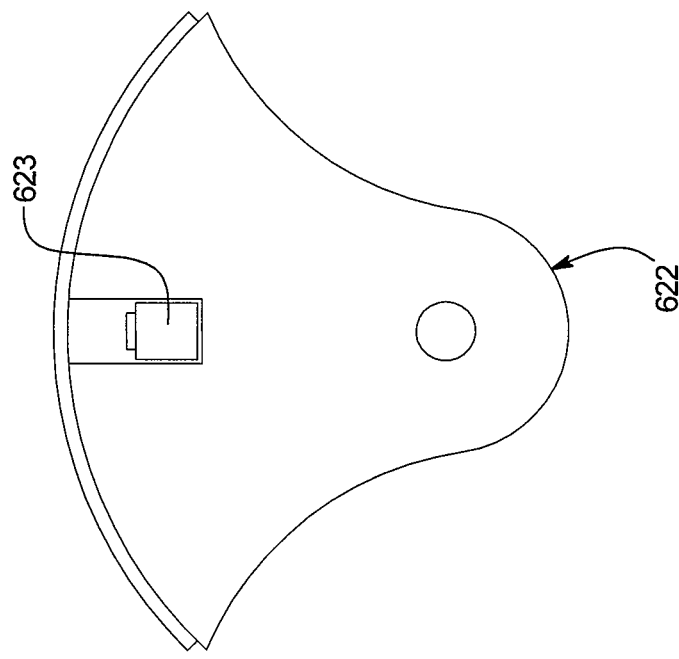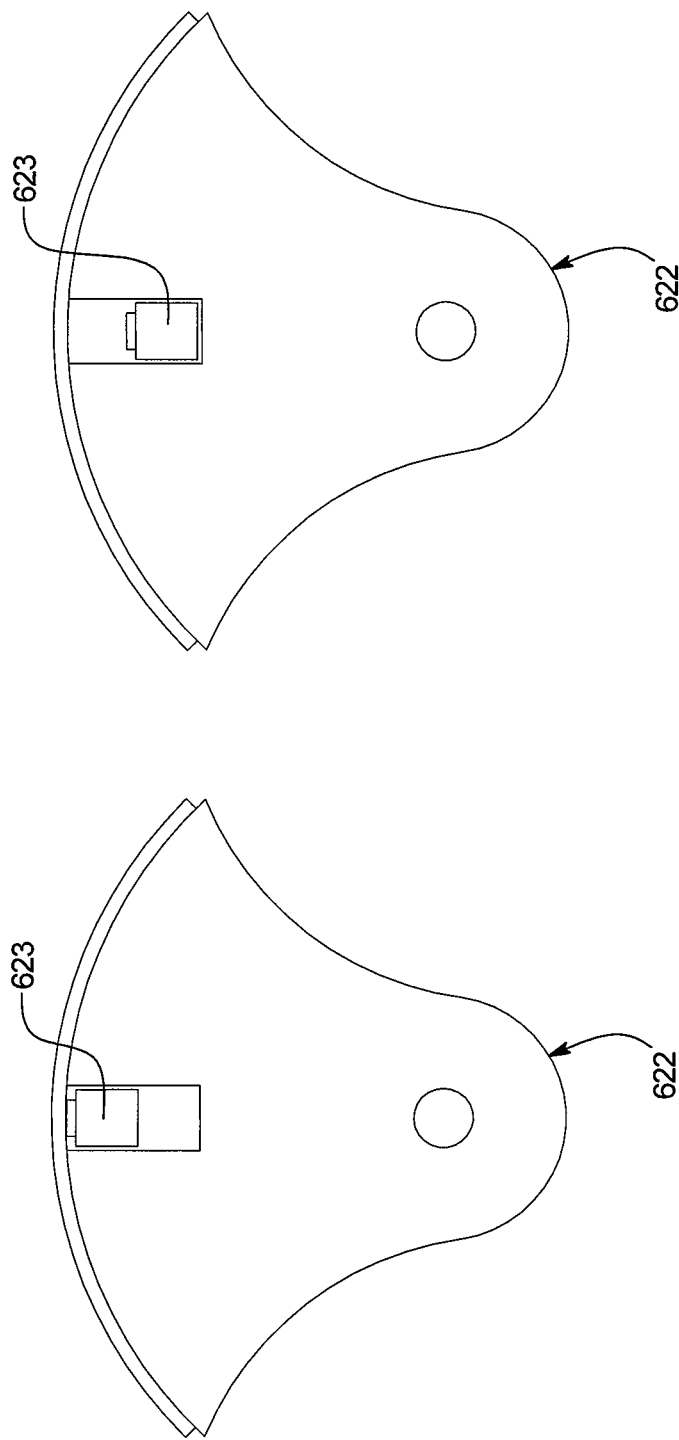

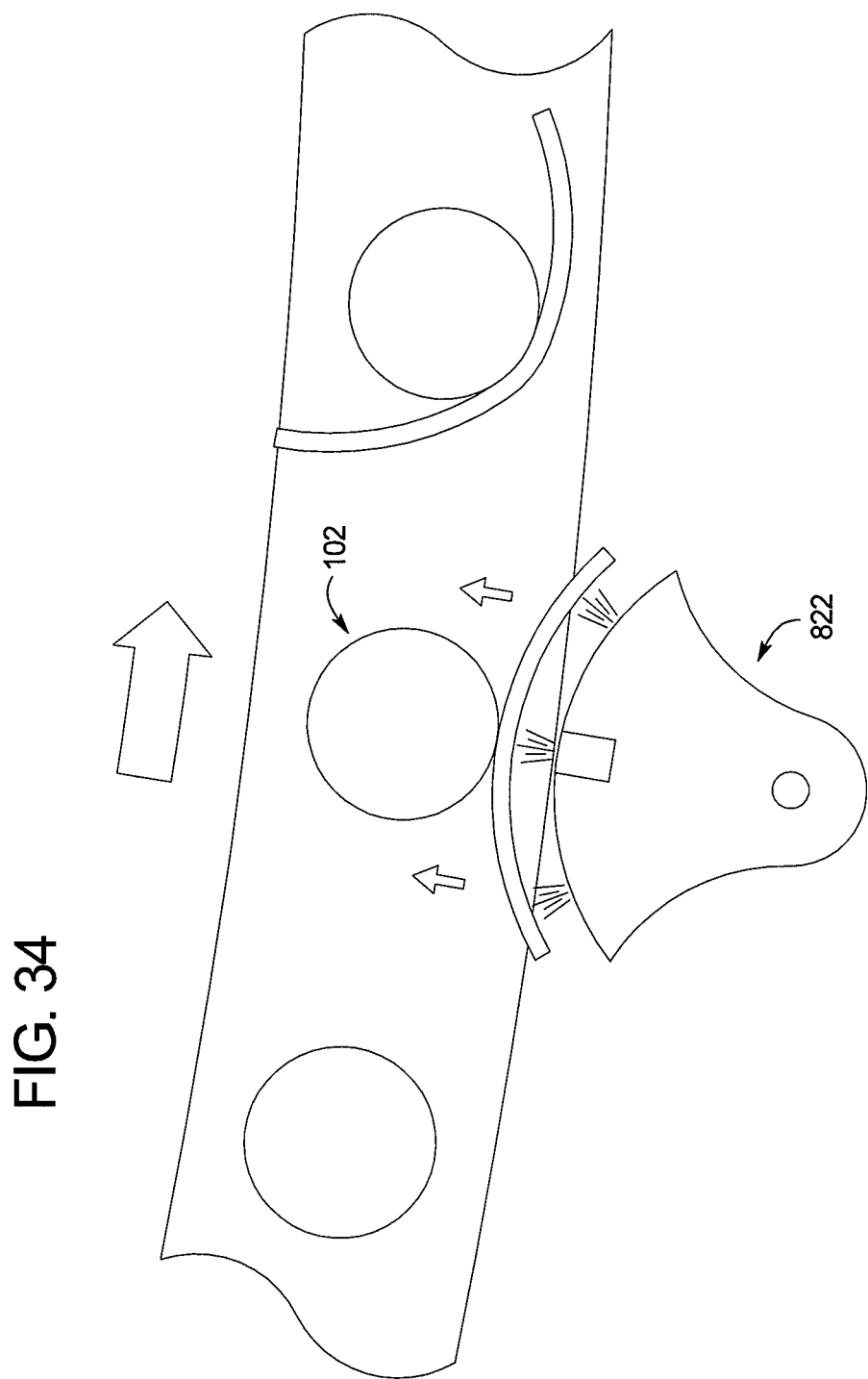

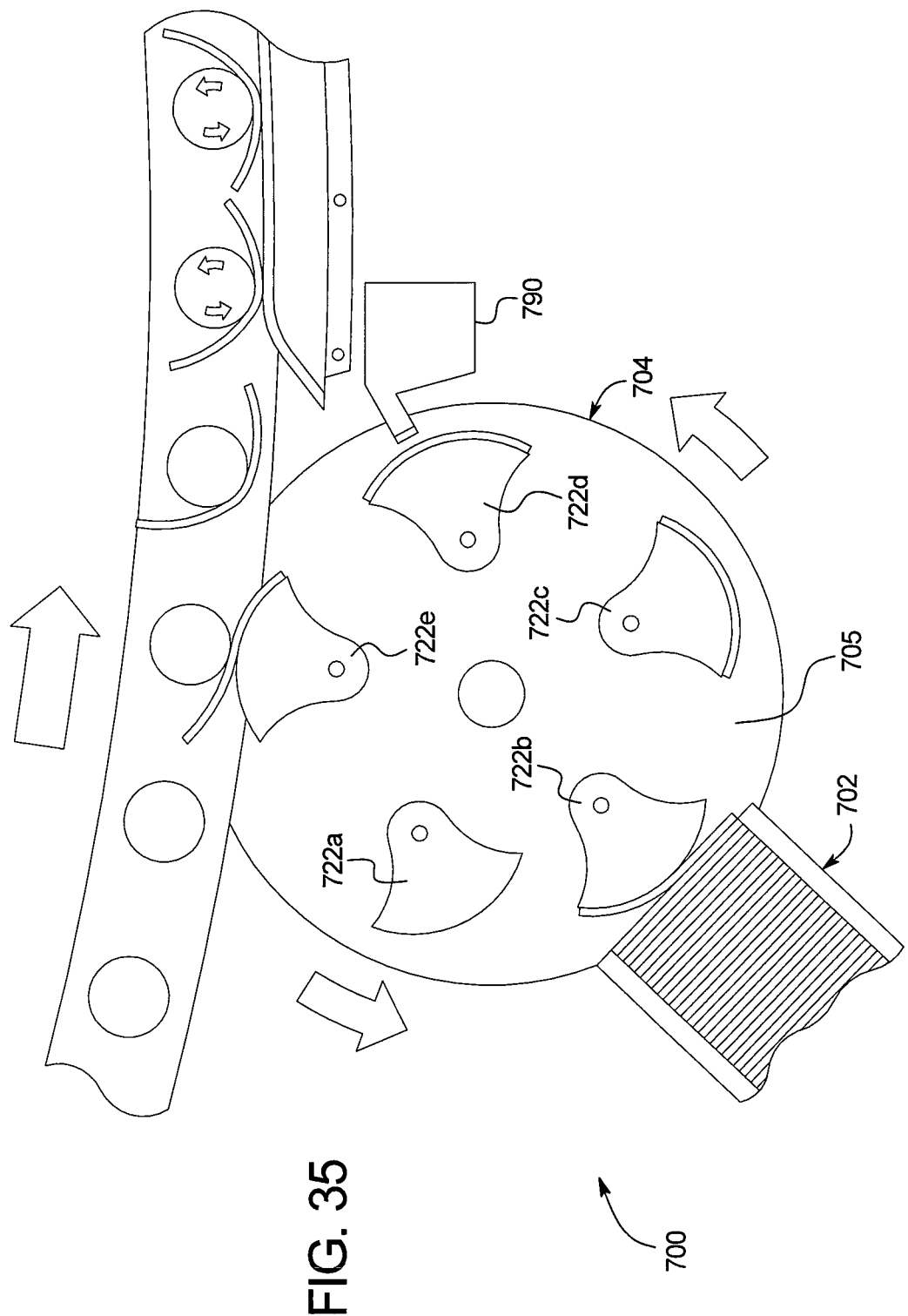

APPARATUS AND METHOD FOR MANUFACTURING REINFORCED CONTAINERS

BACKGROUND

Containers such as drinking cups are commonly used for holding and consuming beverages and other products. Fast food restaurants, coffee shops, convenience stores, and other providers distribute millions of drinking cups every day. These drinking cups are usually disposed of after a single use.

One type of known disposable drinking cup is a conventional plastic foam cup, such as a beaded polystyrene foam cup. One such conventional plastic foam cup is generally illustrated in FIGS. 1 and 2 and indicated by numeral 10. This plastic foam cup 10 includes a resilient frustoconical body 12. The body 12 is open at a first or top end 14 and closed at a second or bottom end 16. The top end has a greater diameter than the bottom end. The frustoconical body is configured to facilitate stacking a plurality of these cups together for transportation and dispensing purposes. The body 12 includes an angled side wall 18 that extends from the top end 14 to the bottom end 16. More specifically, when the cup is positioned in an upright position, the side wall 18 is angled offset from a vertical plane at a suitable angle (such as an angle in the range of two degrees to fifteen degrees). The side wall 18 has an inner face or surface 20 and an outer face or surface 22. This type of cup often includes an interior shelf 23 which facilitates stacking of the cups. This type of cup also often includes a side wall having an outwardly formed or extending lip 24. The outwardly formed lip is suitably shaped such that an annular mounting portion of a lid (not shown) can be readily attached to the formed lip to secure the lid to the top of the cup. The outwardly formed lip is also sometimes utilized to hold the cup in place prior to the cup being dispensed from a conventional cup dispenser.

One method of forming such conventional plastic foam cups includes adding expanded polystyrene beads (which were previously modified with a suitable foaming agent) into a mold or cavity. Steam is injected into the mold or cavity which causes the polystyrene beads to expand to form the cup. The formed cup is subsequently removed from the mold or cavity. It should be appreciated that other suitable methods of forming such cups, including injection molding techniques, may be employed.

These conventional plastic foam cups have outstanding heat-insulating properties which make them particularly useful for serving hot beverages such as coffee, hot tea, soups, and hot chocolate. These cups enable a person to hold the cup without burning themselves and also tend to keep the beverage hot. These cups also have outstanding cold-insulating properties which make them particularly useful for serving cold food or beverages such as milk shakes. These cups tend to keep the food or beverage cold for extended periods of time. These cups are also fairly leak resistant. However, the outer surfaces of conventional plastic foam cups do not provide the tactile feel of paper-based cups nor do such cups readily facilitate printing of high-quality graphics on their outer surface.

Other known disposable drinking cups for hot and cold beverages are formed from paper. Paper cups are typically fabricated from a paper body which is bonded to a bottom paper panel having an upper surface and a bottom surface, wherein the joined portions of the bottom panel and body form a seal. Paper-based cups typically include an inner lining which covers the inner surface of the body and the upper surface of the bottom panel. This inner lining prevents penetration of liquid into the paper during use. These conventional paper cups have an outer surface which provides a comfortable tactile feel, but have very poor heat-insulating qualities and are more prone to leaking along the seam where the two members are joined. Paper cups are often too hot to handle for a period of time after being filled with a hot beverage. Beverage servers and consumers commonly nest two or more paper-based cups together or add an insulating sleeve to provide insulation for hot drinks. This is obviously undesirable at least because it increases the number of cups or sleeves used, adds additional costs, and increases environmental waste.

To solve these problems, paper wrapped plastic foam cups have been developed and commercialized.

One known method of applying paper to a plastic foam cup is to spot glue portions of the inner face of a stationary piece of paper with a suitable adhesive and then to bring a cup in contact with the stationary paper to attach the paper to the cup. This results in substantial portions of the paper not including adhesive. Due to the inconsistent and incomplete placement of the adhesive on the paper, wrinkles are often formed when the paper is applied to or otherwise wrapped around the cup. Such wrinkles are undesirable for a manufacturer and aesthetically displeasing to consumers.

Another known method includes applying a film to a plastic foam cup and heat shrinking the film on the cup when the cup is formed. Such an "in-mold" method includes integrating the film with the material of the cup during the cup manufacturing process. Such integration includes stretching the film around the material which will form the cup and subsequently heating the material and film to shrink the film to adhere to the material. While this cup includes the desired insulation properties of a plastic foam cup, this method is relatively expensive.

Other known machines, systems and methods for affixing one or more labels to beverage containers are known. For instance, U.S. Pat. Nos. 4,709,800; 4,729,81; 4,731,147; 4,743,469; 4,911,285; 4,944,825; 4,944,830; 4,950,350; 4,973,374; 4,981,547; 4,994,135; 5,004,518; 5,017,261; 5,021,116; 5,037,499; 5,062,917; 5,062,918; 5,078,826; 5,082,520; 5,087,317; 5,110,402; 5,120,392; 5,121,827; 5,129,984; 5,160,570; 5,167,755; 5,174,851; 5,185,053; 5,188,696; 5,201,984; 5,217,538; 5,227,005; 5,271,783; 5,569,353; 5,713,403; 5,882,474; and 6,050,319 describe various known machines, systems and components for applying one or more labels to beverage containers. These machines, systems and methods do not provide solutions for the above mentioned problems.

One known apparatus and method which solves the above described problems has been successfully and widely commercially employed. This apparatus and method is disclosed in U.S. Pat. No. 7,536,767; U.S. Pat. No. 7,552,841; U.S. Published Patent Application No. 2006/0283855; U.S. Published Patent Application No. 2006/0281618; U.S. Published Patent Application No. 2007/0006962; U.S. Published Patent Application No. 2007/0107187. These patents and patent applications are owned by a subsidiary of the assignee of the present application. There are certain drawbacks with this apparatus and method. For example, this apparatus and method employs supply rolls or carriers which supply the reinforcing members for the cups. These supply rolls must be changed on a regular basis during use. This adds to the cost of production. Additionally, after use, the backing or release liner of each supply roll must be discarded. The use of the supply roll also requires regular accurate adjustments to any slack in the liner which can be a potential area for problems and breakdowns. The use of the supply roll may also require the use of multiple alternating reinforcer dispensers to keep the apparatus running at full capacity (i.e., a single reinforcer dispenser would have downtime every time the supply roll is changed). This apparatus also employs pressure sensitive adhesive which is typically more expensive to use or apply than other types of adhesive. Accordingly, even though this apparatus and method solves the above problems, there is still a need to make such disposable drinking cups (with the insulation properties of a plastic foam cup and the tactile feel and high quality graphic printing properties of a paper-based cup) more efficiently, more cost effectively, and with less environmental waste. The apparatus and methods disclosed herein provide improvements to one or more of the apparatus and methods disclosed in such patents and published applications.

SUMMARY

The present disclosure relates in general to apparatus and methods for manufacturing reinforced containers such as cups. Various embodiments of the apparatus and methods are configured to make each disposable reinforced cup using a reinforcing member configured to be attached to a substantial portion of the outer surface of the side wall of the body of a cup. The inner face or surface of each reinforcing member is completely or substantially completely coated with a heat activated adhesive. It should be appreciated that the present disclosure is primarily described in relation to disposable cups; however, it should be appreciated that the present application is not limited to the containers being disposable cups.

The container or cup reinforcing apparatus of the present disclosure includes a container conveyor and one or more reinforcing member applicators. In one embodiment where the containers are cups, the container or cup conveyor generally includes a cup dispenser, a cup feeder, a cup spacer, a cup mover, and a cup remover. The cup dispenser dispenses each cup from a stack of nested cups onto a conveyor belt of the cup feeder. The cup feeder moves each cup to the cup spacer which properly spaces each of the cups at pre-determined distances, and then to the cup mover. The cup mover moves each cup into the appropriate alignment with the reinforcing member applicator. The cup mover and the reinforcing member applicator co-act to attach a reinforcing member to each cup. The cup mover moves each reinforced cup to the cup remover. The cup remover removes each reinforced cup from the cup mover and stacks the reinforced cups for packaging. It should be appreciated that in alternative embodiments, other apparatus for moving the cups can be employed in accordance with the present disclosure.

In one embodiment, each reinforcing member applicator of the present disclosure includes a reinforcing member supply holder, a first reinforcing member mover including a plurality of reinforcing member pickers, a second reinforcing member mover including a plurality of reinforcing member holders, a first reinforcing member applicator or attachment pad, and a second reinforcing member applicator or attachment pad. The reinforcing member supply holder holds a stack of reinforcing members for application to respective containers such as the cups. The first reinforcing member mover including the plurality of reinforcing member pickers removes each of the reinforcing members from the reinforcing member supply holder and moves each reinforcement member to the second reinforcing member mover for transfer to the plurality of reinforcing member holders. Each of the reinforcing member holders: (a) holds the respective reinforcing member, (b) heats a vertical or substantially vertical central portion of the heat activated adhesive of the reinforcing member it holds, (c) moves the reinforcing member it holds into an engagement position with the respective cup on the cup mover, and (d) transfers the reinforcing member it holds onto that respective cup such that the reinforcement member is partially attached to the cup, and particularly partially attached to the cup along a central vertical or substantially vertical axis of the reinforcement member. For each cup with a reinforcing member partially attached, the first and second reinforcing member applicators or attachment pads heat the heat activated adhesive on the leading and trailing portions of the reinforcing member and co-acts with the cup mover to attach those portions to the cup. It should be appreciated that in alternative embodiments, some of which are discussed below, other apparatus for moving the reinforcing members, selectively heating the designated portions of the heat activated adhesive on each of the reinforcing members, and attaching each of the portions of the reinforcing to the respective cups can be employed in accordance with the present disclosure. It should also be appreciated that in alternative embodiments, some of which are discussed below, the functions of the pickers and holders are combined or performed by a common device. It should further be appreciated that the reinforcing members function as labels for the containers or cups in addition to providing additional structural support for the underlying containers or cups.

It should thus be appreciated that, in one embodiment, the method of the present disclosure includes for each reinforcing member and respective cup: (a) heating the heat activated adhesive at a central portion of the reinforcing member, (b) attaching the central portion of the reinforcing member to the outer surface of the body of the respective cup, and thereafter (c) heating the heat activated adhesive on a trailing portion of the reinforcing member and attaching that trailing portion of the reinforcing member to the respective cup, and (d) heating the heat activated adhesive on a leading portion of the reinforcing member and attaching that leading portion of the reinforcing member to the respective cup. It should also thus be appreciated that the apparatus and methods of various embodiments of the present disclosure sequentially heats different or selective portions of the heat activated adhesive at multiple sequential stages, steps or times to attach the reinforcing member to the cup.

Additional features and advantages are described in, and will be apparent from, the following Detailed Description and the figures.

BRIEF DESCRIPTION OF THE FIGURES

FIG. 27B is a chart showing an example expected heat activated adhesive bond strength curve.

FIGS. 32 and 33 are enlarged top plan views of one of the pickers of the reinforcing member applicator of the embodiment of the cup reinforcing apparatus of FIG. 31.

FIG. 34 is a diagrammatic partially fragmentary top plan view of one embodiment of a picker of the cup reinforcing apparatus disclosed herein.

FIG. 35 is a diagrammatic partially fragmentary top plan view of a reinforcing member applicator of another alternative embodiment of the cup reinforcing apparatus disclosed herein.

DETAILED DESCRIPTION

Figure 1:
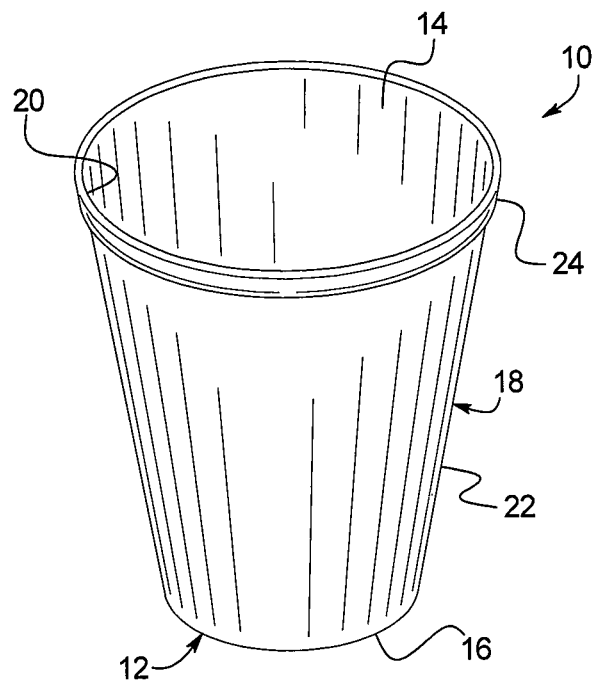
FIG. 1 is a perspective view of a conventional plastic foam cup.
Figure 2:
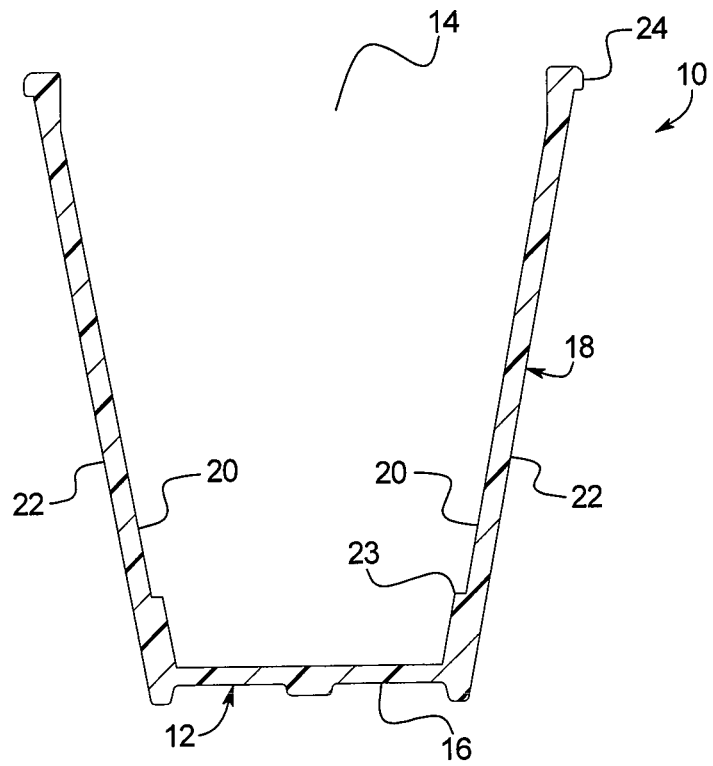
FIG. 2 is a cross-sectional side view of the cup of FIG. 1.
Figure 3:
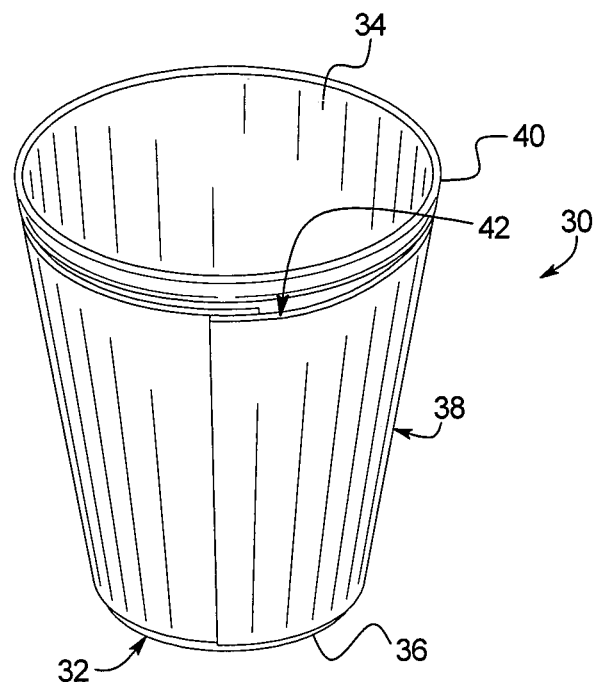
FIG. 3 is a perspective view of one embodiment of a reinforced plastic foam cup made using the apparatus and methods disclosed herein.

Referring now to the drawings, and particularly to FIGS. 1, 2, 3, 4, 5, 6, and 7, various embodiments of the present disclosure are directed to apparatus and methods for manufacturing reinforced containers such as reinforced cup 30. As mentioned above, it should be appreciated that while the present disclosure is discussed and illustrated in relation to cups, the present disclosure is not limited to cups, but rather extends to other containers as further discussed below. Reinforced cup 30 includes a base cup such as cup 10 and a reinforcing member such as reinforcing member 42 wrapped around and attached to the base cup by adhesive 46. The reinforcing cup 30 includes a body 32 which defines an open top end 34 and a closed bottom end 36, wherein the top end has a greater diameter than the bottom end. The body includes a tapered side wall 38 that extends from the bottom end to the top end. The top end of the body includes an outwardly formed lip 40, however the cup does not need to have a formed lip.

As described above, one embodiment of the base cup is a disposable plastic beaded polystyrene foam cup 10 which includes a resilient frustoconical body 12, an open first or top end 14, a closed second or bottom end 16 having a greater diameter than the bottom end. The body includes an angled side wall 18 extending from the top end 14 to the bottom end 16, having an inner face or surface 20 and an outer face or surface 22, and an outwardly formed or extending lip 2. It should be appreciated that this base cup 10 is configured to be handled by the cup reinforcing apparatus as described below. It should also be appreciated that: (a) the cup can be formed from other suitable materials; (b) the cup can be formed of multiple different materials such as paper suitably coated or otherwise laminated with one or more layers of polystyrene; (c) the cup can be formed in other suitable sizes; (d) the cup can be formed in other shapes; and (e) the cup does not need to have a formed lip.

In one embodiment, the reinforcing member includes a body formed from a malleable, flexible material, such as a suitable paper, a suitable plastic, a suitable composite material or any other suitable material. While this material is flexible, it has properties which provide rigidity and durability when attached to the base cup. In the illustrated embodiment, the body is defined by an annular, concavely shaped bottom edge 62, a partially annular, convexly shaped top edge 64, an angled front or leading edge 66 and an angled rear or trailing edge 68. The length of the edge 62 is less than the length of the edge 64 such that the leading edge 66 is angled offset from a vertical plane at a suitable angle (A degrees) and the trailing or rear edge 68 is also angled offset from a vertical plane at a suitable angle (B degrees). The body of the reinforcing member includes an outer or non-adhesive surface 58 and an inner or adhesive surface 52. The outer face of the body of the reinforcing member may be blank or may include high quality visual content, such as graphics, text and/or images printed or otherwise formed thereon as indicated by numeral 60. The inner surface of each reinforcing member is preferably completely or substantially completely coated with a heat activated adhesive. In this embodiment, the inner surface or adhesive surface of the reinforcing member is applied to and adheres to (by way of the adhesive) all or a substantial portion of the outer surface of the side wall of the base cup. The base cup coupled with the adhered to reinforcing member form the reinforced plastic foam cup. In various embodiments, the body is substantially planar or flat with a thickness in the range 1.5 millimeters to 8.0 millimeters, and in one preferred embodiment a thickness in the range of approximately 2.7 millimeters to 4.0 millimeters. It should be appreciated that in certain other embodiments, less than all of the inner side of the reinforcing member is coated with a heat activated adhesive. For example, in certain embodiments, the inner side of the reinforcing member may have spots or sections which do not include adhesive. In certain embodiments, these spots or sections are positioned to be engaged or grabbed by fingers or other members during movement, heating and application of the reinforcing member to the cups.

It should be appreciated that since the inner surface 52 of the reinforcing member 42 is completely or substantially completely covered or coated with the heat activated adhesive 54 in this embodiment, the entire reinforcing member will adhere to the side wall of the base cup, thus avoiding the formation of wrinkles in the reinforcing member, adding strength or stiffness to the base cup and adding a tactile feel to the entire or substantially the entire outer surface of the base cup. In the illustrated embodiment, the reinforcing member is attached to the base cup in an overlapping manner. However, it should be appreciated that the reinforcing member does not need to overlap itself.

Figure 4:
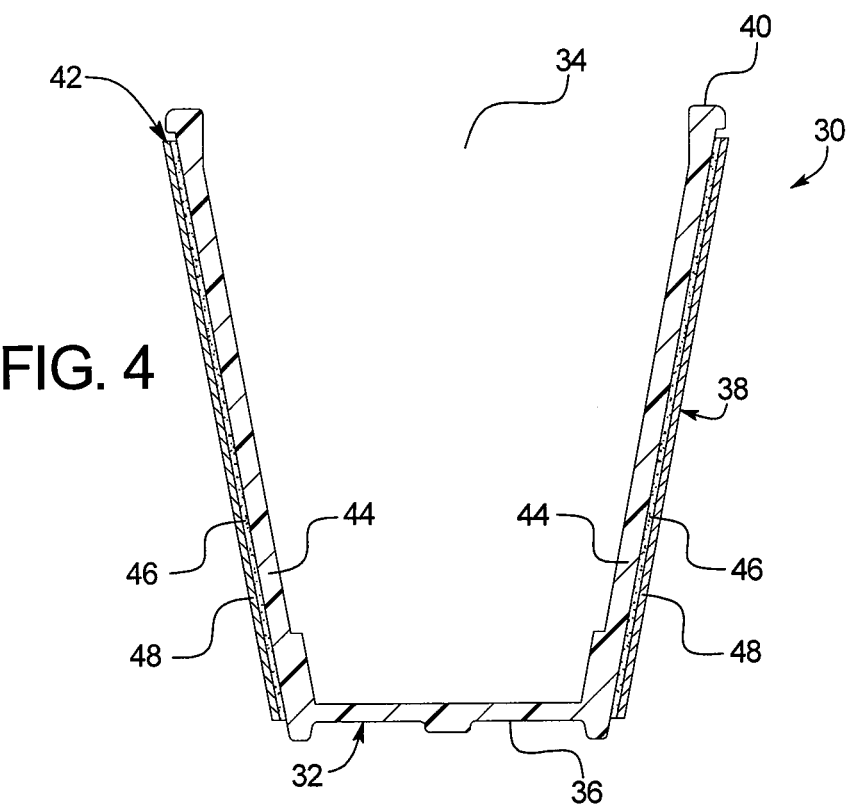
FIG. 4 is a cross-sectional side view of the reinforced cup of FIG. 3.
Figure 5:
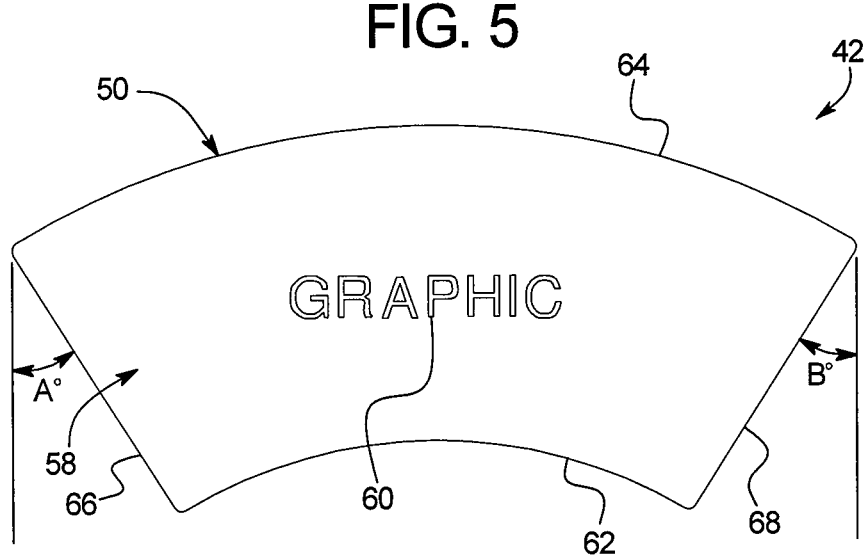
FIG. 5 is a plan view of the outside face of a reinforcing member disclosed herein.
Figure 6:
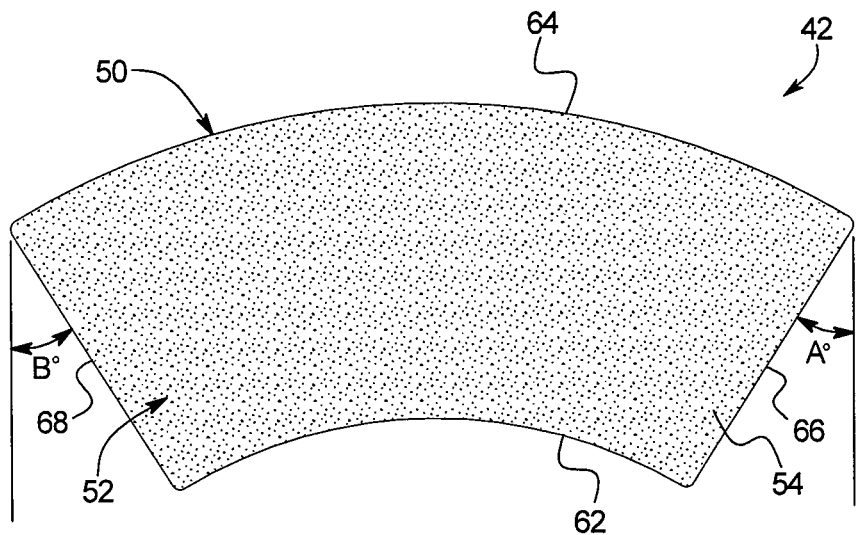
FIG. 6 is a bottom plan view of the inside face of the reinforcing member of FIG. 5.
Figure 7:
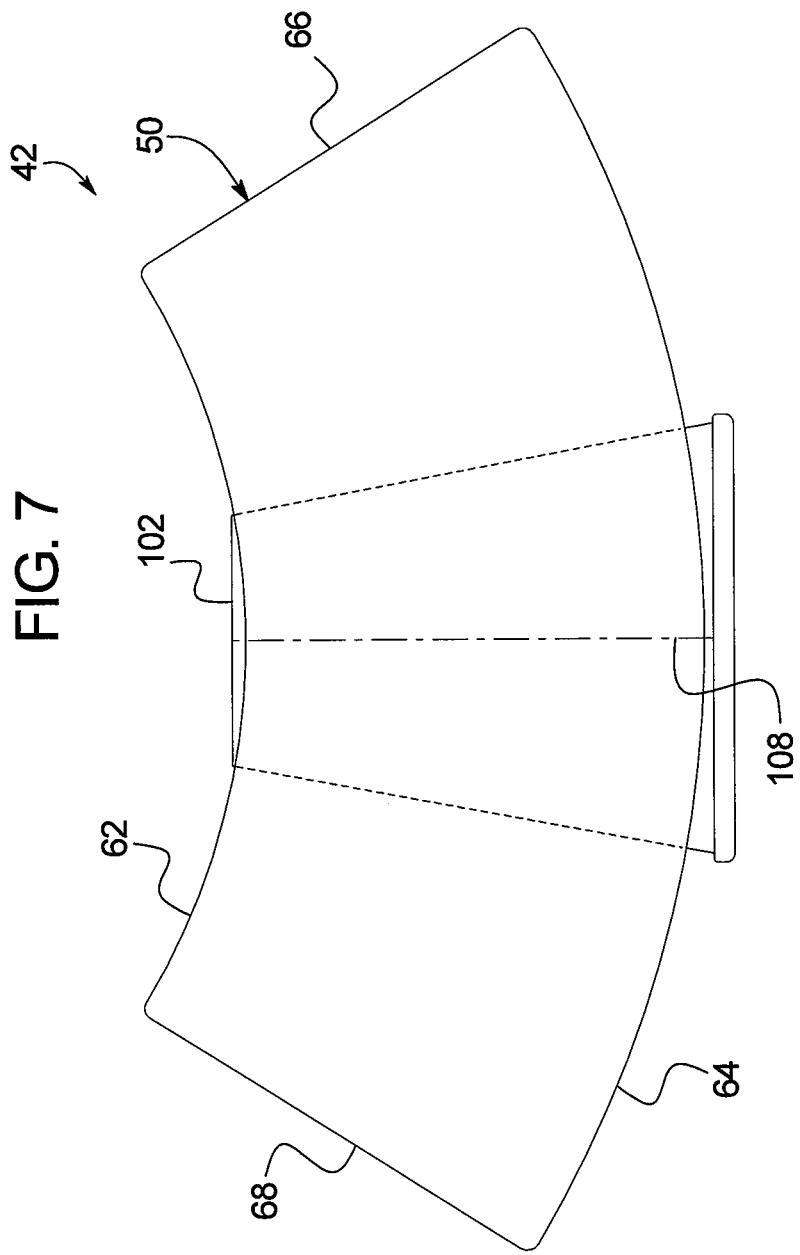
FIG. 7 is a side view of a pre-reinforced plastic foam cup aligned with a centered vertical axis of the reinforcing member of FIG. 5.

Accordingly, as shown in FIG. 4, the side wall 38 of the reinforced plastic foam cup 30 includes a plastic foam layer 44, a heat sensitive adhesive layer 46 and a rigid material layer 48 which provides a better tactile feel. Compared to a non-reinforced plastic foam cup which only includes a plastic foam layer, the reinforced plastic foam cup with the multi-layered side wall (i.e., the plastic foam layer 44, the adhesive layer 46, and the rigid material layer 48) provides a substantial increase in the tactile feel and rigidity of the reinforced plastic foam cup. Accordingly, the reinforced plastic foam cup provides a disposable cup with the insulation properties of a plastic foam cup and also the tactile feel of a paper-based cup. Moreover, when graphics are printed on the outer face of the rigid material of the reinforcing member, the reinforced plastic foam cup further provides a disposable cup with the high-quality graphic presentation properties of a paper-based cup. In one embodiment, a laminate material or a protective coating (not shown) is applied to the outer face over the layer(s) of ink to protect and/or enhance the printed matter.

It should be appreciated that the dimensions of the reinforcing member will be specific to the specifications of the base cup. Therefore, the respective angles of the leading and trailing edges of the reinforcing member, the shape of the top and bottom edges, the length between the leading edge and the trailing edge or any other suitable dimensions of the reinforcing member will be based on the size of the base cup, the angle of the side wall of the base cup or any other specification of the base cup.

In various embodiments, the method of the present disclosure includes positioning the base cup or pre-reinforced plastic foam cup upside-down and positioning the reinforcing member adjacent to the side wall of the upside-down base cup at an angle which corresponds with the angle of the side wall of the base cup. At the point when both the base cup and the reinforcing member move into position the inside face of the reinforcing member is attached to the outer face of the side wall of the base cup along the center vertical axis, wherein the reinforcing member is attached at an angle which corresponds with the angle of the side wall of the base cup. After attaching the center of the reinforcing member to the side wall of the base cup, the cup with the reinforcing member continues to move on the cup conveyer and the remaining free or unattached portions are sequentially or simultaneously attached to the side wall. It should be appreciated that such angling of the reinforcing member provides that as the remaining unattached portions or sections of the reinforcing member are attached to the side wall of the base cup, the reinforcing member will completely adhere to the side wall of the base cup.

Figure 8:
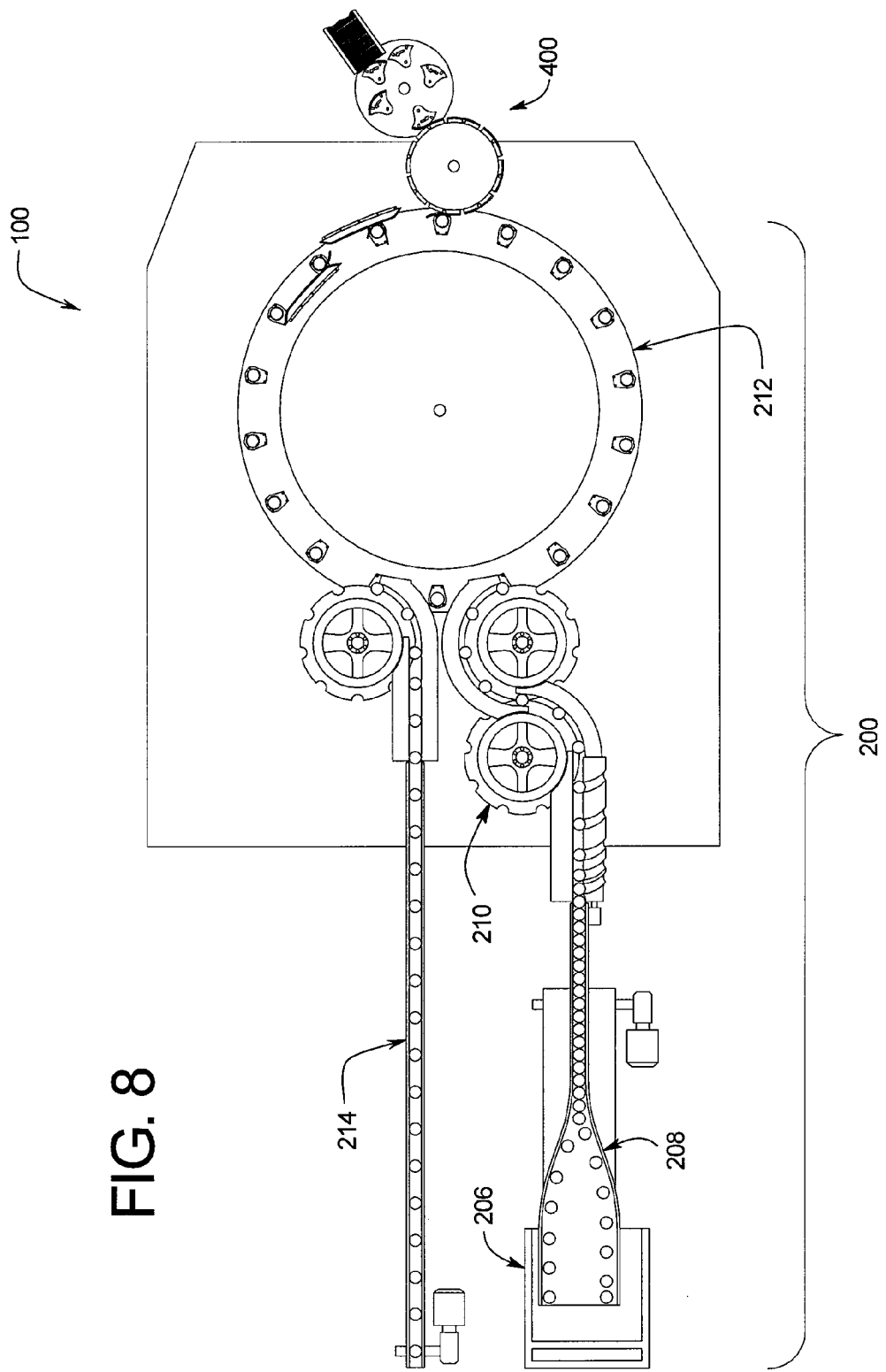
FIG. 8 is a diagrammatic top plan view of one embodiment of the cup reinforcing apparatus disclosed herein.

Referring now to FIG. 8, one embodiment of the cup reinforcing apparatus disclosed herein is illustrated and generally indicated by numeral 100. The cup reinforcing apparatus 100 generally includes a cup conveyor 200 and at least one reinforcing member applicator 400. The cup conveyor is configured to receive each pre-reinforced cup, transport and space each received cup into an appropriate position for attachment of a reinforcing member and remove each cup from the cup reinforcing apparatus after the attachment of a reinforcing member to that cup. The reinforcing member applicator 400 is configured to transport each reinforcing member into the appropriate position for attachment with the respective transported cup and attach that reinforcing member, along a centered vertical or substantially vertical axis of the reinforcing member, to the wall of that upside down positioned cup at an angle which corresponds with the angle of the side wall of that cup.

More specifically, the cup conveyor includes a cup dispenser 206, a cup feeder 208, a cup spacer 210, a cup mover 212, and a cup remover 214. Generally, the cup dispenser 206 dispenses each cup from a stack of nested cups onto a conveyor belt of the cup feeder 208. The cup feeder 208 moves each cup to the cup spacer 210 which properly spaces each of the cups at pre-determined distances, and then to the cup mover 212. The cup mover 212 moves each cup into the appropriate alignment with the reinforcing member applicator 400. The cup mover 212 moves each reinforced cup to the cup remover 214. The cup remover 214 removes each reinforced cup from the cup mover 212 and stacks the reinforced cups for packaging. It should be appreciated that in alternative embodiments, other apparatus for moving the cups can be employed in accordance with the present disclosure.

Figure 26:
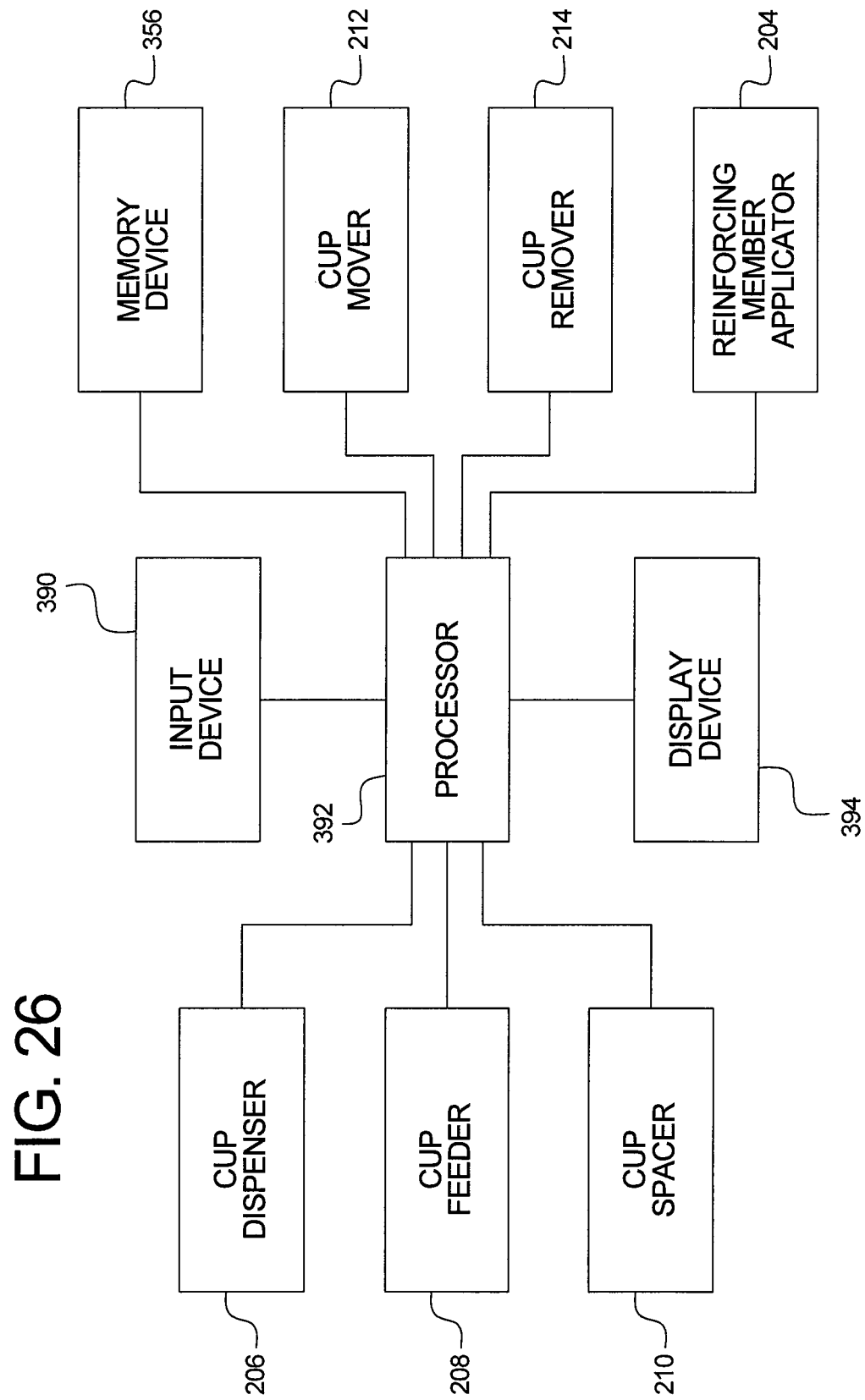
FIG. 26 is a schematic block diagram of an electronic configuration of one embodiment of the cup reinforcing apparatus disclosed herein.

As generally illustrated in FIG. 26, in various embodiments, the cup reinforcing apparatus includes a processor 392 in communication with and programmed to control the cup dispenser 206, the cup feeder 208, the cup spacer 210, the cup mover 212, the cup remover 214, and the reinforcing member applicator 400. The processor is also in communication with and programmed to control at least one input device or control panel 390 (such as a touch screen or one or more suitable switches or buttons) for enabling a user to operate the cup reinforcing apparatus and at least one display device 394 for displaying suitable information to an operator of the cup reinforcing apparatus. The input device enables a user to input appropriate commands and/or suitable information to the processor of the cup reinforcing apparatus. For example, an operator utilizes at least one input device to initiate and shut-off the cup reinforcing apparatus, provide information regarding the exact specifications of the cups and/or reinforcing members, input the speed to move the cups throughout the cup reinforcing apparatus, and input the angle to set the reinforcing member applicator relative to the cup mover. In other embodiments, one or more of the functions described above may be manually adjusted utilizing one or more mechanical or other suitable devices. For example, the angle to set the reinforcing member applicator relative to the cup mover may be manually adjusted utilizing one or more individual hand cranks.

In various embodiments, the processor is in communication with or operable to access or to exchange signals with at least one data storage or memory device 356. The memory device stores program code and instructions, executable by the processor, to control the cup reinforcing apparatus. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the cup reinforcing apparatus disclosed herein. In one embodiment, part or all of the program code and/or operating data described above can be stored in a detachable or removable memory device, including, but not limited to, a suitable cartridge, disk, CD ROM, DVD or USB memory device. The processor and memory device may sometimes be collectively referred to herein as a "computer" or "controller."

Figure 20:
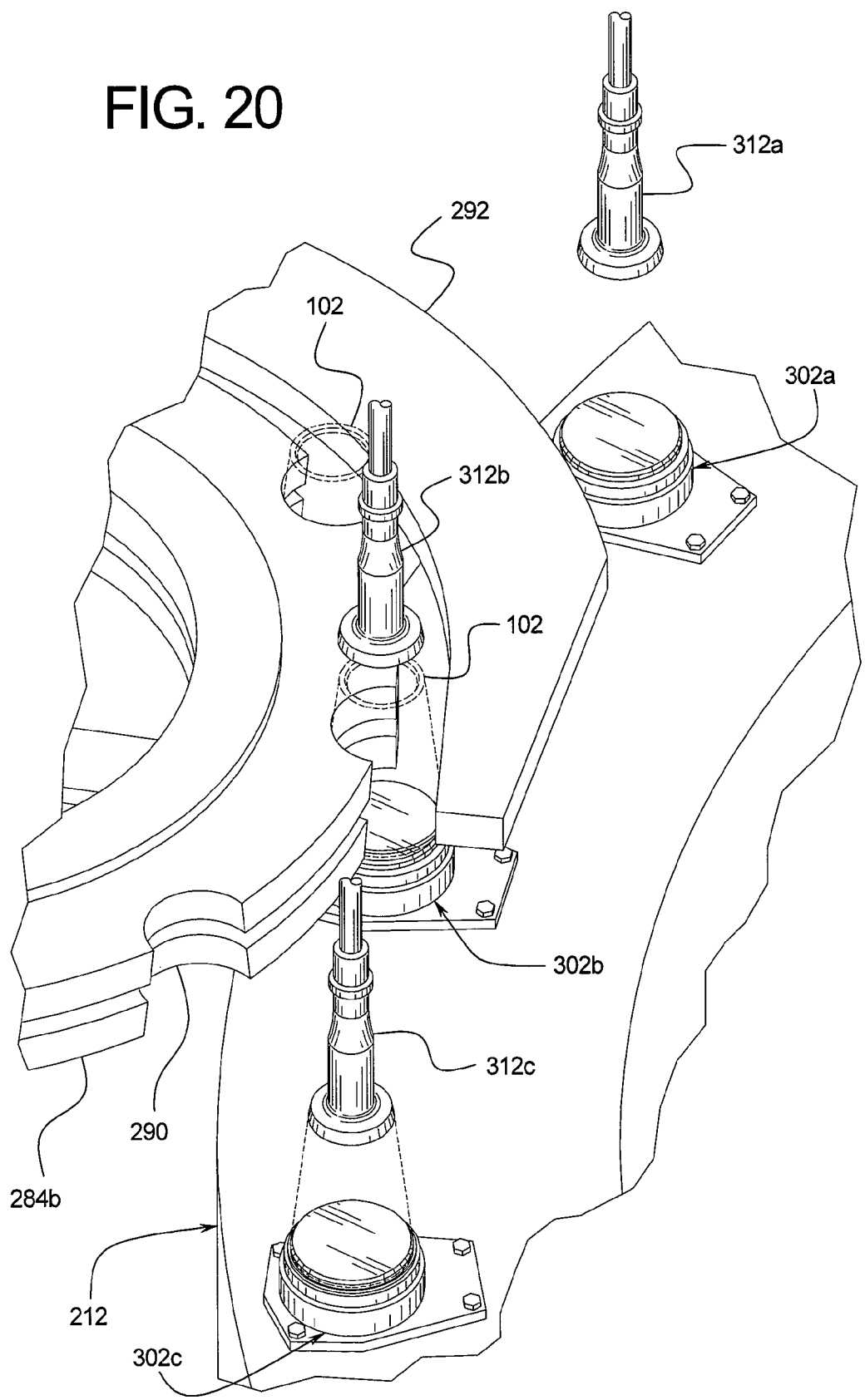
FIG. 20 is a fragmentary perspective view of one of the in-feed star wheels and the cup mover of the cup reinforcing apparatus of FIG. 8, and illustrating a plurality of cup holders associated with a plurality of centering bells.
Figure 21A:
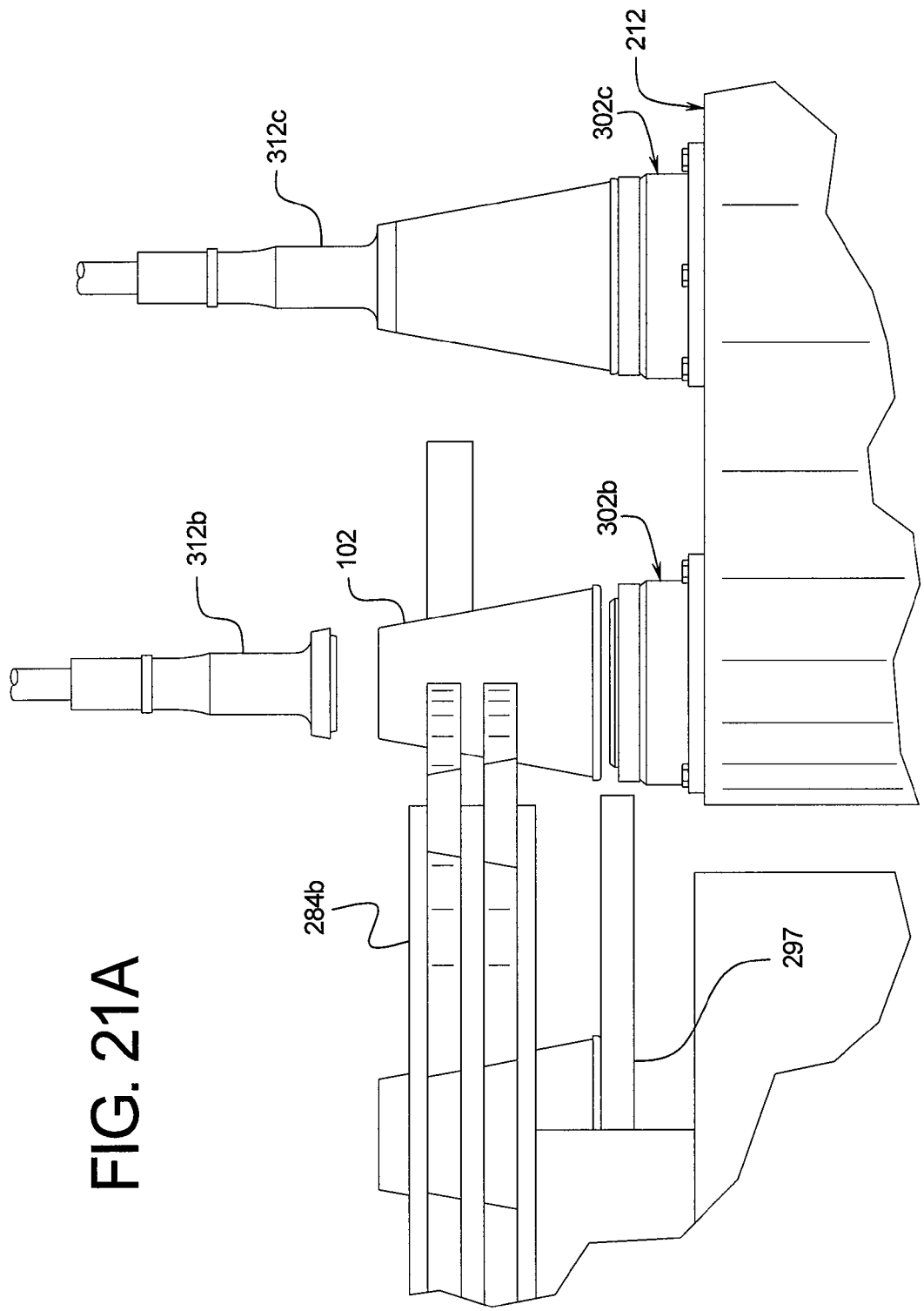
FIG. 21A is a fragmentary side view of the in-feed star wheel and the cup mover of FIG. 20, illustrating the cup mover positioned adjacent to and slightly below the in-feed star wheel.

As more specifically illustrated in FIGS. 9 to 12, the cup dispenser 206 of the cup reinforcing apparatus includes a frame 230 which supports two independent, offset guide members 232a and 232b (referred to generally as 232). Each guide member is configured to hold a stack of nested pre-reinforced or base cups 234a and 234b (referred to generally as 234) in upside down positions above the cup feeder 206. Each guide member 232 is associated with at least one and preferably a plurality of or set of vertically or substantially vertically disposed co-acting cup dispensing screws or cup de-nesters 236a, 236b, 236c and 236d (referred to generally as 232 and as best shown in FIGS. 20 and 21) made of any suitable smooth surfaced, non-abrasive material with self-lubrication properties, such as any suitable plastic, for example a DELRIN® plastic manufactured by E. I. DU PONT DE NEMOURS AND COMPANY.

Each cup dispensing screw 236 has internally extending threading 238 on its outer surface. The threads are suitably sized and angled to correlate to the top lips of the upside down positioned base cups 102 held by the guide members 232. The cup dispensing screws 236 are each movably connected or coupled to at least one actuator 240, such as a motor or other suitable movement generating device controlled by the cup reinforcing apparatus processor which causes each cup dispensing screw 236 to rotate in the appropriate direction at a suitable speed.

Figure 9:
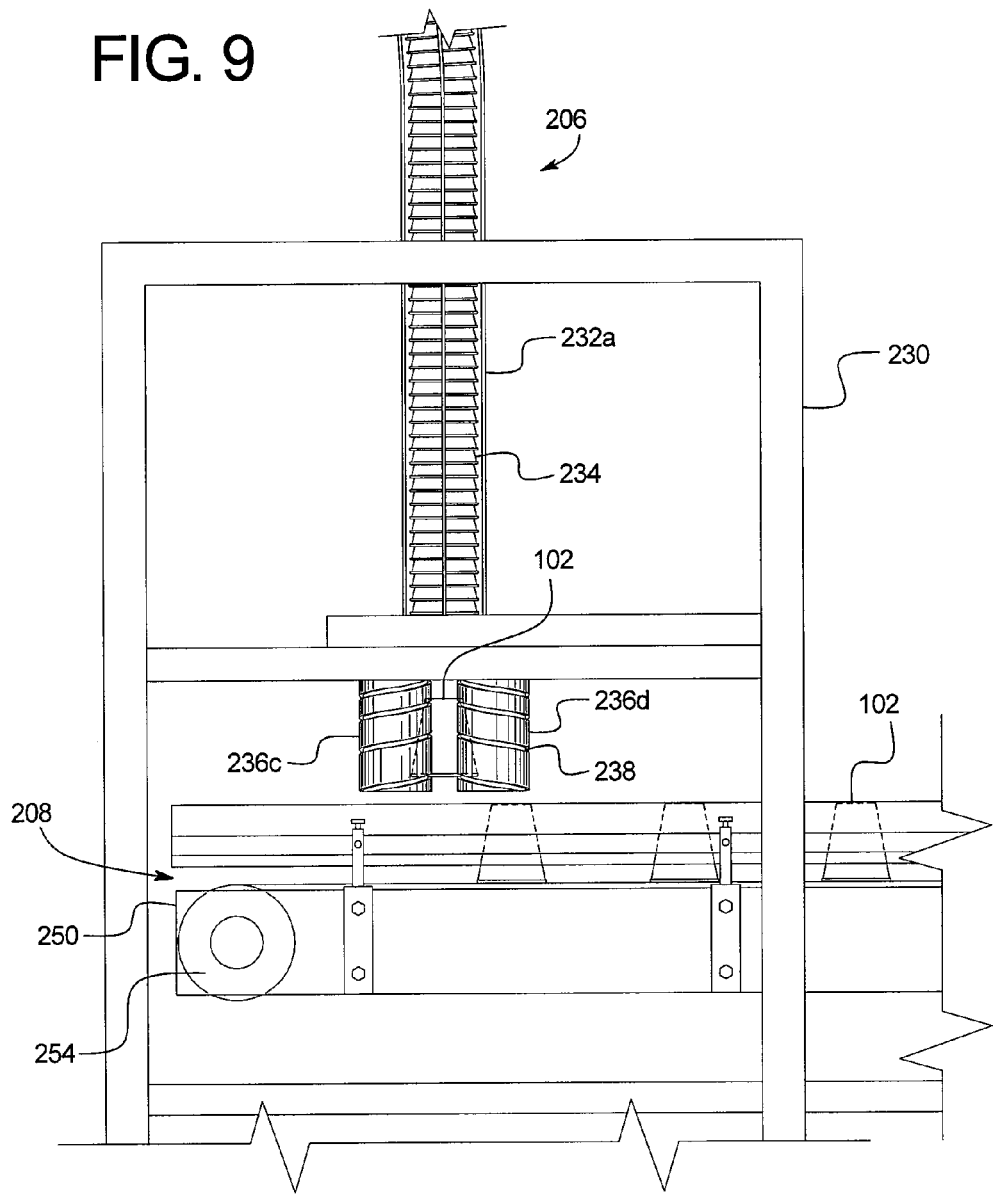
FIG. 9 is a side view of the cup dispenser, the cup conveyor and the vacuum chamber of the cup reinforcing apparatus of FIG. 8.
Figure 10:
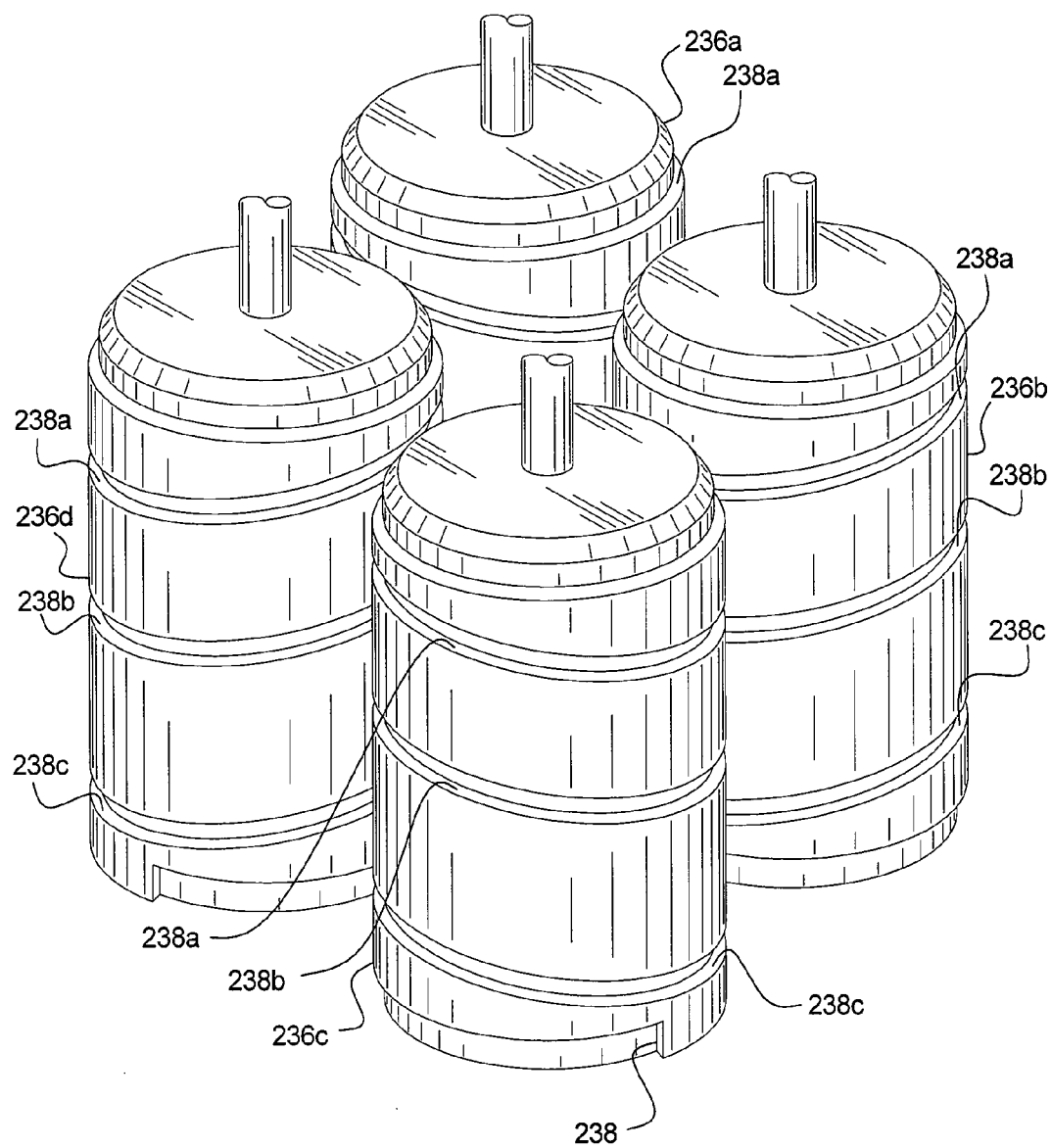
FIG. 10 is a perspective view of one set of cup dispensing screws of the dual cup dispenser of FIG. 9.
Figure 11:
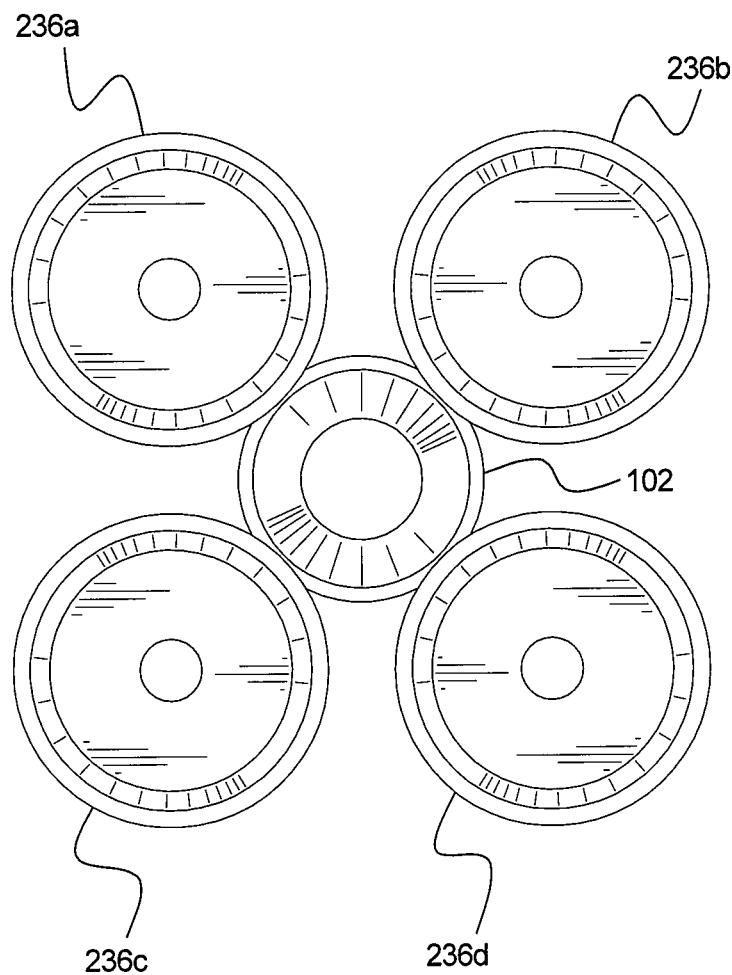
FIG. 11 is a top plan view of a set of cup dispensing screws of the cup dispenser engaging a cup.

In operation, as illustrated in FIGS. 9 to 11, the internal threading located at or near the top 238a of each rotating cup dispensing screw 236 engage a portion of the outwardly extending lip 24 of a first nested upside down cup held by one of the guide members 232. Each cup dispensing screw rotates to pull the first cup, via the top threading 238a of each cup dispensing screw which engages the cup lip 24, from the nested set of cups 234. As each cup dispensing screw 236 continues to rotate, the cup lip 24 of the first cup is passed to the threading located at or near the middle 238b of each rotating cup dispensing screw and then to the threading located at or near the bottom 238c of each rotating cup dispensing screw to slowly and consistently pull the first cup further away from the nested set of cups 234. As the first cup is passed from the top threading 238a of each cup dispensing screw to the middle threading 238b, the top threading 238a engages the lip 24 of a second nested upside down cup to pull the second cup, via the top threading 238a engaging the lip of the second cup, from the nested set of cups 234. This process continues to separate each nested cup from the set of nested, upside-down cups loaded into the cup dispenser 206. In other words, the rotating threads of the cup dispensing screws co-act to separate each engaged cup, one at a time, from the nested stack of pre-reinforced upside down cups. After being de-nested, each separated cup 102 proceeds to drop down to the cup feeder 208 located directly below the cup dispenser 206.

It should be appreciated that any suitable apparatus or method for loading one or more pre-reinforced cups onto the cup feeder may be implemented in accordance with the cup reinforcing apparatus disclosed herein. It should be further appreciated that the cup dispenser disclosed herein may be located at any suitable position upstream from the reinforcing member applicator.

As shown in FIGS. 9 and 12 to 14, the cup feeder 208 of the cup conveyor includes a frame 250 which supports a plurality of rows of adjacently positioned conveyor belts 252a to 252e (referred to generally as 252). The conveyor belts are suitably movably connected or coupled to at least one actuator, such as a motor or other suitable movement generating device 254 which causes the conveyor belts to move at any suitable speed in a conventional manner.

It should be appreciated that static electricity can build up by rapid movement of plastic foam cups. The use of multiple guide members 232 and multiple cup dispensing screws 236 reduces the likelihood of static electricity buildup in the cup reinforcing apparatus disclosed herein. That is, the use of multiple guide members and multiple cup dispensing screws reduces the number of cups each individual guide member/cup dispensing screw must dispense per minute. This reduced number of cups directly correlates to a reduction in the speed which cups must be transported throughout the cup reinforcing apparatus and such a reduction in speed reduces the amount of static electricity buildup.

Figure 12:
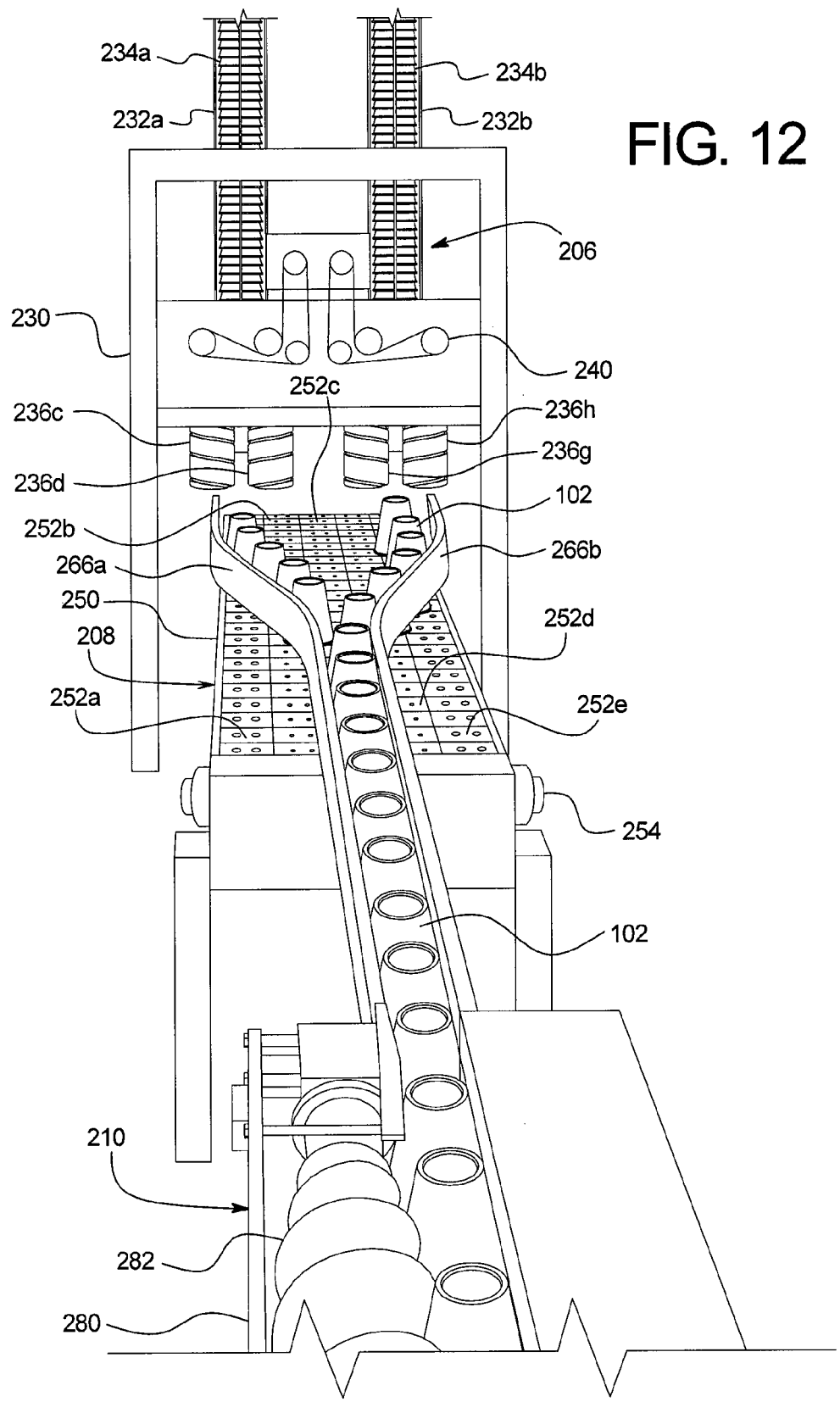
FIG. 12 is a fragmentary front perspective view of the cup dispenser, the cup conveyor, the vacuum chamber and the spacing screw of the cup reinforcing apparatus of FIG. 8.
Figure 14A:
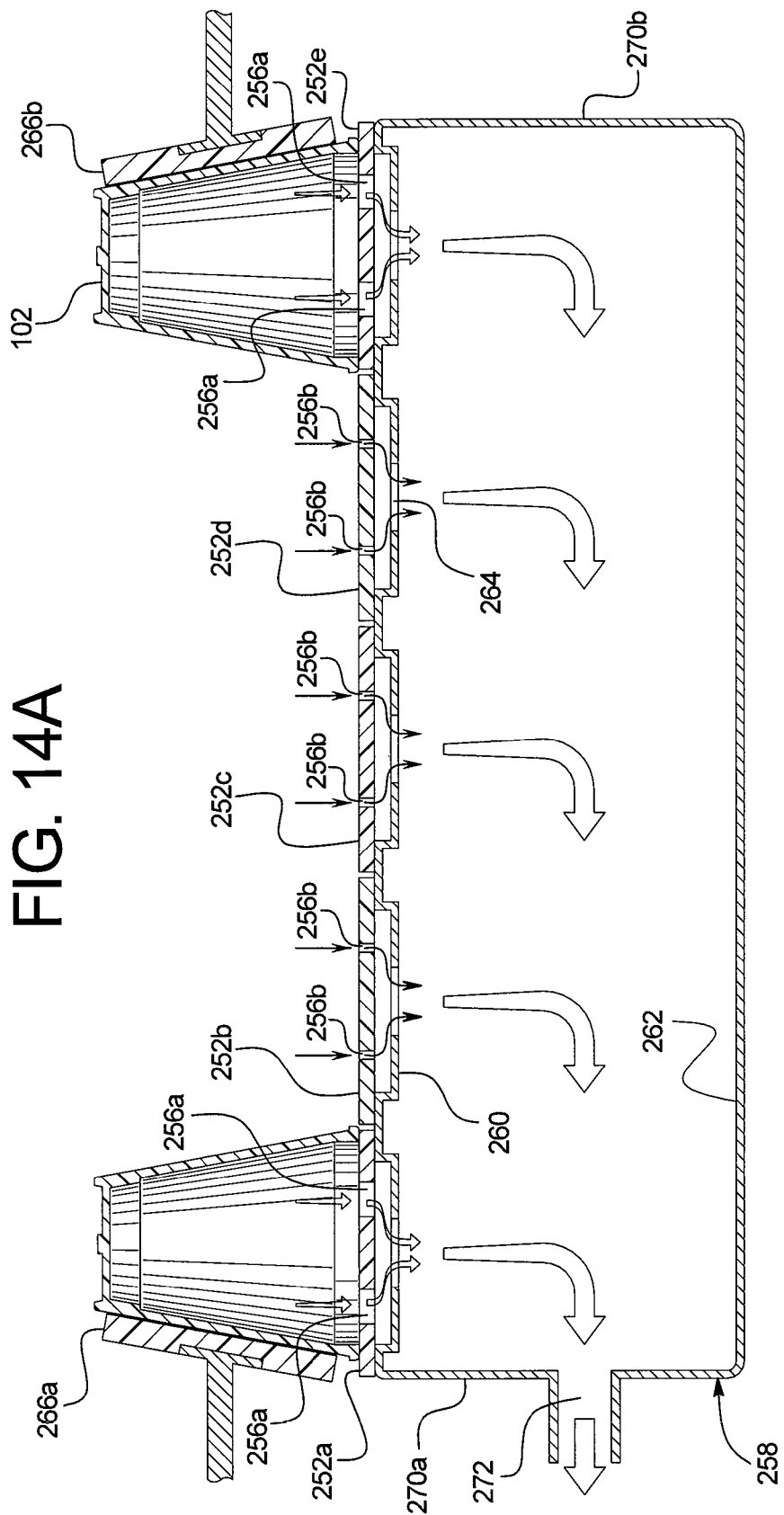
FIG. 14A is a schematic cross-sectional view of the vacuum box of FIG. 12, illustrating the flow of air from an area above the plurality of conveyor belts, entering the vacuum chamber via a plurality of air inlets and exiting the vacuum chamber via an air outlet.
Figure 14B:
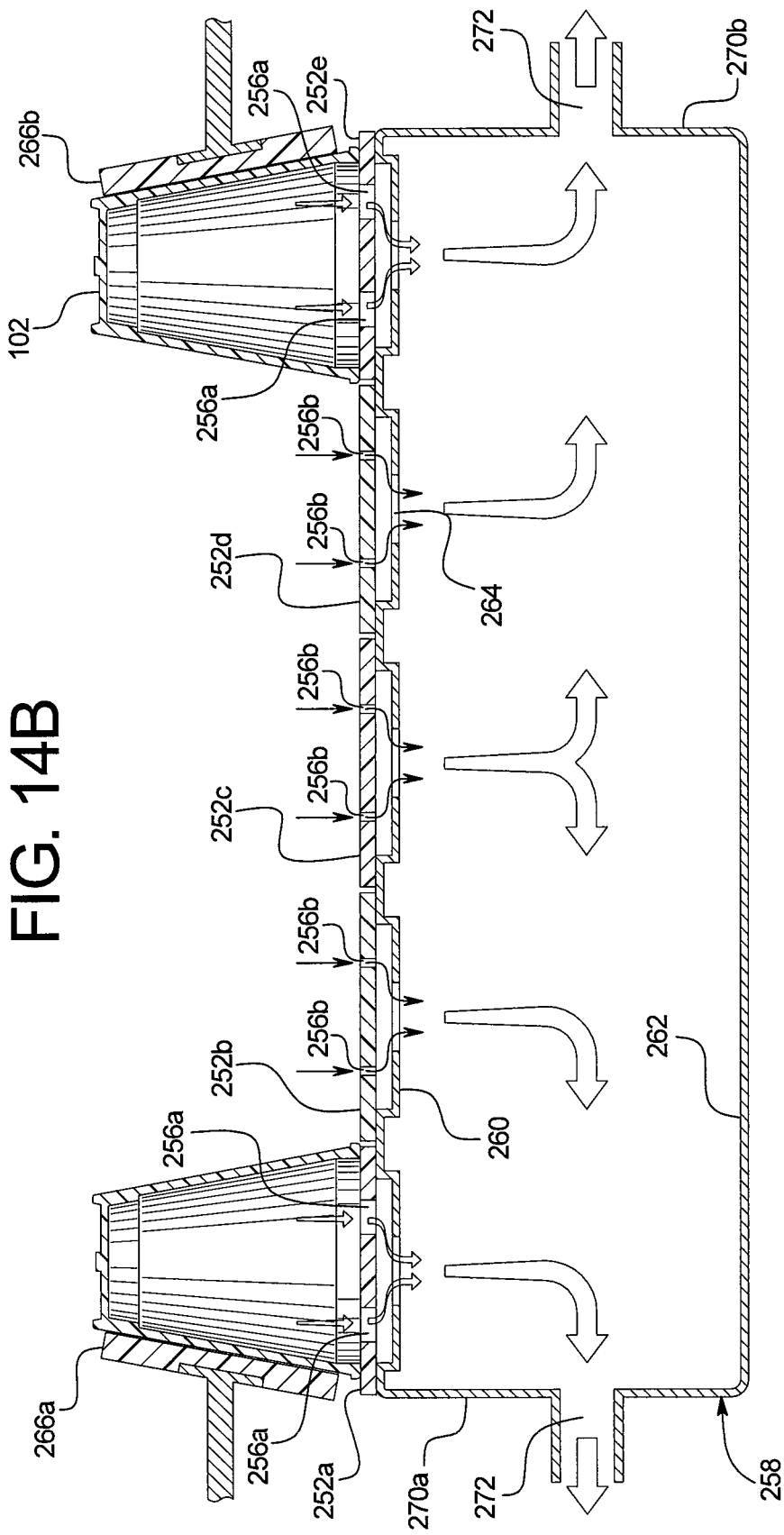
FIG. 14B is a schematic cross-sectional view of an alternative embodiment of a vacuum box, illustrating the flow of air from an area above the plurality of conveyor belts, entering the vacuum chamber via a plurality of air inlets and exiting the vacuum chamber via a plurality of air outlets.

In one embodiment, one, more or each of the conveyor belts 252 define one or more apertures or holes 256 through which air flows as described below. As best illustrated in FIGS. 12, 14A and 14B, the conveyor belts which are positioned or aligned beneath or under the offset guide members 232a and 232b, in this case conveyor belts 252a and 252e, define larger diameter apertures or holes 256a than the apertures or holes 256b of the conveyor belts which are not positioned under the offset guide members, in this case conveyor belts 252b, 252c and 252d. It should be appreciated that any suitable number of holes, of any suitable diameter and of any suitable shape (such as elongated oval shaped holes) which allows an adequate amount of air flow as described below, may be implemented in accordance with the cup reinforcing apparatus disclosed herein. It should also be appreciated that additional vacuum lines may be employed along the conveyor structure including before the spacer screw, and below part or all of the spacer screw to further maintain the cups in place during the transport and spacing process.

Figure 13:
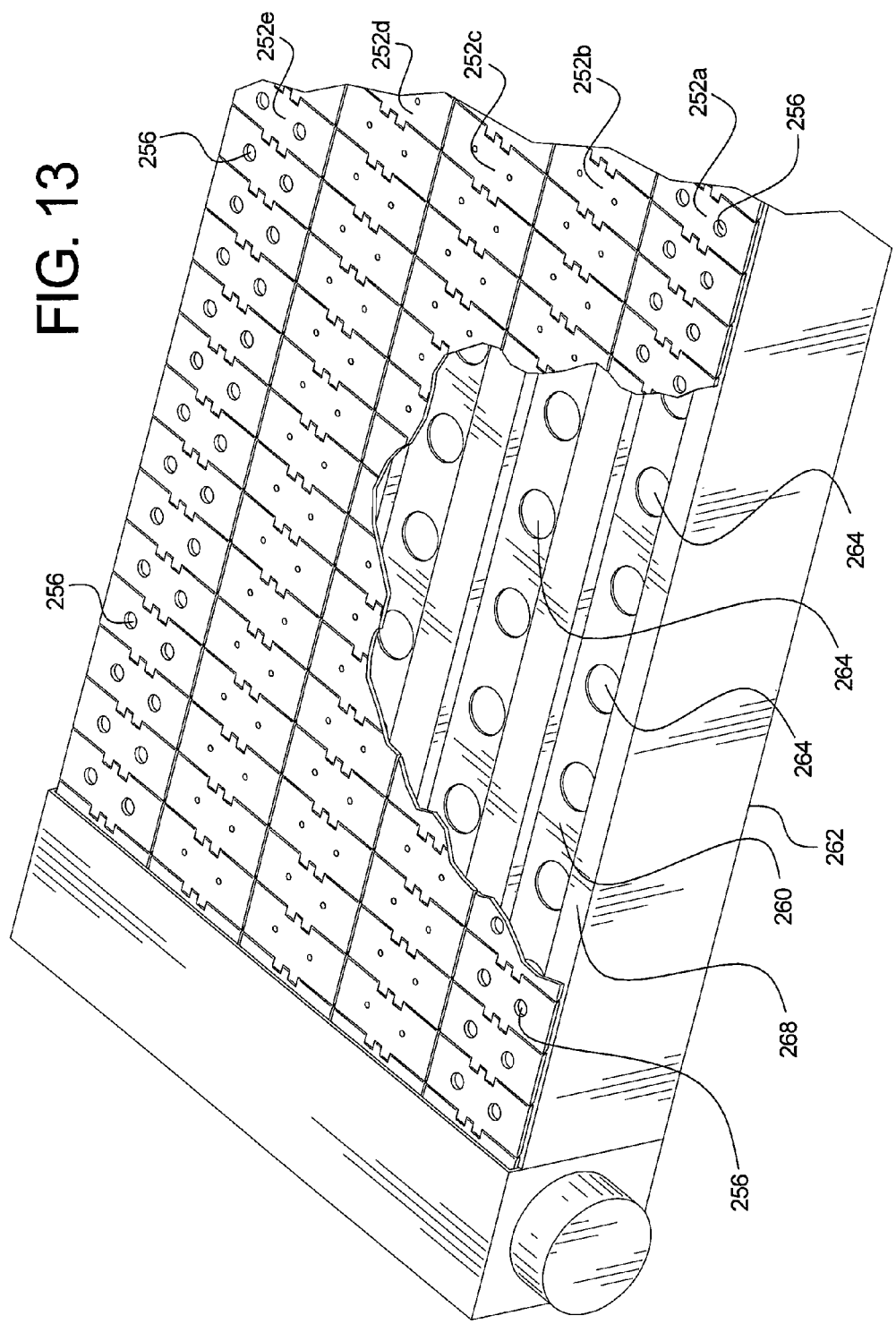
FIG. 13 is a fragmentary perspective view of the vacuum chamber of FIG. 12, illustrating the plurality of adjacent conveyor belts with sections broken away to illustrate the plurality of air inlets.

As illustrated in FIGS. 13, 14A and 14B, the frame 250 of the cup feeder 208 supports a vacuum chamber, box or housing 258. The vacuum box 258 includes a top wall or surface 260 and a spaced apart bottom wall or surface 262. The top wall defines a plurality of apertures or air inlets 264. The vacuum box includes spaced apart side walls 268, wherein the top of each side wall is connected to the top wall and the bottom of each side wall is connected to the bottom wall. The vacuum box also includes spaced apart end walls 270a and 270b, wherein the top of each end wall is connected to the top wall, the bottom of each end wall is connected to the bottom wall, one side of each end wall is connected to one side wall and the other side of each end wall is connected to the other side wall. At least one side wall of the vacuum box (side wall 270a of FIG. 14A and side walls 270a and 270b of FIG. 14B) each defines one or more apertures or air outlets 272 which are connected, via suitable air communication lines, to one or more vacuum or negative pressure sources (not shown). That is, the vacuum chamber is in fluid communication with a suitable vacuum or negative pressure source. In alternative embodiments, additional or different air flow members are employed.

As specifically illustrated in FIG. 14A, the vacuum source provides negative air flow from the area above the conveyor belts 252, through the holes 264 of the conveyer belts, the air inlets 256 of the top surface 260 of the vacuum box and the defined air outlet 272 of the vacuum box to the vacuum source. In operation, each separated base cup is pulled downwardly by the vacuum pressure, in a face down position, from the cup dispenser 206 onto the cup feeder 208. It should be appreciated that positioning the larger apertures 256a of certain of the conveyer belts under the offset guide members 232 of the cup dispenser 206 provides for an increased amount of air to flow from above the conveyor belts 252, through the larger apertures 256a and to the vacuum source (not shown) near the location where the cup dispenser 206 drops the cups 102. It should further be appreciated that vacuum pressure applied to the cups provides that the relatively light-weight base cups (as opposed to a heavier bottle) do not tip over when they are dropped from the cup dispenser 206 to the cup feeder 208.

The cup reinforcing apparatus is configured to move the cups along the conveyor belts at a relatively slow speed when compared to the speeds which bottles are moved though a bottle labeling system. That is, while bottles of a bottle labeling system are typically labeled at approximately one-thousand bottles per minute, the disclosed cup reinforcing apparatus applies reinforcing members to base cups at less than half the rate of such bottle labeling systems. As mentioned above, such a reduction in the speed which the cups are moving through the cup reinforcing apparatus eliminates static electricity buildup often caused by rapid movement of plastic foam cups.

As shown in FIGS. 12 and 14A, the cup feeder 208 includes at least two opposing spaced-apart elongated guide rails or guide tracks 266a and 266b (referred to generally as 266) supported by the frame 250 of the cup feeder. The guide rails 266 are angled offset from a vertical plane at a suitable angle to match the angle of the side walls of the cups transported by the conveyor belts 252. Guide rail 266a and 266b extend in intersecting planes such that the space between the two guide rails 266 is reduced as the guide rails extend out from an area substantially below the cup dispenser 206. In operation, as each cup 102 moves along the conveyor belts 252 of the cup feeder 208 in the direction of the cup spacer 210, each cup engages one of the guide rails 266. As the cups move closer to the cup spacer, the engagement with the guide rails 266 causes the cups to move into a single-file order. It should be appreciated that the cup feeder may include any suitable apparatus or method for transporting the cups from the cup dispenser to the cup spacer.

Figure 15:
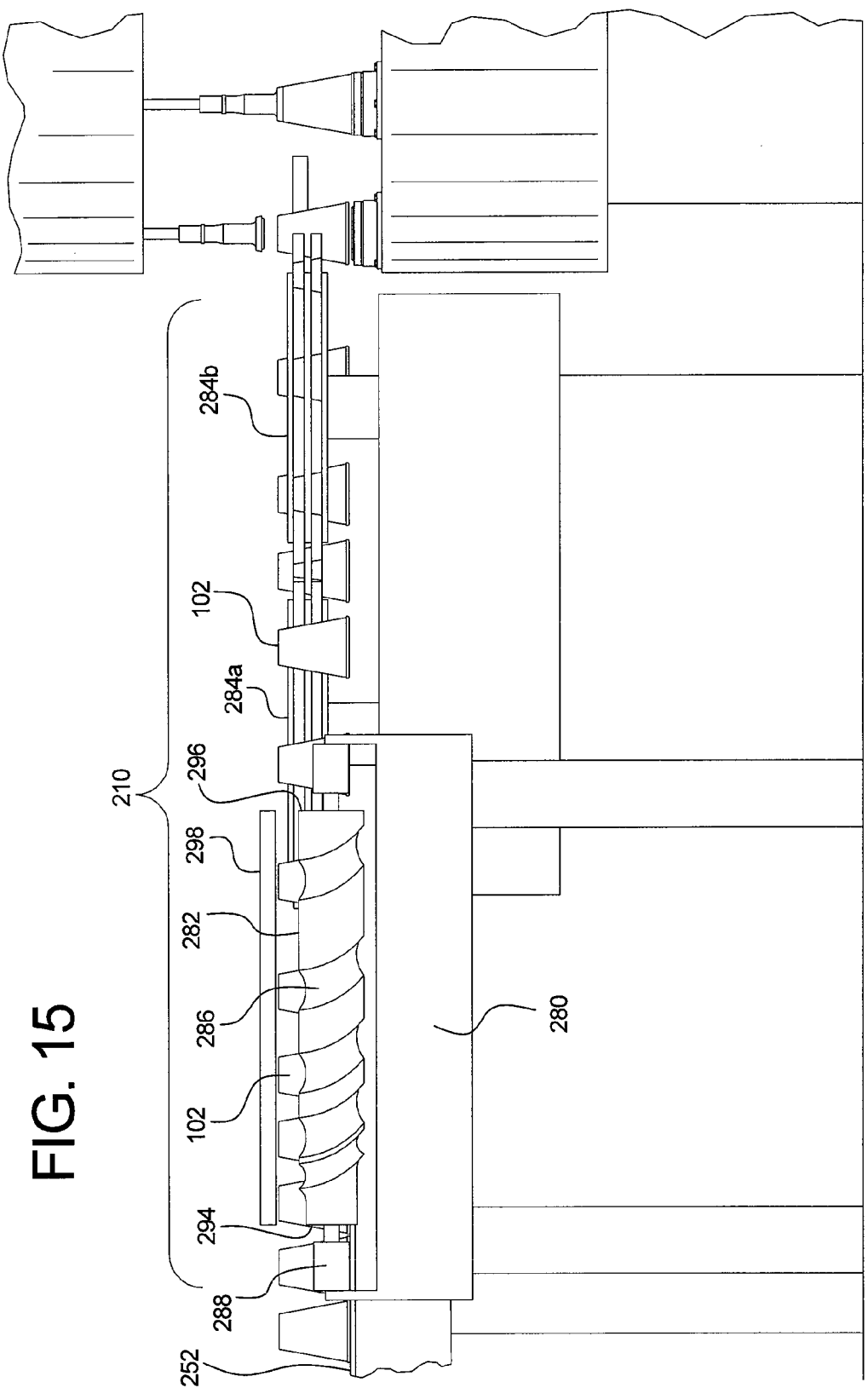
FIG. 15 is a side view of the spacing screw, the in-feed star wheel and a portion of the cup mover of FIG. 8.
Figure 16:
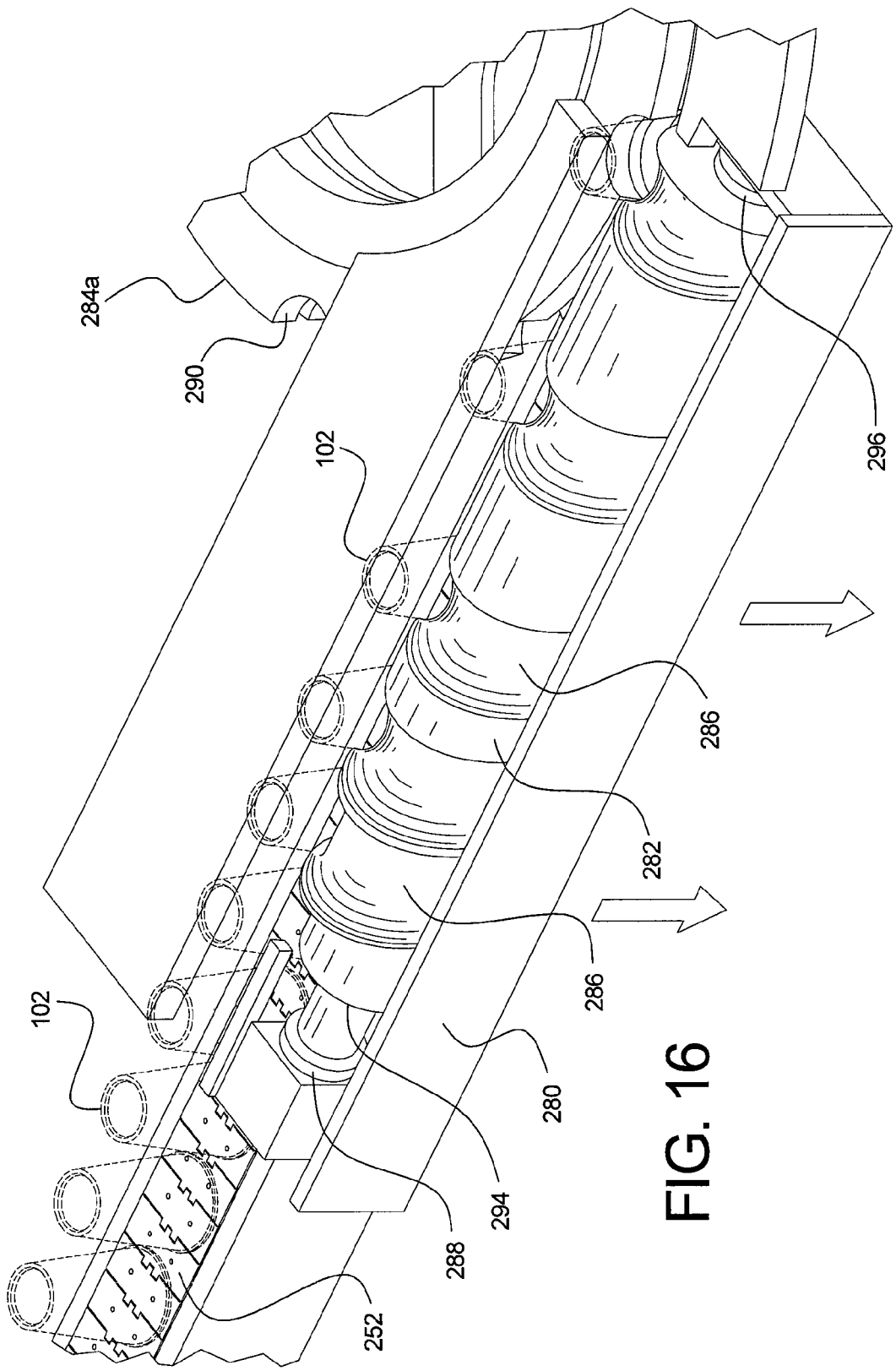
FIG. 16 is a fragmentary perspective view of a portion of the cup feeder, the spacing screw and a portion of an in-feed star wheel of the cup reinforcing apparatus of FIG. 8.
Figure 17A:
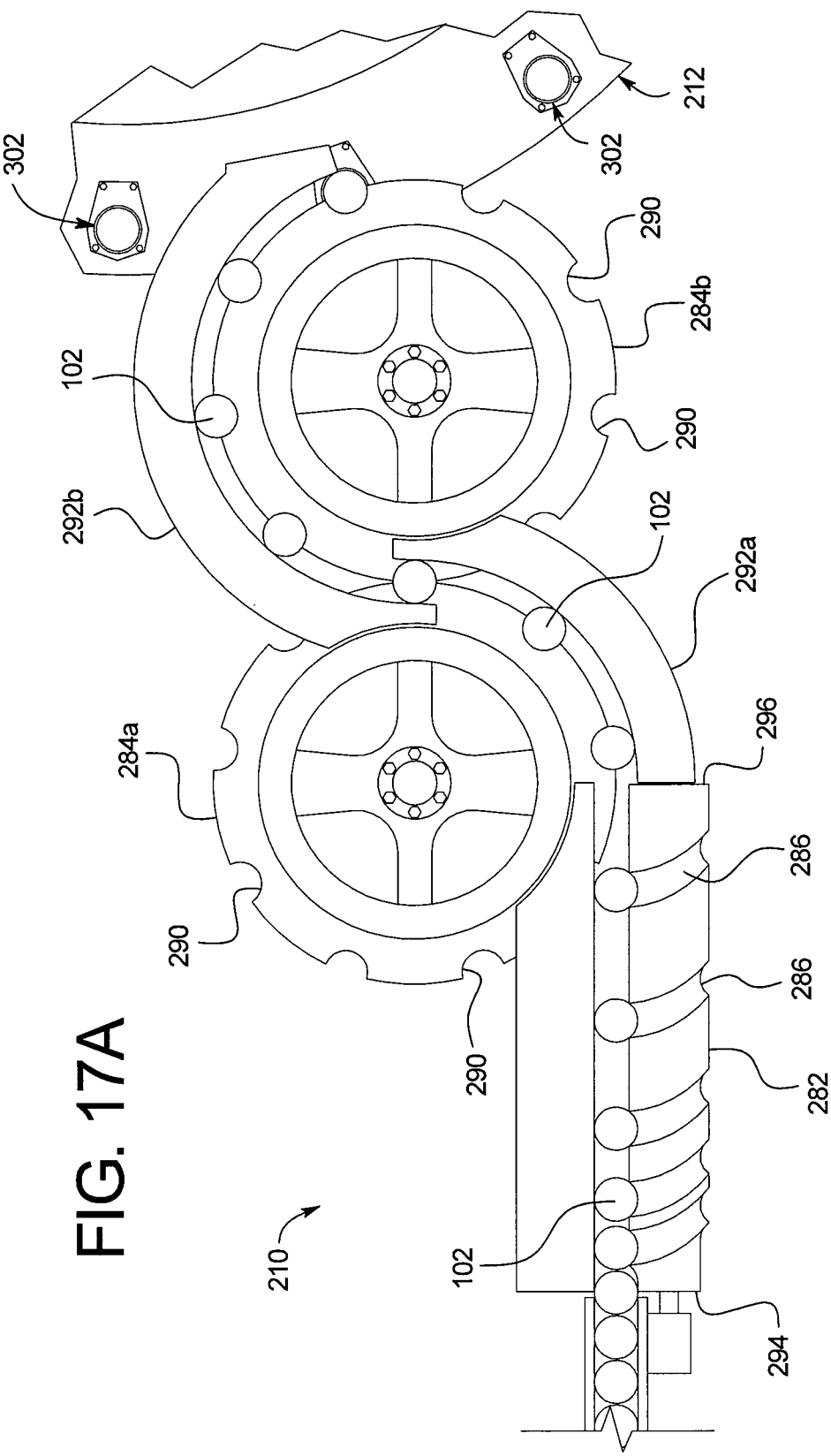
FIG. 17A is a top plan view of a portion of the cup feeder and the cup spacer illustrating the spacing screw and a plurality in-feed star-wheels and a portion of the cup mover of the embodiment of 8.
Figure 17B:
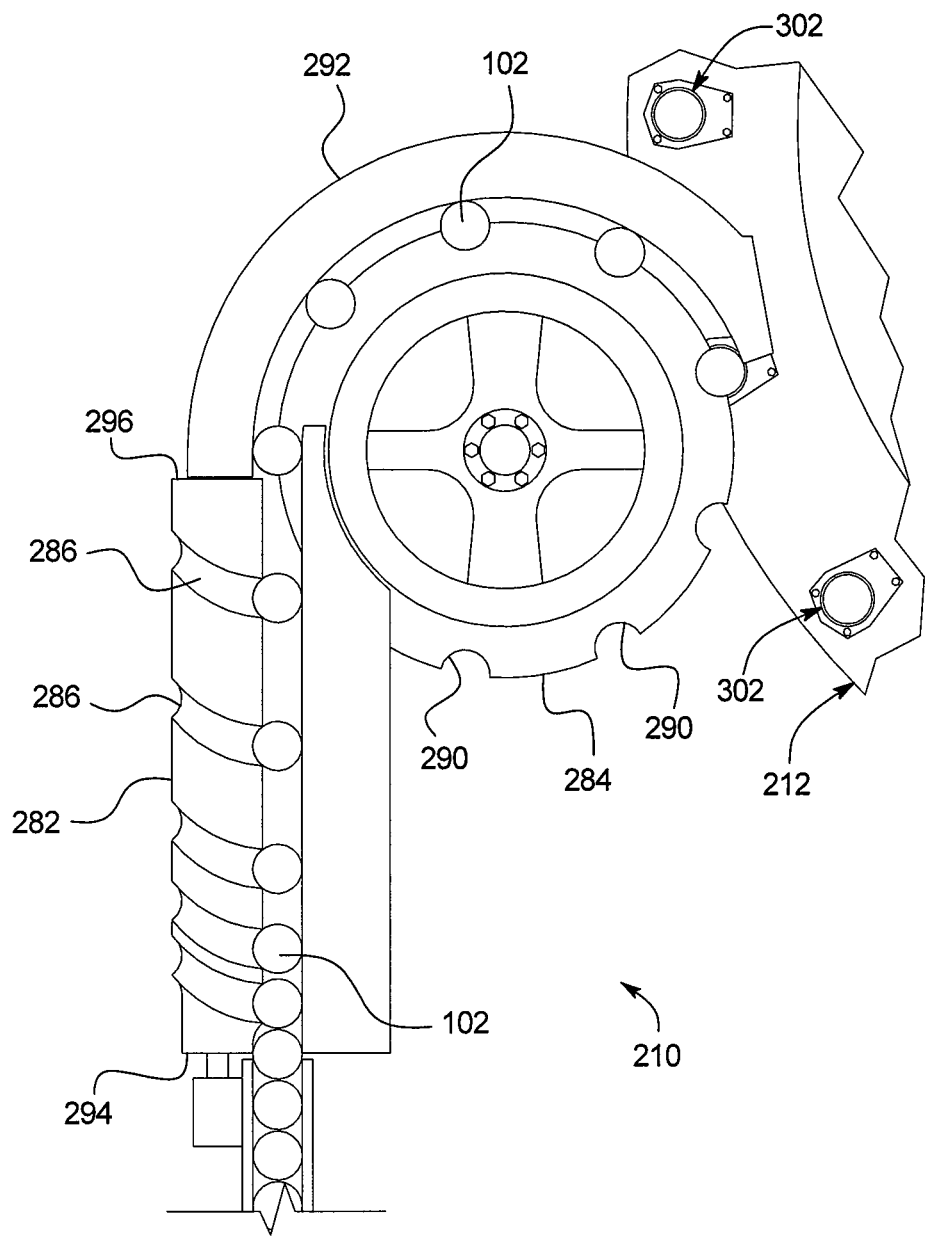
FIG. 17B is a top plan view of an alternative embodiment of a portion of the cup feeder and the cup spacer illustrating the spacing screw and one in-feed star-wheel and a portion of the cup mover.

As illustrated in FIGS. 15 to 17B, the cup spacer 210 of the cup conveyor includes a frame 280 positioned adjacent to and at substantially the same height as the cup feeder 208. As shown in FIG. 17A, the frame of the cup feeder supports an in-feed screw or spacing screw 282 and two co-acting inlet stars or in-feed star-wheel conveyors 284a and 284b (referred to generally as 284). As shown in FIG. 17B, in one alternative embodiment, the frame of the cup feeder supports an in-feed screw or spacing screw 282 and one inlet star or in-feed star-wheel conveyor 284a. In these embodiments, the cup spacer 210 is utilized to transport the each cup 102 from the cup feeder 208 to the cup mover 212.

In the illustrated embodiments, the in-feed screw or spacing screw 282 of the cup spacer 210 is a horizontally or substantially horizontally disposed member made of a suitable smooth surfaced, non-abrasive material with self-lubrication properties, such as any suitable plastic, for example a DELRIN® plastic manufactured by E. I. DU PONT DE NEMOURS AND COMPANY. The spacer screw has internally extending threading 286 on its outer surface. The threading 286 is suitably sized and angled to correlate to the side wall of the cups. As shown in FIGS. 15 and 16, the space between the threads of the spacer screw gradually and consistently increase from a first end 294 of the spacer screw adjacent to the cup feeder 208 to a second end 296 of the spacer screw adjacent to the cup mover 212. The increased spacing between the spacer screw threads provides that as each cup 102 is transported from the first end 294 of the spacer screw to the second end 296 of the spacer screw, each cup (which is engaged by a portion of the threading of the spacer screw) is suitably spaced apart. Such spacing of the cups corresponds to the spacing between each pocket 290 of the first in-feed star wheel 284*a*. In other words, the in-feed screw or spacing screw 282 sequentially separates, regaps or spaces the single-file cups transported by the conveyor belt 252 to establish a separation distance that corresponds to the spacing between the pockets 290 of the first in-feed star-wheel 284*a*. That is, the spacer screw 282 delivers, at the correct intervals, each cup into one of the pockets 290 of the first in-feed star-wheel 284*a*. It should be appreciated that due to the direction of rotation of the spacer screw 282, a cup may be slightly lifted off the conveyor belt as that cup is transported form the first end 294 of the spacer screw to the second end 296 of the spacer screw. Accordingly, a hold down member 298, such as a bar made of any suitable smooth surfaced, non-abrasive material with self-lubrication properties, such as any suitable plastic, for example a DELRIN® plastic manufactured by E. I. DU PONT DE NEMOURS AND COMPANY, is supported by the frame 280 of the cup spacer 210. In this embodiment, if the spacer screw lifts the cup off the conveyor belt, the hold down member 298 engages the bottom of the upside down cup to keep the cup in contact with the threads of the spacer screw. In one embodiment, the spacer screw is movably connected or coupled to at least one actuator 288, such as a motor or other suitable movement generating device controlled by the cup reinforcing apparatus processor which causes the spacer screw to rotate in a suitable direction at any suitable speed in a conventional manner.

Each inlet star 284 of the cup spacer 210 is a horizontally or substantially horizontally disposed circular or substantially circular member made of a suitable smooth surfaced, non-abrasive material with self-lubrication properties, such as any suitable plastic, for example a DELRIN® plastic manufactured by E. I. DU PONT DE NEMOURS AND COMPANY. Each inlet star 284 defines a plurality of pockets 290 suitable spaced around the circumference of that inlet star. The number of pockets is determined based on the size of the cups and the size of the reinforcing members. Each pocket 290 is configured to hold or otherwise engage a cup 102 as the cup is transferred from the cup feeder 208 to the cup mover or turntable 212. Each inlet star is movably connected or coupled to at least one actuator (not shown), such as a motor or other suitable movement generating device controlled by the cup reinforcing apparatus processor which causes that inlet star to move in a suitable direction at any suitable speed in a conventional manner.

Figure 18:
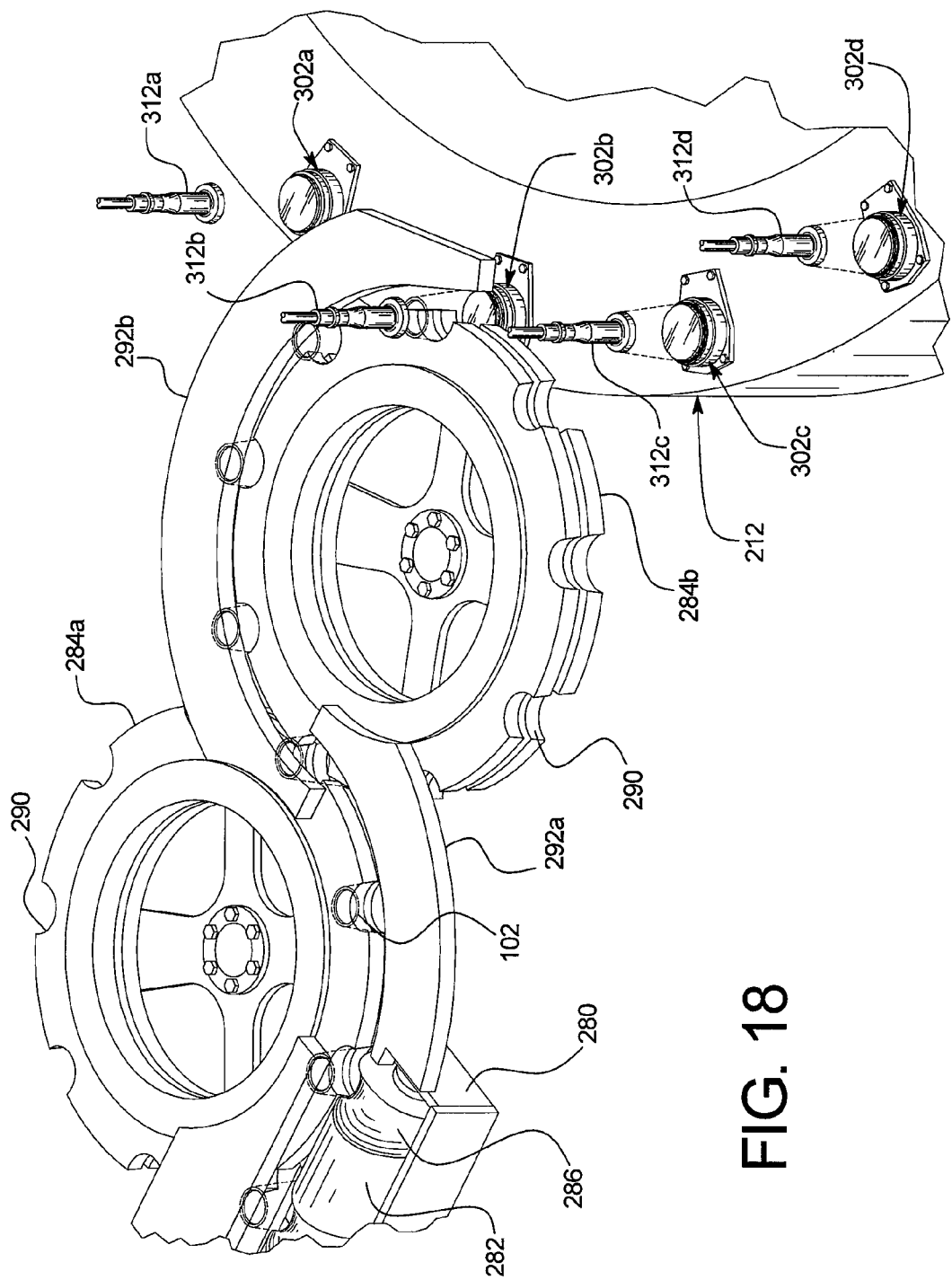
FIG. 18 is a front perspective view of the portion of the cup feeder and the cup spacer illustrating the spacing screw and the plurality in-feed star-wheels and the portion of the cup mover of FIG. 17A.

As illustrated in FIGS. 17A and 18, the frame 280 of the cup spacer supports two inlet star guide members or guide rails 292*a* and 292*b* (referred to generally as 284). Guide rail 292*a* is located adjacent to inlet star 284*a* and guide rail 292*b* is located adjacent to inlet star 284*b*. Each guide rail 292 prevents the cups transported by the inlet stars 284 from becoming displaced, such as by tipping over. The cup guide members are suitably sized and suitably angled offset from a vertical plane to correlate to the cups.

In operation, as shown in FIGS. 17A and 18, each cup 102 is transported from at or near the second end 296 of the spacer screw 282 to a first pocket 290 of the first inlet star 284*a*. The first inlet star 284*a* transports the cup to a second pocket of the second inlet star 284*b*. The second inlet star 284*b* transports the cup, along a horizontally-disposed cup support member 297, to a cup holding station 302 of the cup mover 212 as described below. That is, the pockets of the second inlet star 284*b* and guide rail 292*b* co-act to hold a cup in the proper position and place the cup onto one of the cup holding stations 302 of the cup mover. It should be appreciated that any suitable mechanism or manner for transporting one or more cups from the cup dispenser to the cup mover or turntable may be employed in accordance with the cup reinforcing apparatus disclosed herein.

Figure 19:
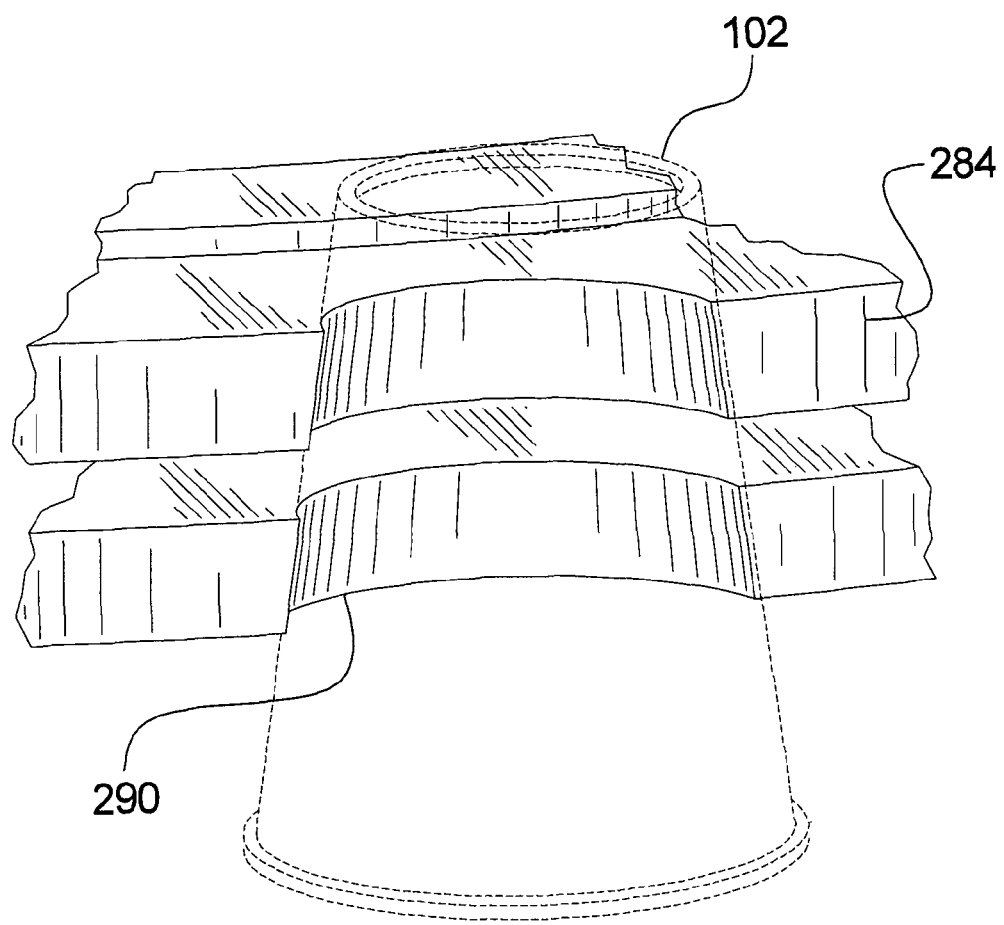
FIG. 19 is a cross-sectional side view of one of the cup pockets of one of the star-wheels of the cup reinforcing apparatus of FIG. 8.

As shown in FIG. 19, the sidewall of each pocket 290 is angled offset from a vertical plane at a suitable angle to match the angle of the side walls of the cup 102. That is, because even relatively small amounts of forces may cause indentions to the outer surfaces of the cup 102, each star-wheel pocket 290 is configured to prevent damaging the relatively fragile surface of the base cups. In other words, unlike the star-wheel pockets of known bottle labeling machines which are designed to transport relatively durable glass bottles, the star-wheel pockets 290 of the cup spacer 210 of the cup reinforcing apparatus disclosed herein is designed to handle the relatively fragile plastic foam cups.

As shown in FIGS. 17A to 21B, the cup mover or cup turntable 212 of the cup conveyor is rotatably supported by a suitable frame 300 positioned adjacent to the cup spacer 210 and at a height slightly below the cup spacer 210. The cup turntable is a horizontally or substantially horizontally disposed cylindrical or substantially cylindrical member made of a suitable smooth surfaced, non-abrasive material with self-lubrication properties, such as any suitable plastic, for example a DELRIN® plastic manufactured by E. I. DU PONT DE NEMOURS AND COMPANY. The cup turntable 212 is movably connected or coupled to at least one actuator (not shown), such as a motor or other suitable movement generating device which causes the turntable to move in any suitable direction at any suitable speed in a conventional manner. In operation, as described above, the cup mover 212 transports each base cup toward the attachment position adjacent to a reinforcing member applicator 400.

The cup mover 212 includes a plurality of individual rotary cup plates or cup holding stations 302*a*, 302*b*, 302*c* and 302*d* (referred to generally as 302) positioned uniformly around the periphery of the cup turntable. Each cup plate or holding station 302 is configured to receive a cup 102 from a pocket 290 of the second inlet star 284*b*. As described above, each cup holding station includes a rotational base 303 operable to rotate a full 360 degrees in clockwise and counterclockwise directions. In another embodiment, each cup holding station is spring loaded and operable to rise to engage the cup transported from the cup spacer and lower to disengage the cup from the cup mover after a reinforcing member has been applied to the cup.

Each cup holding station includes a plurality of suitably shaped and sized walls which frictionally engage the walls of the cup to fix the cup in the suitable position on the cup holding station. In operation, as each cup 102 is placed on a cup plate or holding station, the cup is held in place by a spring biased centering bell 312. Each centering bell is operable to rotate a full 360 degrees in clockwise and counterclockwise directions. It should be appreciated that any suitable manner of holding each cup which provides that the side wall of the cup is free for application of the reinforcing member may be implemented in accordance with the cup reinforcing apparatus disclosed herein.

Figure 21B:
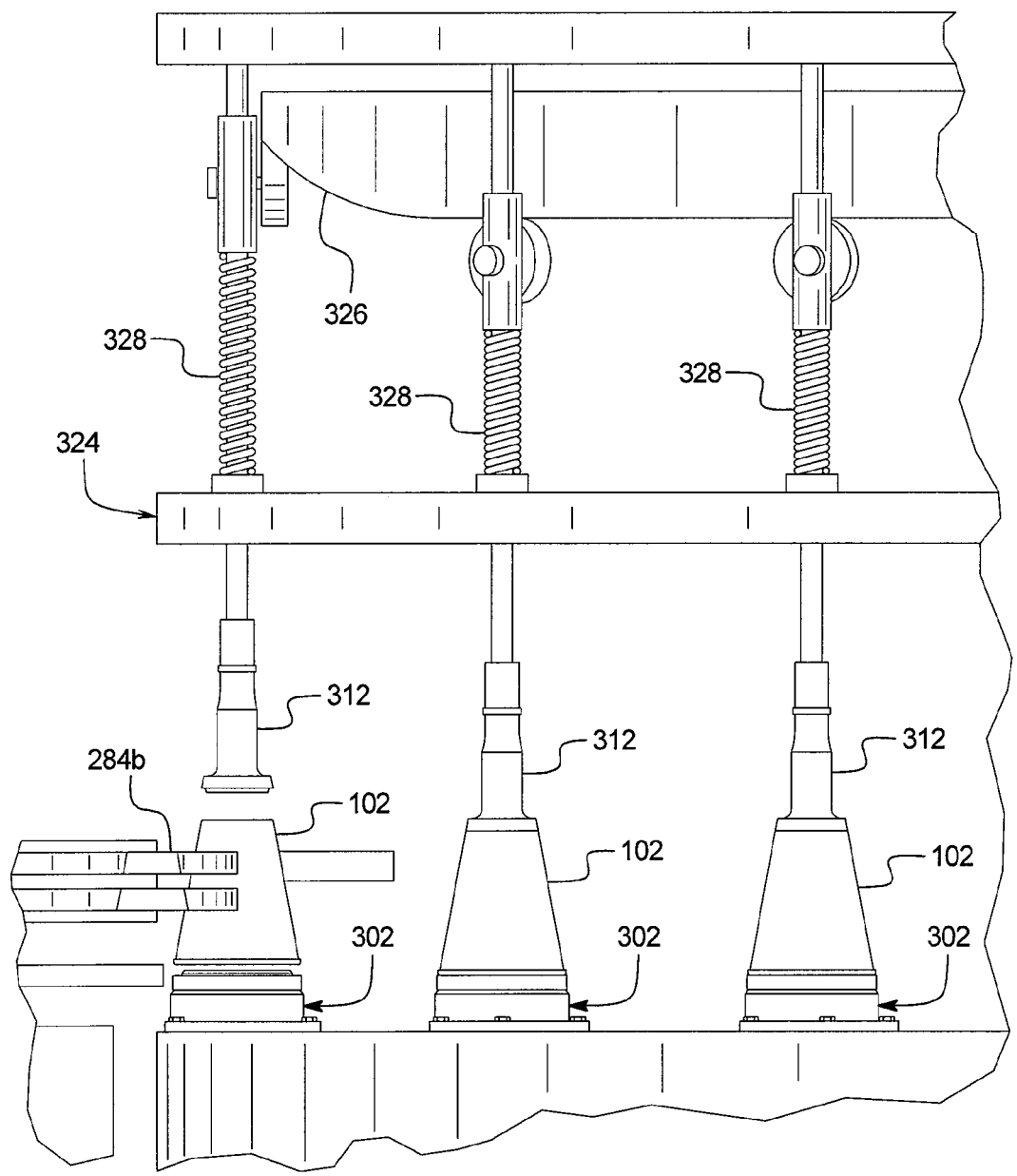
FIG. 21B is a side view of the in-feed star wheel, the cup mover of FIG. 20 and a superstructure which supports the plurality of centering bells.

As best shown in FIG. 21B, each centering bell 312 is supported from a rotatable superstructure 324. The rotatable superstructure includes a cam 326 and a plurality of spring loaded members 328 suitably connected to the plurality of centering bells 312. The spring loaded members are each movably connected or coupled to at least one actuator, such as a motor or other suitable movement generating device which causes each of the spring loaded members to move in a suitable direction at a suitable speed in a conventional manner. In operation, as the plurality of spring loaded members 328 rotate about the cam 326, the shape of the cam causes each spring located member to coil or retract which causes each centering bell to extend to engage a plurality of the walls of the cup or retract to disengage the plurality of walls of the cup. The spring mounted pressure of the centering bells engages the cups with at least enough force to hold the cup as the cup is rotated and with less force than would damage the relatively fragile foam cup. It should be appreciated that any suitable mechanism or mechanisms which cause the centering bells to engage and disengage a plurality of walls of the cup may be implemented in accordance with the cup reinforcing apparatus disclosed herein.

Figure 22:
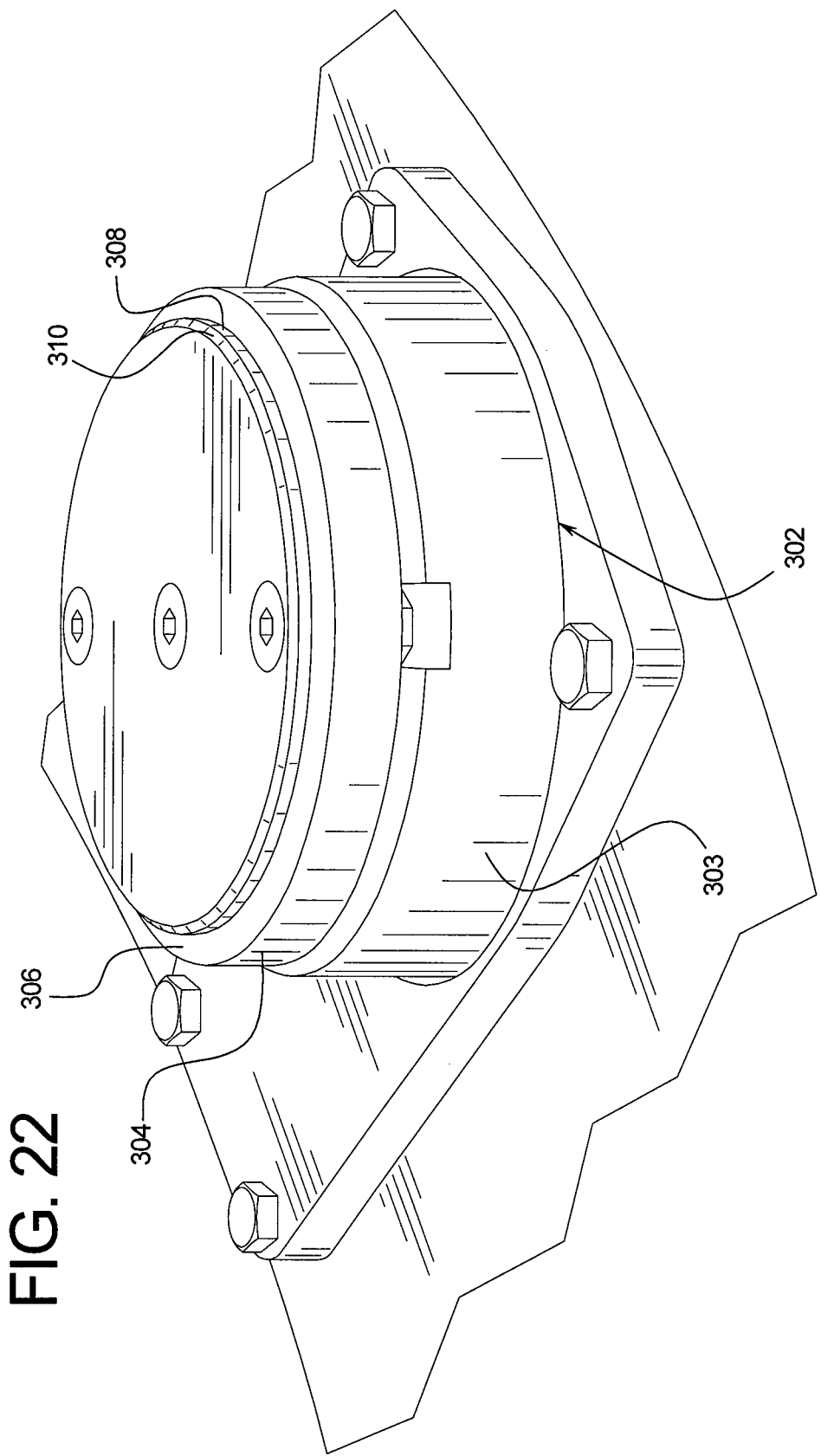
FIG. 22 is a perspective view of the bottom member of one of the cup holding stations of the cup mover of the cup reinforcing apparatus of FIG. 8.
Figure 23:
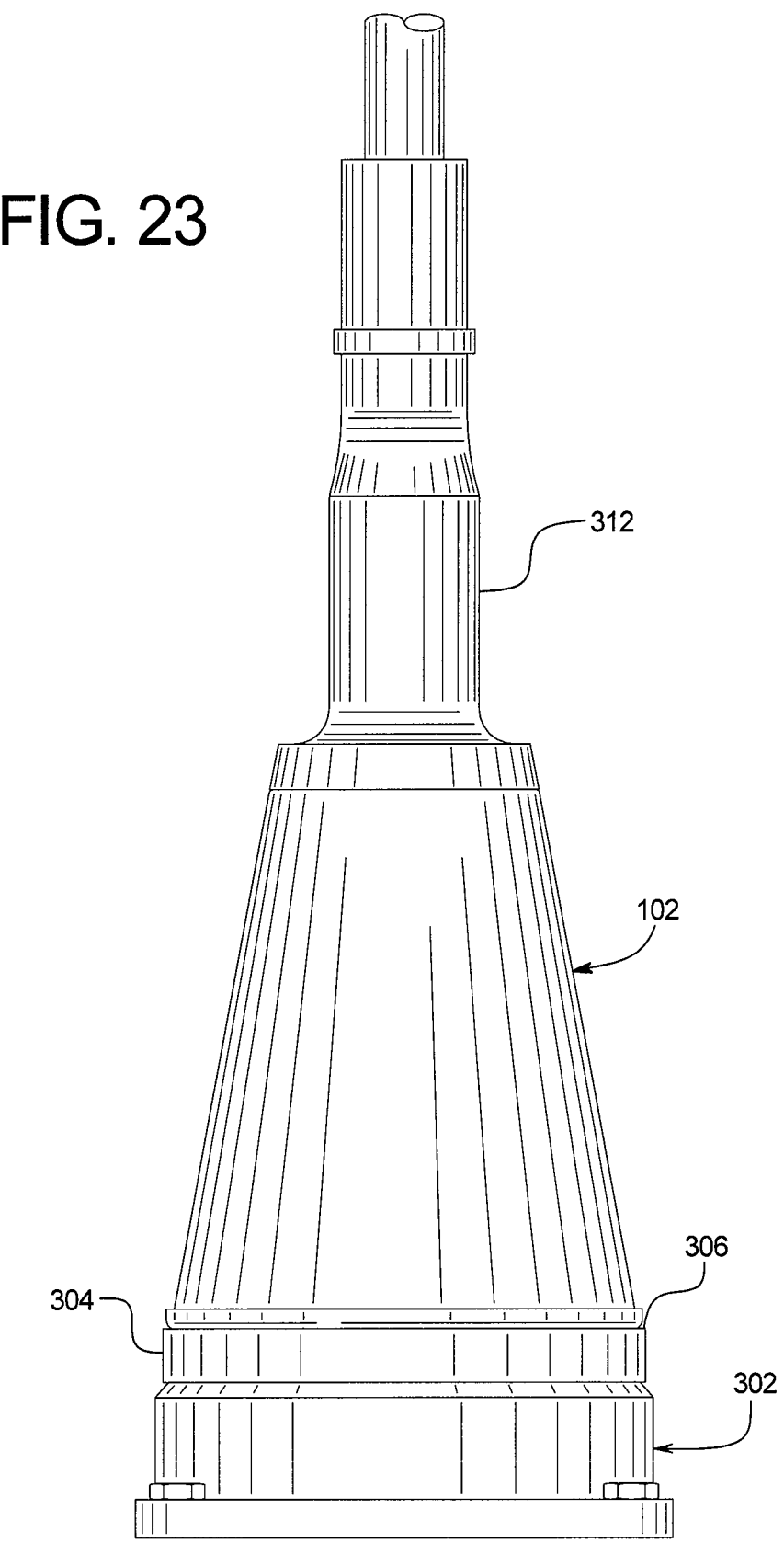
FIG. 23 is a fragmentary side view of a centering bell of the cup holding station engaging a cup which is positioned on the bottom member of the cup holding station of the cup mover of FIG. 8.

As illustrated in FIGS. 22, 23, 24, and 25, the outer wall of each cup holding station 302 is suitably beveled to match and engage the angle of the inner side wall of the top portion of the base cup 102. As best illustrated in FIG. 22, each cup holding station 302 includes a vertically disposed sidewall or cup support 304, a horizontally disposed first wall 306 connected to the sidewall, a vertically disposed second wall 308 connected to the first wall and a beveled third wall 310 connected to the second wall. The first wall 306 of the cup holding station engages the top 330 of the formed lip of the upside down cup and the second wall 308 of the cup holding station engages a top portion 332 of the inner surface of the upside down cup. It should be appreciated that any suitable engagement surface which creates a male-female type connection between the cup holding station and the cup may be implemented with the cup reinforcing apparatus disclosed herein.

In one embodiment, to transport the base cup from the cup spacer to the cup holding stations of the turntable, to account for the height of the frictional engagement members of the holding stations, the turntable is positioned slightly below the cup spacer. Such positioning of the cup mover below the cup spacer enables each transported cup to be placed directly on top of one of the cup holding stations 302 of the cup mover 212. That is, to account for the height of the vertically disposed second wall 308 of the holding stations 302 when transporting each cup 102 from the cup spacer 210 to the cup holding stations 302 of the turntable 212, the turntable is positioned slightly below the cup spacer.

Figure 24:
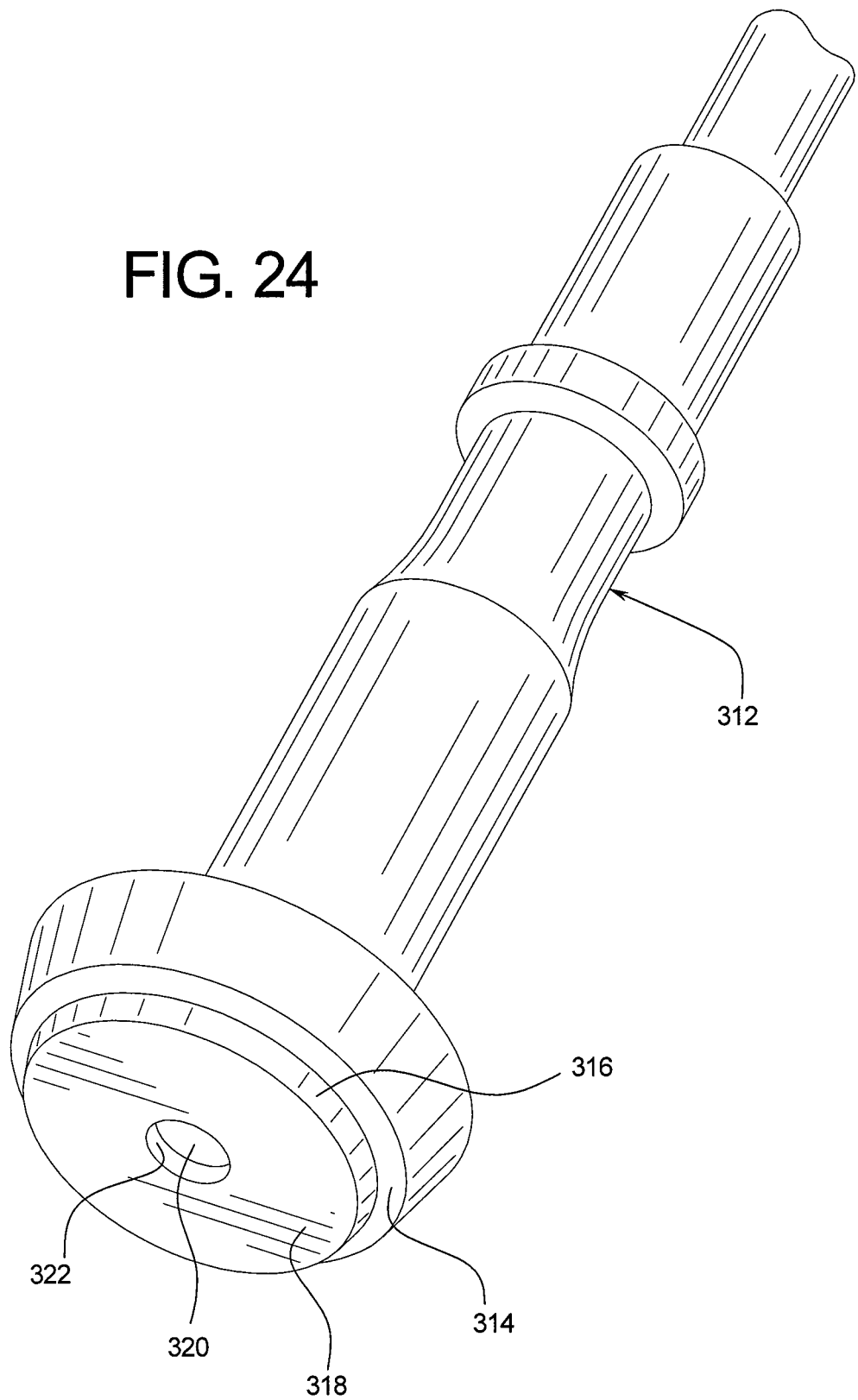
FIG. 24 is a fragmentary perspective view of a centering bell of a cup holding station of the cup mover of FIG. 8.
Figure 25:
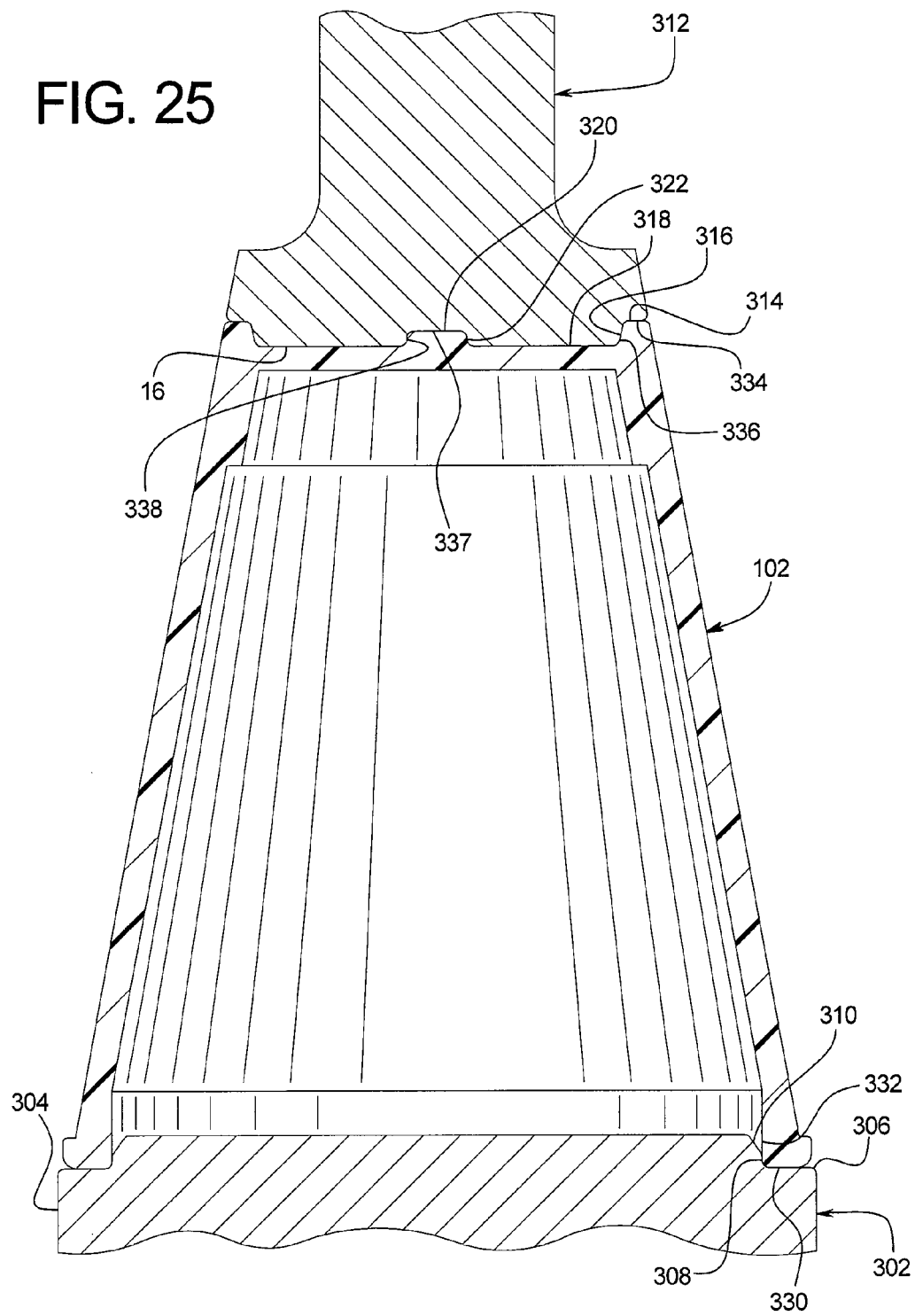
FIG. 25 is a cross-sectional side view of a centering bell of the cup holding station engaging a cup which is positioned on the bottom member of the cup holding station of the cup mover of FIG. 8.

Moreover, the walls of the centering bell are suitably configured to match and engage a plurality of the walls of the cup. As illustrated in FIGS. 24 and 25, a first wall of the centering bell 314 engages the bottom rim 334 of the cup and a beveled second wall of the centering bell 316 engages the angled inner side wall 336 of the cup. In this embodiment, a third wall of the centering bell 318 engages the outer bottom wall 16 of the cup, a fourth wall of the centering bell 320 engages the top surface of a centered raised portion 337 of the outer bottom wall of the cup and a fifth wall of the centering bell 322 engages the side wall 338 of the centered raised portion of the outer bottom wall of the cup. It should be appreciated that any suitable engagement surface which creates a male-female type connection between the centering bell and the cup may be implemented with the cup reinforcing apparatus disclosed herein.

As described above, the cup mover 212 is configured to transport each base cup into a reinforcing member position or location of attachment or engagement. At this position or location of attachment, a reinforcing member is suitably partially attached to the side wall of the cup 102 by the reinforcing member applicator 400 as further described below.

After a reinforcing member is attached to each cup 102, the cup mover 212 transports each reinforced cup to a cup remover 214. As illustrated in FIG. 17A, the cup remover 214 of the cup conveyor 212 includes a frame positioned adjacent to and at substantially the same height as the cup mover 212. The frame 280 of the cup feeder supports two co-acting inlet stars or in-feed star-wheel conveyors 342a and 342b (referred to generally as 342), an out-feed conveyor device 344 and a reinforced cup exhaust device 346. In one embodiment, the cup reinforcing apparatus includes one outlet star or out-feed star-wheel which transports the cups from the cup mover to the out-feed reinforced cup conveyor device.

Each outlet star 342 is movably connected or coupled to at least one actuator (not shown), such as motor or other suitable movement generating device controlled by the cup reinforcing apparatus processor which causes the outlet star to rotate or move in a suitable direction at a suitable speed. Similar to the inlet stars described above, each outlet star 342 includes a plurality of pockets 346 on its circumference. Each pocket 346 is configured to hold a cup 102 as the cup is transferred from the cup mover 212. The sidewall of each pocket 246 is angled offset from a vertical plane at a suitable angle to match the angle of the side walls of the base cups.

The frame of the cup remover 212 supports two outlet star guide members or guide rails 348a and 348b (referred to generally as 348). Guide member 348a is located adjacent to outlet star 342a and guide member 348b is located adjacent to outlet star 342b. Each guide member 348 prevents the cups transported by their respective outlet star 342 from becoming displaced, such as by tipping over. The cup guide members 348 are sized and angled offset from a vertical plane to correlate to the specifications of the reinforced cups. In another embodiment, the cup reinforcing apparatus includes a plurality of inlet stars or in-feed star-wheels which co-act to transport the cup from the cup mover 212 to the out-feed cup conveyor device 344.

The out-feed cup conveyor device 344 is suitably movably connected or coupled to at least one actuator (not shown), such as a motor or other suitable movement generating device which causes the conveyor belts to move at any suitable speed in a conventional manner. The cup remover includes at least two opposing spaced-apart elongated guide rails or guide tracks 350 supported by the frame 340 of the cup remover. The guide rails 350 are angled offset from a vertical plane at a suitable angle to match the angle of the side walls of the cups transported by the out-feed cup conveyor device 344.

Each cup is transported, via the out-feed reinforced cup conveyor device, to a cup positioner, such as a cup tipper or other suitable member, which positions or tips the reinforced cup onto its side (downside leading). The guide rails insure that the tipped cup is positioned on its side. The tipped cup is then vacuum pulled via the cup exhaust system (not shown) to a stack of nested reinforced cups. It should be appreciated that any suitable means or manner for transporting one or more cups from the cup dispenser to the cup mover or turntable may be employed in accordance with the cup reinforcing apparatus disclosed herein.

Turing now to FIGS. 27 to 37, various alternative embodiments of the reinforcing member applicator are illustrated. It should be appreciated that the present disclosure is not limited to these illustrated embodiments.

Figure 27:
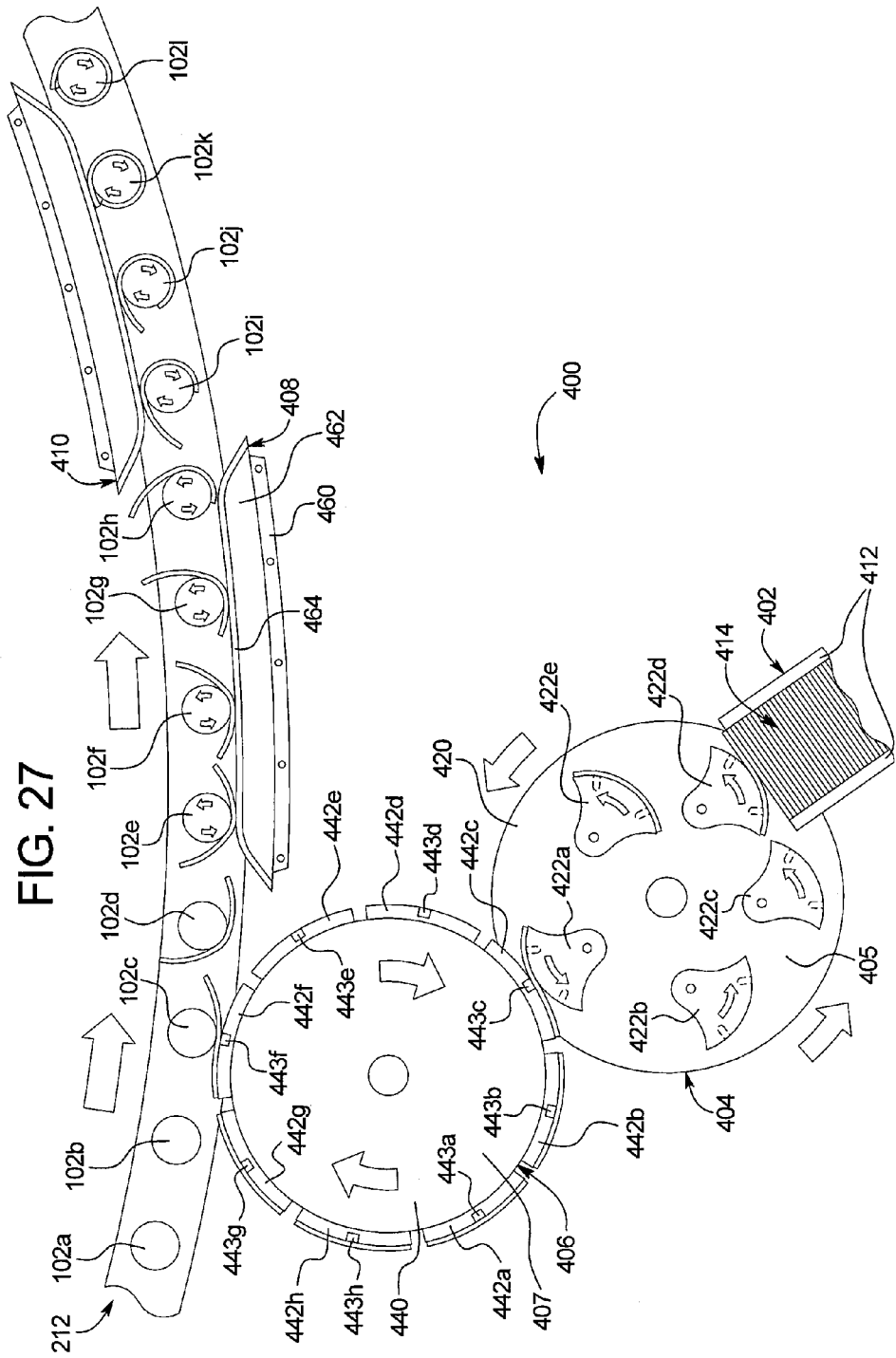
FIG. 27 is a diagrammatic partially fragmentary top plan view of a reinforcing member applicator of one embodiment of the cup reinforcing apparatus disclosed herein.

In the embodiment illustrated in FIG. 27, the reinforcing member applicator 400 includes (a) a reinforcing member supply holder 402, (b) a first reinforcing member mover 404 which includes a plurality of reinforcing member pickers 422a, 422b, 422c, 422d, and 422e, (c) a second reinforcing member mover 406 which includes a plurality of reinforcing member holders 442a, 442b, 442c, 442d, 442e, 442f, 442g, and 442h, (d) a first reinforcing member attacher or attachment pad 408, and (e) a second reinforcing member attacher or attachment pad 410. Generally, the reinforcing member supply holder 402 is configured to hold a plurality of reinforcing members for application to respective cups as further described below. Each of the plurality of reinforcing member pickers 422a, 422b, 422c, 422d, and 422e of the first reinforcing member mover 404 is configured to: (a) remove one of the reinforcing members from the reinforcing member supply holder 402 and (b) move that reinforcing member to a transfer position to transfer that reinforcing member to one of the reinforcing member holders 442a, 442b, 442c, 442d, 442e, 442f, 442g, and 442h of the second reinforcing member mover 406. Each of the reinforcing member holders 442a, 442b, 442c, 442d, 442e, 442f, 442g, and 442h is configured to: (a) receive one of the reinforcing members, (b) heat a central portion of the heat activated adhesive of the reinforcing member it holds, (c) move the reinforcing member it holds into an cup engagement position with one of the cups on the cup mover 212, and (d) transfer the reinforcing member it holds onto that cup such that the reinforcement member is partially attached to the cup, and particularly partially attached to the cup along a central vertical or substantially vertical axis of the reinforcement member. The first reinforcing member attachment pad 408 is configured to heat the heat activated adhesive on one or both of the leading and trailing portions of the reinforcing member and co-act with the cup mover 212 to attach those portions to the cup. The second reinforcing member attachment pad 410 is also configured to heat the heat activated adhesive on one or both of the leading and trailing portions of the reinforcing member and co-act with the cup mover 212 to attach those portions to the cup. Thus, it should be appreciated, that in this illustrated embodiment, the reinforcing member applicator applies heat to respective portions of each reinforcing member in multiple different locations and at sequential points in time.

More specifically, in this illustrated embodiment, the reinforcing member supply holder 402 includes a basket 412 which is partially shown and which is configured to hold a stack 414 of a plurality of individual reinforcing members 42. Each reinforcing member 42 includes an outer surface and an inner surface which is covered with a heat activated adhesive as described above. In this embodiment, the reinforcing members in the basket are positioned with their inner or adhesive surfaces facing the first reinforcing member mover 404 and the reinforcing member pickers 422a, 422b, 422c, 422d, and 422e. It should be appreciated that the basket can be readily refilled and that these reinforcing members are not attached to a release liner (which eliminates the need to dispose of any such release liner). This also enables the cup reinforcing apparatus of the present disclosure, and specifically the reinforcing member applicator, to operate continuously without the need for replacing reinforcing member supply rolls. It should be appreciated that in certain embodiments, the basket will include a suitable biasing mechanism (not shown) to maintain the appropriate pressure on the stacked reinforcing members and to facilitate loading of additional reinforcing members on a regular basis. It should also be appreciated that any suitable basket, magazine or other reinforcing member supply holder may be employed in accordance with the present disclosure.

The first reinforcing member mover 404 in this illustrated embodiment includes a turntable 405 for the plurality of reinforcing member pickers 422a, 422b, 422c, 422d, and 422e and a suitable drive mechanism (not shown). The drive mechanism is configured to move the turntable and each of the pickers. In this embodiment, the reinforcing member pickers are evenly spaced apart on the top of the turntable and each picker is generally bell shaped and includes an accurate or curved front surface for transporting each reinforcing member. In this illustrated embodiment, the turntable 405 is configured to rotate counterclockwise (as indicated by the arrows); however, it should be appreciated that the directions of movement of the entire cup reinforcing apparatus can be reversed and in such case, the turntable 405 would rotate clockwise. Each picker is configured to move into a picking position or location (such as the position of picker 422d) to pick one of the reinforcing members from the basket 412. Each picker is configured to then move into a transfer position or location (such as the position of picker 422a) to transfer the reinforcing member it holds onto one of the reinforcing member holders 442a, 442b, 442c, 442d, 442e, 442f, 442g, and 442h. In this embodiment, the inner or adhesive surface of the reinforcing member faces and is held to the front face of the picker.

Figure 28:
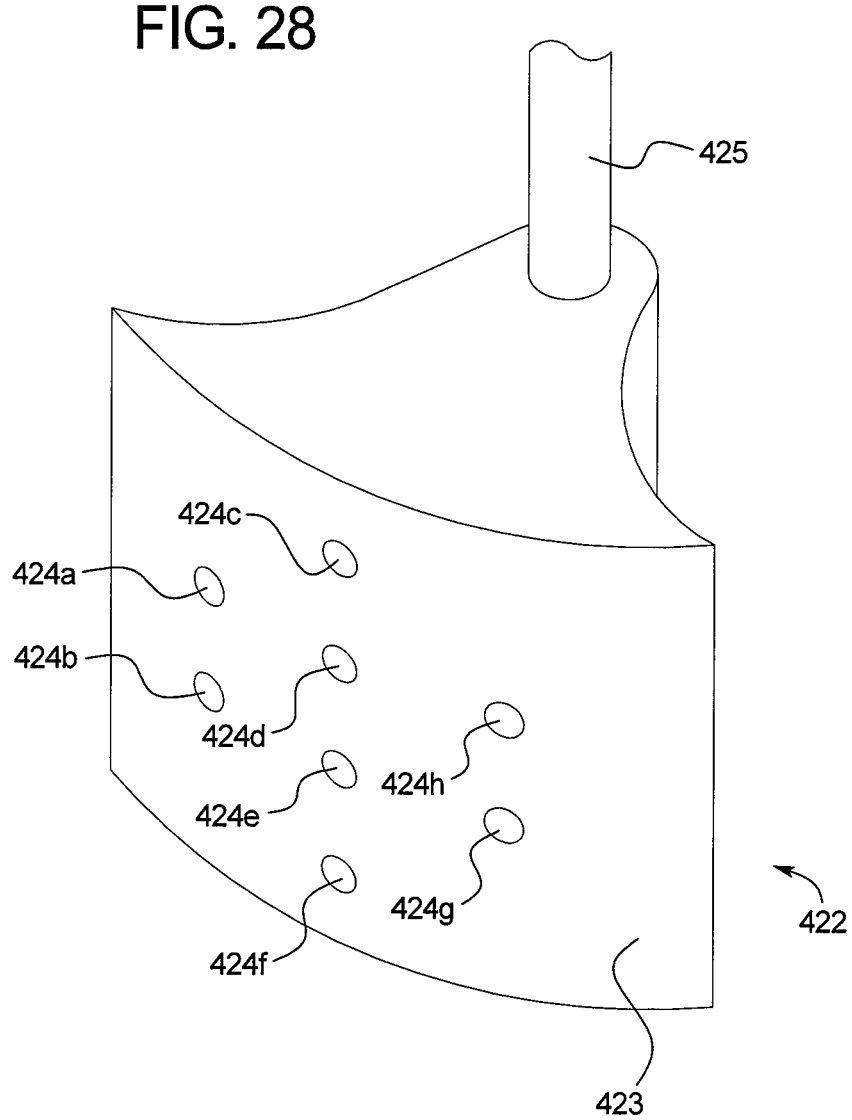
FIG. 28 is a enlarged perspective view of a picker of the reinforcing member applicator of one embodiment of the cup reinforcing apparatus of FIG. 27.

In one embodiment, the reinforcing member applicator 400 includes a suitable vacuum mechanism (not shown) which is connected to mover 404 and specifically to each of the reinforcing member pickers 422a, 422b, 422c, 422d, and 422e. This enables each picker to lift a reinforcing member from the basket and to transfer it to a respective reinforcing member holder. It should be appreciated that such a vacuum mechanism will cause suction or negative air pressure at the front face of the picker when the picker is lifting the reinforcing member from the basket and when the picker is holding the reinforcing member, but will provide less or no suction or negative air pressure at the front face of the picker when the picker is transferring the reinforcing member to the respective reinforcing member holder. FIG. 28 illustrates an example picker 422 which includes a front face 423 which defines a plurality of air holes or air channels 424a, 424b, 424c, 424d, 424e, 424f, 424g, and 424h. It should be appreciated that the quantity and positioning of the channels may vary and in particular may vary with the size, shape, and weight of the reinforcing members. The picker 422 is also shown having an axle 425 which in part controls movement or rotation of the picker. It should be appreciated that the shape or configuration of the pickers can vary. It should be appreciated that other suitable mechanisms may be employed to grab, hold, and release the reinforcing members in accordance with the present disclosure.

The second first reinforcing member mover 406 in this illustrated embodiment includes a turntable 407 for the plurality of reinforcing member holders 442a, 442b, 442c, 442d, 442e, 442f, 442g, and 442h and a suitable drive mechanism (not shown). The drive mechanism is configured to move the turntable. In this embodiment, the holders are evenly spaced apart on the outer circumferential side wall of the turntable and each holder includes an accurate or curved surface for transporting a reinforcing member. In this illustrated embodiment, the turntable 407 is configured to rotate clockwise (as indicated by the arrows); however, it should be appreciated that the directions of movement of the entire cup reinforcing apparatus can be reversed and in such case, the turntable 407 would rotate counterclockwise. Each holder is configure to move into a first receiving transfer position or location (such as the position of holder 442c) to receive one of the reinforcing members from one of the pickers. Each holder is configure to be moved by the turntable 407 into a second transfer position or location (such as the position of holder 442f) to transfer the reinforcing member it holds onto one of cups such as cup 102c on the cup conveyor 210. In this embodiment, the outer or non-adhesive surface of the reinforcing member faces and is held to the front face of the holder.

In one embodiment, the reinforcing member applicator 400 includes a suitable vacuum mechanism (not shown)

which is connected to mover 406 and specifically to each of the holders 442a, 442b, 442c, 442d, 442e, 442f, 442g, and 442h. This enables each holder to receive a reinforcing member from one of the pickers and to transfer it to a cup. It should be appreciated that such a vacuum mechanism will cause suction or negative air pressure at the front face of the holder when the holder receives the reinforcing member from one of the pickers and when the holder is holding the reinforcing member, but will provide less or no suction or negative air pressure at the front face of the holder when the holder is transferring the reinforcing member to the respective cup. It should be appreciated that other suitable mechanisms may be employed to hold the stack of reinforcing members and to release each of the reinforcing members.

Each of the reinforcing member holders 442a, 442b, 442c, 442d, 442e, 442f, 442g, and 442h respectively includes first type of heaters or heating elements 443a, 443b, 443c, 443d, 443e, 443f, 443g, and 443h as illustrated in FIG. 27. Each heater or heating element of each holder is preferably configured to heat a central vertically or substantially vertically extending portion of the heat activated adhesive on the reinforcing member held by that holder when or shortly after that reinforcing member is received until the time that reinforcing member is transferred to a cup or to a time just prior to the transfer. Preferably, each heater or heating element is temperature controlled or maintained and can be set by the operator. For example, each heater or heating element can be an electrical contact heater, a ceramic heater, or a metal heater. It should be appreciated that the heater or heating element heats the central portion of the outer surface of the reinforcing member (because the outer or non-adhesive surface of the reinforcing member faces and is held to the front face of the holder), and the heat is transferred through the reinforcing member to the heat activated adhesive on the respective central portion of the inner or adhesive surface of the reinforcing member. This prevents the heated adhesive from sticking to the holder.

This initial application of heat is sufficient to activate the adhesive at the central portion of the reinforcing member such that the adhesive becomes tacky enough to adhere to the cup (i.e., has adequate shear strength to maintain the position at the time of application to the cup), but not enough to fully activate the adhesive such that the reinforcing member is allowed to move or rotate relative to the cup due to a decrease in adhesive shear strength (i.e., acts like a lubricant). More specifically, as the adhesive is further activated above the initial temperature and the temperature is increased, the shear strength of the adhesive decreases. At the temperature and dwell time for maximum final bond strength of the adhesive, if only a central portion of the reinforcing member is attached to the cup, the reinforcing member can move or rotate relative to the cup. In other words, at maximum bonding temperature, the adhesive can act as a lubricant in the worst case. That is why the present disclosure employs a lower temperature/time dwell combination to make the adhesive tack for center line transfer of the reinforcing member to the cup and then in a secondary operation applies more heat and/or time to fully activate the adhesive as further described below. An example expected curve for bond strength of a suitable heat activated adhesive used in accordance with the present disclosure is illustrated in FIG. 27B. This example expected curve shows how bond strength varies with heating or temperature. This example expected curve shows the tension force required to pull the reinforcing member away from the cup for each temperature setting at a constant dwell time. Note that this example illustrates the force after the adhesive has been set (cooled down and returned to a solid state).

Each holder transfers the respective reinforcing member that holder holds onto a respective cup at the second transfer position or location (such as the position of holder 442f) such that the reinforcement member is partially attached to the cup (such as cup 102c), and particularly partially attached to the cup along a central vertical or substantially vertical axis of the reinforcement member. It should be appreciated that the heating elements may be selectively activated (i.e., turned on and off) to heat the desired portions of the adhesive on the reinforcing member to the desired temperature and without heating the cup.

It should be appreciated that the first reinforcing member mover 404, the second reinforcing member mover 40 and the cup turntable 212 are suitably synchronized to facilitate picking of the reinforcing member from the reinforcing members supply and the multiple transfers of the reinforcing members.

The reinforcing member applicators or application pads 408 and 410 of the reinforcing member applicator 400 of this illustrated embodiment are positioned adjacent to the transfer position to facilitate attachment of the leading and trailing portions of the reinforcing member (which is partially attached to cup along the vertical central line axis of the reinforcing member) to the cup. Each reinforcing member application pad is suitably positioned, shaped and sized to accommodate the size and shape of the cups. More specifically, reinforcing member application pad 408 includes a base 460, a second type of heater or heating element 462, and a reinforcing member engaging surface 464. This second type of heater or heating element is preferably different than the first type of heating element. In one embodiment, the heater or heating element 462 includes an operator settable temperature controlled or maintained elongated heater such as a flexible ceramic or silicone heating pad. The reinforcing member engaging surface 464 includes any suitable material with anti-adhesion properties, such as a polytetrafluoroethylene or Teflon® coated tape, which resists adherence by the adhesive coated on the reinforcing member. In certain embodiments, certain portions of the attachment pad such as the initial or front portion and/or the rear portion may not be heated or provide one or more cooling zones to control the exact amount of heat applied to each reinforcing member and cup to exactly control heat and to prevent misalignments and wrinkles.

The heating element 462 is configured to heat the leading and trailing portions of the outer surfaces of the reinforcing member as the cup is rotated as shown in FIG. 27. The heat is transferred through the reinforcing member to the heat activated adhesive on the respective portions of the inner or adhesive surface of the reinforcing member. This prevents the heated adhesive from sticking to the reinforcing member application pad 408. The heating of the adhesive on these portions and the attachment of these portions are preformed simultaneously while rotating the cup and reinforcing members. The heating elements of the attachment pad heat the adhesive to the desired temperature to fully activate the adhesive attachment to the cup. As seen in the example curve in FIG. 27B, the adhesive on the entire reinforcing member is preferably heated to a full bond strength for the particular adhesive by the attachment pads. It should be appreciated that the exact amount of heat applied by each attachment pad will vary as a function of the particular adhesives, the size of the cup, the size and thickness of the reinforcing member, the length of each attachment pad, the rotation speed of the cup, and the speed of the movement of the cup relative to the attachment pads. For example, the faster the cup moves past the application pads, the greater the amount of heat needed to cause the adhesive to reach the desired full bond strength temperature.

FIG. 27 illustrates one rotation pattern for the cup. In this rotation pattern, after the reinforcing member is centrally attached to the cup, the cup is: (a) rotated counterclockwise while engaging attachment pad 408 to attach the trailing portion of the reinforcing member to the cup, and (b) then rotated clockwise while engaging attachment pad 410 to attach the leading portion of the reinforcing member to the cup. It should be appreciated that other suitable rotation patterns may be employed in accordance with the present disclosure.

For example, in one embodiment, a first partial rotation (of 10 degrees to 20 degrees) of the cup to attach the leading edge reduces the length of the unattached reinforcing member and reduces the possibility that at least one of the edges of the reinforcing member from the first cup will interfere with the attachment of the reinforcing member on a cup to a second, subsequently reinforced cup. Such a first rotation further secures the reinforcing member to the base cup by providing that an area of the reinforcing member greater than the central portion of the reinforcing member is attached to the base cup. It should also be appreciated that the directions of movement of the entire cup reinforcing apparatus can be reversed and in such case, the placement of the attachment pads and rotations would be reversed. It should be further appreciated that each cup may be rotated at a desired speed (such as slowly) to maximize engagement with the attachment pads, transfer of the heat, and activation of the adhesive.

It should be appreciated that the reinforcing member application pads 408 and 410 may not fully heat all of the heat activated adhesive on the reinforcing member to the desired temperature when the reinforcing member is fully wrapped around the cup. To address this, the cup (with the reinforcing member fully wrapped around it) can be rotated one or more additional times when in engagement with reinforcing member application pad 410 to cause sufficient heating or activation of the heat activated adhesive on the reinforcing member. It should also be appreciated that additional reinforcing member application pads may be employed in accordance with the present disclosure.

It should be appreciated that each reinforcing member attachment pad and in particular the reinforcing member engaging surface applies the needed pressure on each reinforcing member and each cup as that wrapped cup moves by the reinforcing member attachment pad to facilitate proper attachment and to function to wipe down the reinforcing member to make sure that the reinforcing member is smoothly attached to the outer surface of the side wall of the cup. Thus, it should be appreciated that to achieve the desired slight pressure (but not too much pressure on the reinforcing member and cup) a flexible or spongy-type attachment pad may be employed, and that in other alternatives a spring biased or loaded application pad may be employed.

Although not shown, it should be appreciated that each reinforcing member application pad is suitably angled to align with the angled side wall of the cup. More particularly, the engaging surface of the application pad will preferably be positioned or angled parallel or substantially parallel with the sidewall of the cup. It should also be appreciated that the height and angle of the reinforcing member application pads may be suitably adjusted to accommodate the shape and size of the cups. It should also be appreciated that different shape, length and angled attachment pads may be employed in accordance with the present disclosure.

Although not shown, it should be appreciated that the reinforcing member supply holder 402, the first reinforcing member mover 404 and the second reinforcing member mover 406 of the reinforcing member applicator 400 will be supported by one or more suitable supports, frames, or bases. In one embodiment, the support, frame or base is adjustable.

As described above, the reinforcing member applicator 400 is configured to pick up each reinforcing member from a stack of reinforcing members and move that reinforcing member to engagement with a respective cup at a suitable angle offset form a vertical plane which corresponds with the angle (also offset from a vertical plane) of the side wall of the cup. The adjustable base of the reinforcing member applicator is suitably angled offset from a vertical plane. The angle which the adjustable base of the reinforcing member applicator is at may be adjusted (via a suitable angle adjustment mechanism) to accommodate for different base cups with different angled side walls. In addition to adjusting the angle of the reinforcing member applicator offset from a vertical plane, the height of the adjustable base of the reinforcing member applicator may be adjusted (via a suitable height adjustment mechanism) to accommodate for different sized cups and variances in different reinforcing members positioning on the liner. Moreover, the angle which the adjustable base of the reinforcing member applicator is at may be adjusted offset from a horizontal plane if necessary. Accordingly, it should be appreciated that the reinforcing member applicator may be individually adjusted in three separate planes to facilitate a proper attachment of a reinforcing member to the sidewall of a cup. In alternative embodiments, the reinforcing member applicator may be adjusted to any suitable angle in any suitable plane or number of planes to facilitate a proper attachment of a reinforcing member to the side wall of a cup.

It should be appreciated that the first reinforcing member attachment pad 408 and the second reinforcing member attachment pad 410 of the reinforcing member applicator 400 will also be supported by one or more suitable structures, frames or bases (not shown).

It should be appreciated that in alternative embodiments, some of which are discussed below, other apparatus for moving the reinforcing members, selectively heating the designated portions of the heat activated adhesive on each of the reinforcing members, and attaching each of the portions of the reinforcing to the respective cups can be employed in accordance with the present disclosure.

Figure 27A:
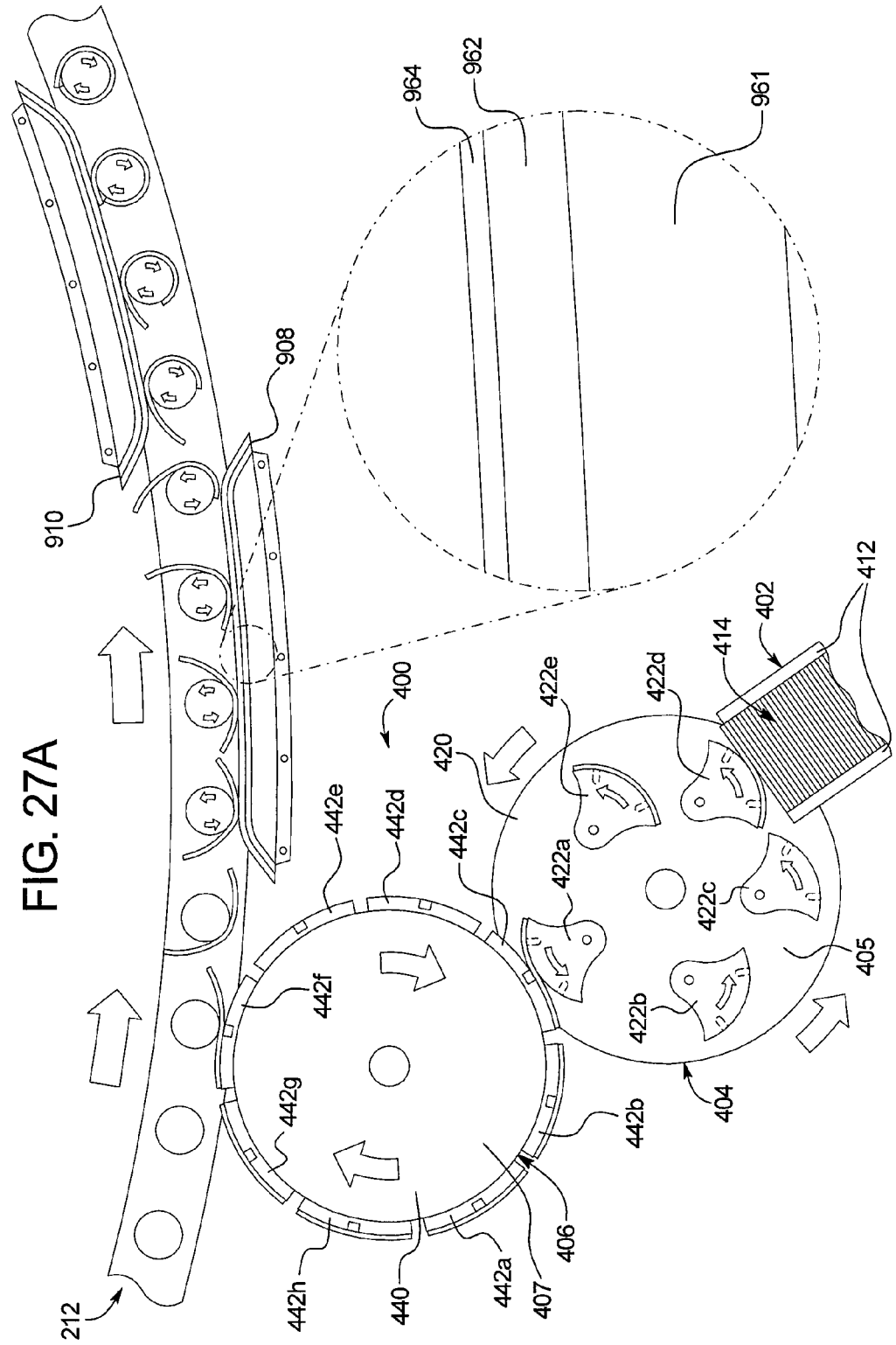
FIG. 27A is a diagrammatic partially fragmentary top plan view of a reinforcing member applicator of an alternative embodiment of the cup reinforcing apparatus of FIG. 27.
Figure 29A:
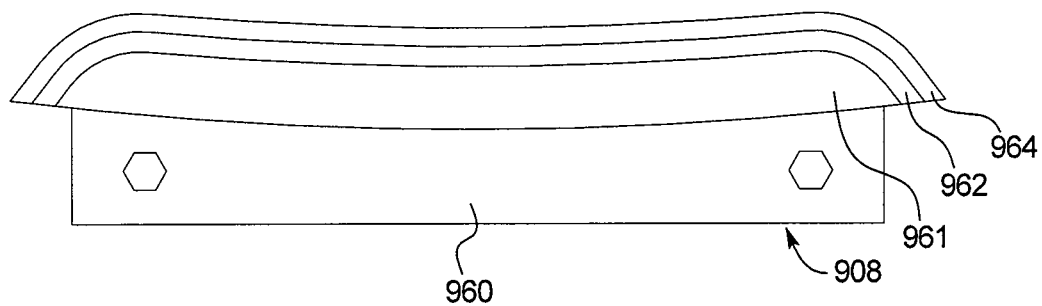
FIG. 29A is an enlarged diagrammatic top plan view of the reinforcing member application pad of the reinforcing member applicator of FIG. 27A.

Turing now to FIGS. 27A and 29A, one alternative embodiment of the first reinforcing member attachment pad 408 and the second reinforcing member attachment pad 410 is illustrated. In this embodiment, each reinforcing member attachment pad 908 includes a base 960, a biasing member 961, a flexible heating pad 962, and a reinforcing member engaging surface 964. The biasing member 961 includes a flexible silicon sponge in one embodiment, although it should be appreciated that this biasing member can be made from other suitable materials or constructions. The reinforcing member engaging surface 964 is a polytetrafluoroethylene or Teflon® layer to reduce friction, although it should be appreciated that this surface can be made from other suitable materials and in other forms. In this embodiment, the biasing member helps to maintain a sufficient amount of pressure on the cup and reinforcing member without exerting too much pressure which would damage those components.

Figure 29B:
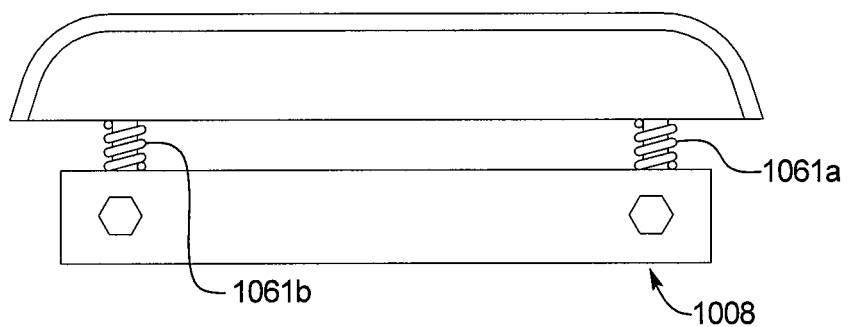
FIG. 29B is a enlarged diagrammatic top plan view of a further alternative embodiment of a reinforcing member application pad of one embodiment of the cup reinforcing apparatus disclosed herein.

In a further alternative embodiment of the reinforcing member attachment pad illustrated in FIG. 29B, the reinforcing member attachment pad 1008 includes a plurality of spring biasing members 1061A and 1061B employed to bias the reinforcing member attachment pad 1008.

Figure 30:
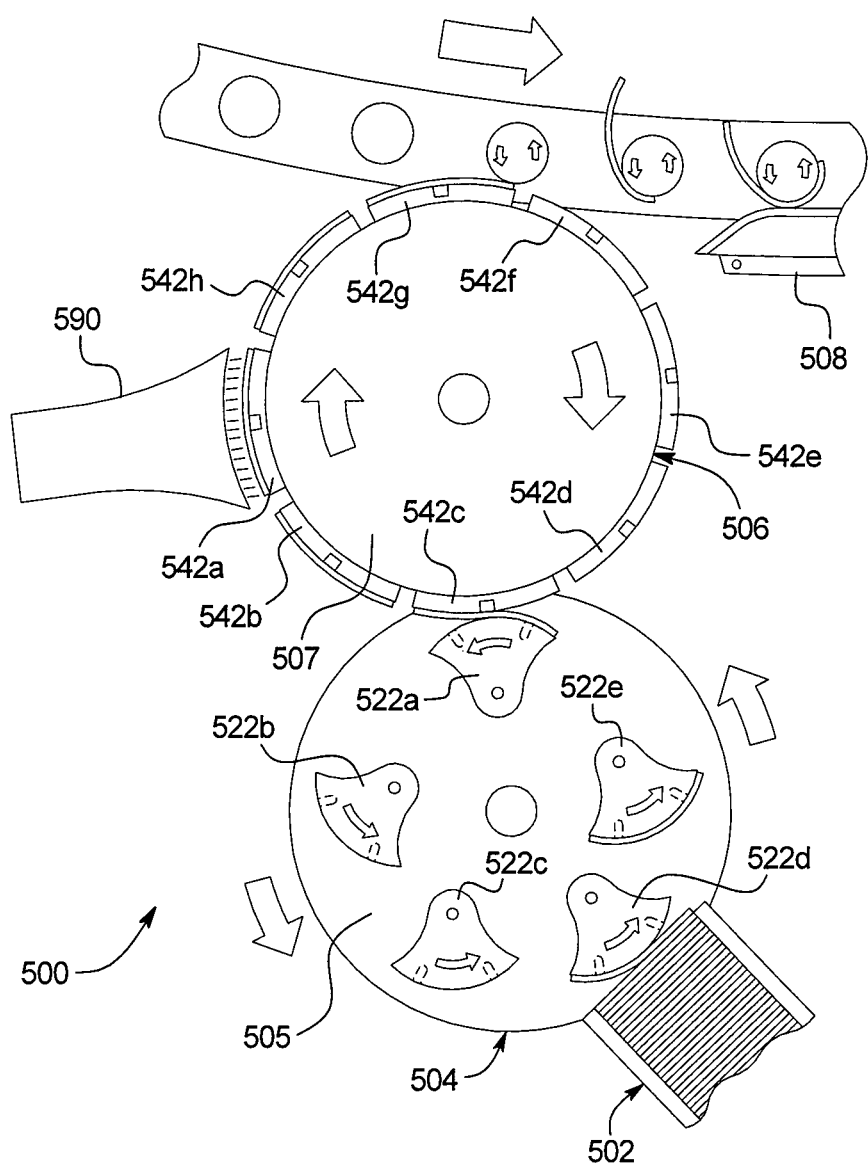
FIG. 30 is a diagrammatic partially fragmentary top plan view of a reinforcing member applicator of an alternative embodiment of the cup reinforcing apparatus disclosed herein.

Turning now to FIG. 30, another embodiment of the reinforcing member applicator of the present disclosure is illustrated. This reinforcing member applicator 500 is similar to the reinforcing member application of FIG. 27, but includes an extra heater. More specifically, reinforcing member applicator 500 includes: (a) a reinforcing member supply holder 502, (b) a first reinforcing member mover 504 which includes a turntable 505 and a plurality of reinforcing member pickers 522a, 522b, 522c, 522d, and 522e, (c) a second reinforcing member mover 506 which includes a turntable 507 and a plurality of reinforcing member holders 542a, 542b, 542c, 542d, 542e, 542f, 542g, and 542h, (d) a first reinforcing member attachment pad 508, (e) a second reinforcing member attachment pad (not shown), and (f) a pre-heater 590. This reinforcing member applicator 500 generally functions like reinforcing member applicator 500, except that the pre-heater 590 pre-heats the leading and trailing portions of the adhesive on the leading and trailing portions of the reinforcing member before the reinforcing member is attached to the cup. In certain embodiments, the entire reinforcing member needs to be pre-heated to prevent the adhesive from cooling and retaining its prior non-activated state too quickly during the attachment process. It should be appreciated that this pre-heating or additional heating step can be performed at different suitable positions or locations during the reinforcing member transfer process.

Figure 31:
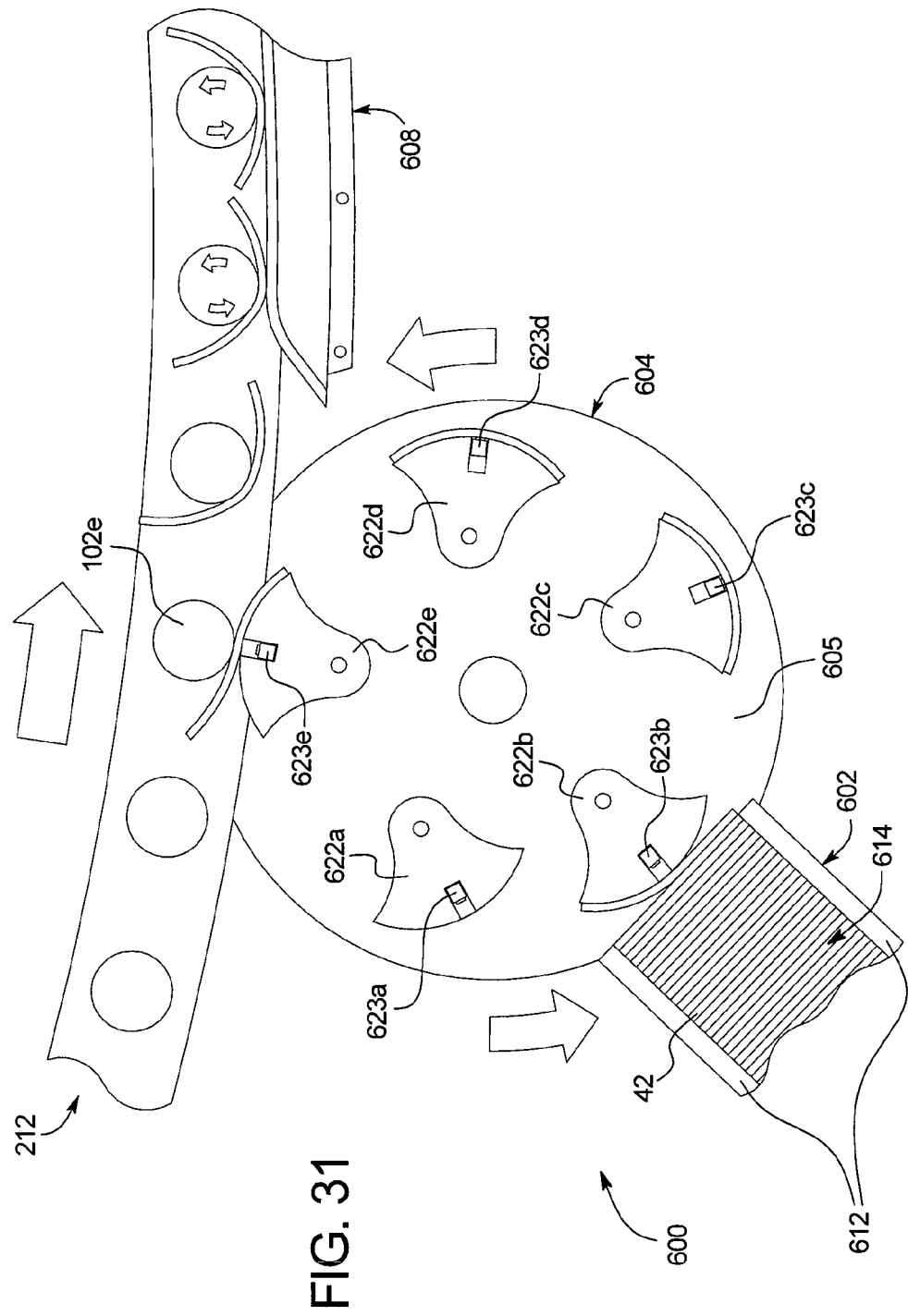
FIG. 31 is a diagrammatic partially fragmentary top plan view of a reinforcing member applicator of another alternative embodiment of the cup reinforcing apparatus disclosed herein.
Figure 36:
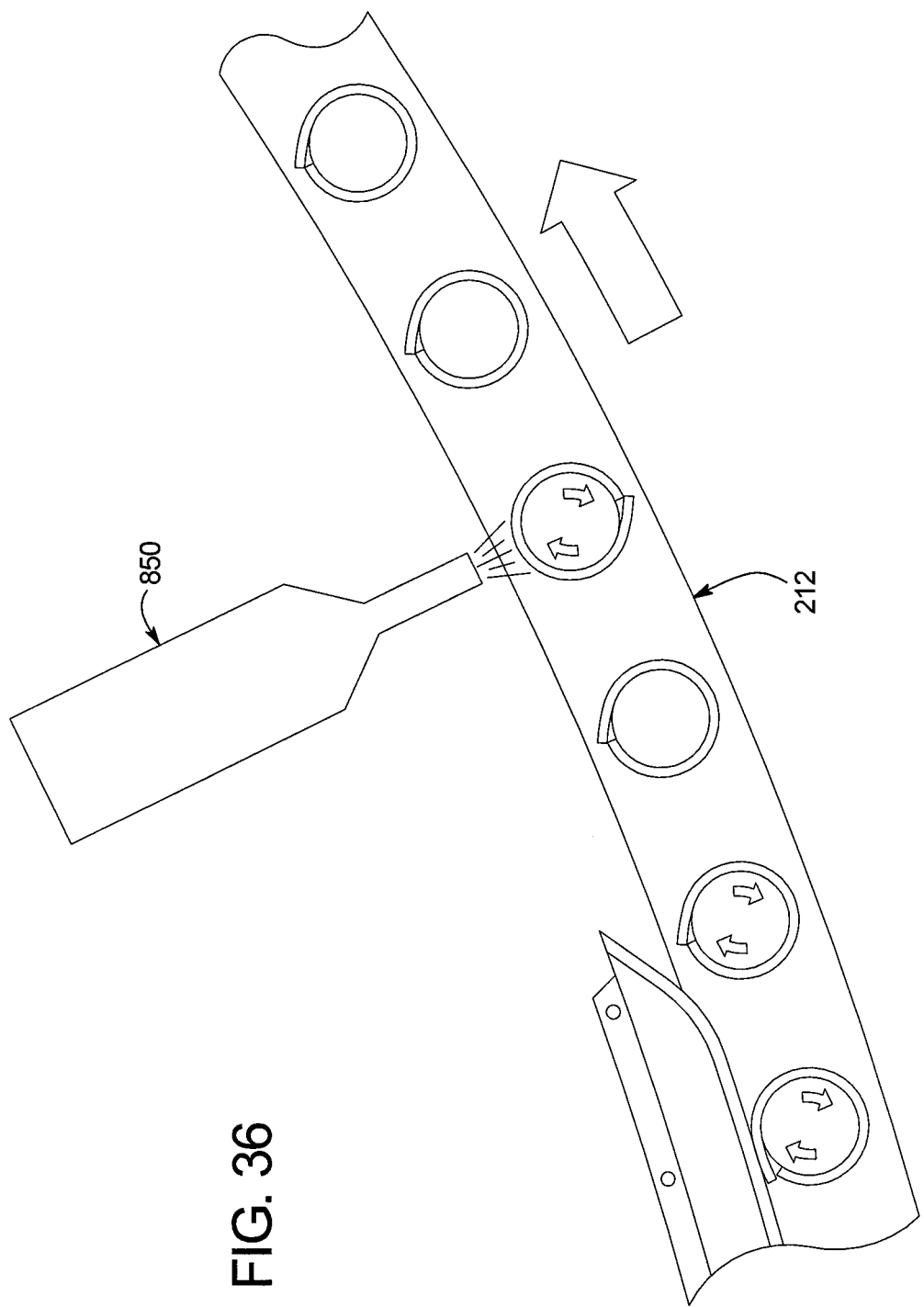
FIG. 36 is a diagrammatic partially fragmentary top plan view of a reinforcing member applicator which includes a hot air knife of another alternative embodiment of the cup reinforcing apparatus disclosed herein.

Turning now to FIGS. 31, 32, and 33, another embodiment of the reinforcing member applicator of the present disclosure is illustrated. In this embodiment, one of the reinforcing member movers is eliminated. This reinforcing member applicator 600 includes: (a) a reinforcing member supply holder 602, (b) a first reinforcing member mover 604 which includes a plurality of reinforcing member pickers 622a, 622b, 622c, 622d, and 622e, (c) a first reinforcing member attachment pad 608 (partially shown), and (d) a second reinforcing member attachment pad (not shown).

The reinforcing member supply holder 602 is configured to hold a plurality of reinforcing members for application to respective cups as described below. Each of the plurality of reinforcing member pickers 622a, 622b, 622c, 622d, and 622e of the reinforcing member mover 604 is configured to: (a) remove one of the reinforcing members from the reinforcing member supply holder 602, (b) heat a central portion of the heat activated adhesive of the reinforcing member it holds, (c) move the reinforcing member it holds into an cup engagement position with one of the cups on the cup mover 212, and (d) transfer the reinforcing member it holds onto that cup such that the reinforcement member is partially attached to the cup, and particularly partially attached to the cup along a central vertical or substantially vertical axis of the reinforcement member. The first reinforcing member attachment pad 608 is configured to heat the heat activated adhesive on the leading and trailing portions of the reinforcing member and co-act with the cup mover 212 to attach those portions to the cup as described above. The second reinforcing member attachment pad (not shown) is also configured to heat the heat activated adhesive on the leading and trailing portions of the reinforcing member and co-act with the cup mover 212 to attach those portions to the cup. It should be appreciated that in this illustrated embodiment, the reinforcing member applicator also applies heat to respective portions of each reinforcing member in multiple different locations and at sequential points in time.

More specifically, in this illustrated embodiment, the reinforcing member supply holder 602 includes a basket 612 which is partially shown and which is configured to hold a stack 614 of a plurality of individual reinforcing members 42. Each reinforcing member 42 includes an outer surface and an inner surface which is covered with a heat activated adhesive as described above. In this embodiment, the reinforcing members in the basket 612 are positioned with their outer or non-adhesive surfaces facing the reinforcing member mover 604 and the pickers 622a, 622b, 622c, 622d, and 622e. It should be appreciated that the basket can be readily refilled and that the basket will include a suitable biasing mechanism (not shown) to maintain the appropriate pressure on the stacked reinforcing members and to facilitate loading of additional reinforcing members on a regular basis. It should also be appreciated that any suitable basket, magazine or other reinforcing member supply holder may be employed in accordance with this embodiment of the present disclosure.

The reinforcing member mover 604 in this illustrated embodiment includes a turntable 605 for the plurality of reinforcing member pickers 622a, 622b, 622c, 622d, and 622e and a suitable drive mechanism (not shown). The drive mechanism is configured to move the turntable and each of the pickers. In this embodiment, the pickers are evenly spaced apart on the top of the turntable 605 and each picker is generally bell shaped and includes an accurate or curved surface for transporting each reinforcing member. In this illustrated embodiment, the turntable 605 is configured to rotate counterclockwise (as indicated by the arrows); however, it should be appreciated that the directions of movement of the entire cup reinforcing apparatus can be reversed and in such case, the turntable 605 would rotate clockwise. Each picker is configure to move into a picking position or location (such as the position of picker 622b) to pick one of the reinforcing members from the basket 612. Each picker is configure to then move into a transfer position or location (such as the position of picker 622e) to transfer the reinforcing member it holds to the respective cup. In this embodiment, the outer or non-adhesive surface of the reinforcing member faces and is held to the front face of the picker.

In one embodiment, the reinforcing member applicator 600 includes a suitable vacuum mechanism (not shown) which is connected to mover 604 and specifically to each of the reinforcing member pickers 622a, 622b, 622c, 622d, and 622e. This enables each picker to lift a reinforcing member form the basket and to transfer it to a respective cup. It should be appreciated that such a vacuum mechanism will cause suction or negative air pressure at the front face of the picker when the picker is lifting the reinforcing member from the basket and when the picker is holding the reinforcing member, but will provide less or no suction or negative air pressure at the front face of the picker when the picker is transferring the reinforcing member to the respective cup.

As illustrated in FIG. 31 and further illustrated in FIGS. 32 and 33, each of the reinforcing member pickers 622a, 622b, 622c, 622d, and 622e respectively includes a heater or heating elements 623a, 623b, 623c, 623d, and 623e. Each heating element of each picker is preferably configured to heat a central vertically or substantially vertically extending portion of the heat activated adhesive on the reinforcing member held by that picker. In this illustrated embodiment, each heating element in moveable to: (a) a reinforcing member engagement or heating position, and (b) a reinforcing member disengagement or non-heating position. Pickers 622c, and 622d in FIG. 31 and the picker 622 in FIG. 32 have the heating elements in the reinforcing member engagement position. Pickers 622a, 622b and 622e in FIG. 31 and the picker 622 in FIG. 33 have the heating elements in the reinforcing member disengagement or non-heating position. When the reinforcing member is in the engagement or heating position it can heat the central portion of reinforcement member and the adhesive thereon prior to attachment to the cup. When the reinforcing member is in the disengagement or non-heating position, it does not heat the reinforcement member and thus does not heat the adhesive thereon. In certain embodiments, this prevents the adhesive in the central portion from being heated above a desired temperature, and additionally to prevent the heating element from heating the cup itself when at the transfer position.

It should be appreciated that the heating element heats the central portion of the outer surface of the reinforcing member (because the outer or non-adhesive surface of the reinforcing member faces and is held to the front face of the picker), and the heat is transferred through the reinforcing member to the heat activated adhesive on respective portion of the inner surface of the reinforcing member. This prevents the heated adhesive from sticking to the picker. Each picker transfers the respective reinforcing member it holds onto a respective cup at the transfer position or location (such as the position of picker 622e) such that the reinforcement member is partially attached to the cup (such as cup 102c), and particularly partially attached to the cup along a central vertical or substantially vertical axis of the reinforcement member.

It should be appreciated that the first reinforcing member mover 404 and the cup turntable 12 are suitably synchronized to facilitate picking of the reinforcing member from the reinforcing member supply and the transfer of the reinforcing member to the cup.

It should be appreciated that in one such embodiment, the picker includes a suitable mechanism (not shown) for causing the reinforcing member to move from the picker to the cup. FIG. 34 generally illustrates one embodiment of a picker 822 which includes air channels (not shown) which direct pressurized air through the picker 822 and to the reinforcing member to cause the reinforcing member to move off (i.e., be blown off) of the picker 822 through a very small gap and onto the cup 102.

Turing now to FIG. 35, an alternative embodiment of the reinforcing member applicator of FIG. 31 is illustrated. This reinforcing member applicator 700 includes: (a) a reinforcing member supply holder 702, (b) a reinforcing member mover 704 which includes a turntable 705 and a plurality of reinforcing member pickers 722a, 722b, 722c, 722d, and 722e, (c) a heater 790, (d) a first reinforcing member attachment pad 708 (partially shown), and (e) a second reinforcing member attachment pad (not shown). In this embodiment, the pickers 722a, 722b, 722c, 722d, and 722e do not include heating elements. Rather, the heater 790 is external to the reinforcing member mover 704. In one embodiment, the heater 790 is configured to heat the central portion of each reinforcing member as the reinforcing member moves by the heater 790 prior to attachment to a cup. In one such embodiment, the heater includes a suitable shutter or other mechanism which prevents heating the adhesive on the entire reinforcing member. In other embodiments, the heater heats the adhesive along the entire reinforcing member to an initial temperature which enables the reinforcing member to be attached to the cup as described above. The adhesive is then subsequently heated to the full bonding temperature or temperature range by the attachment pads. It should be appreciated that this heater may be any suitable heater.

It should be appreciated that various embodiments of the cup reinforcing apparatus of the present disclosure include one or more additional heaters or heating elements such as a hot air knife that co-acts with the reinforcing member applicator to secure the reinforcing members to the cup. In one embodiment generally illustrated in FIG. 36, a hot air knife 850 is positioned adjacent to the cup turntable 212 after the reinforcing member applicator pads. The hot air knife 850 further heats the adhesive on the reinforcing member to the full bond strength range for the adhesive to fully activate the adhesive and to fully secure the reinforcing member to the cup.

Figure 37:
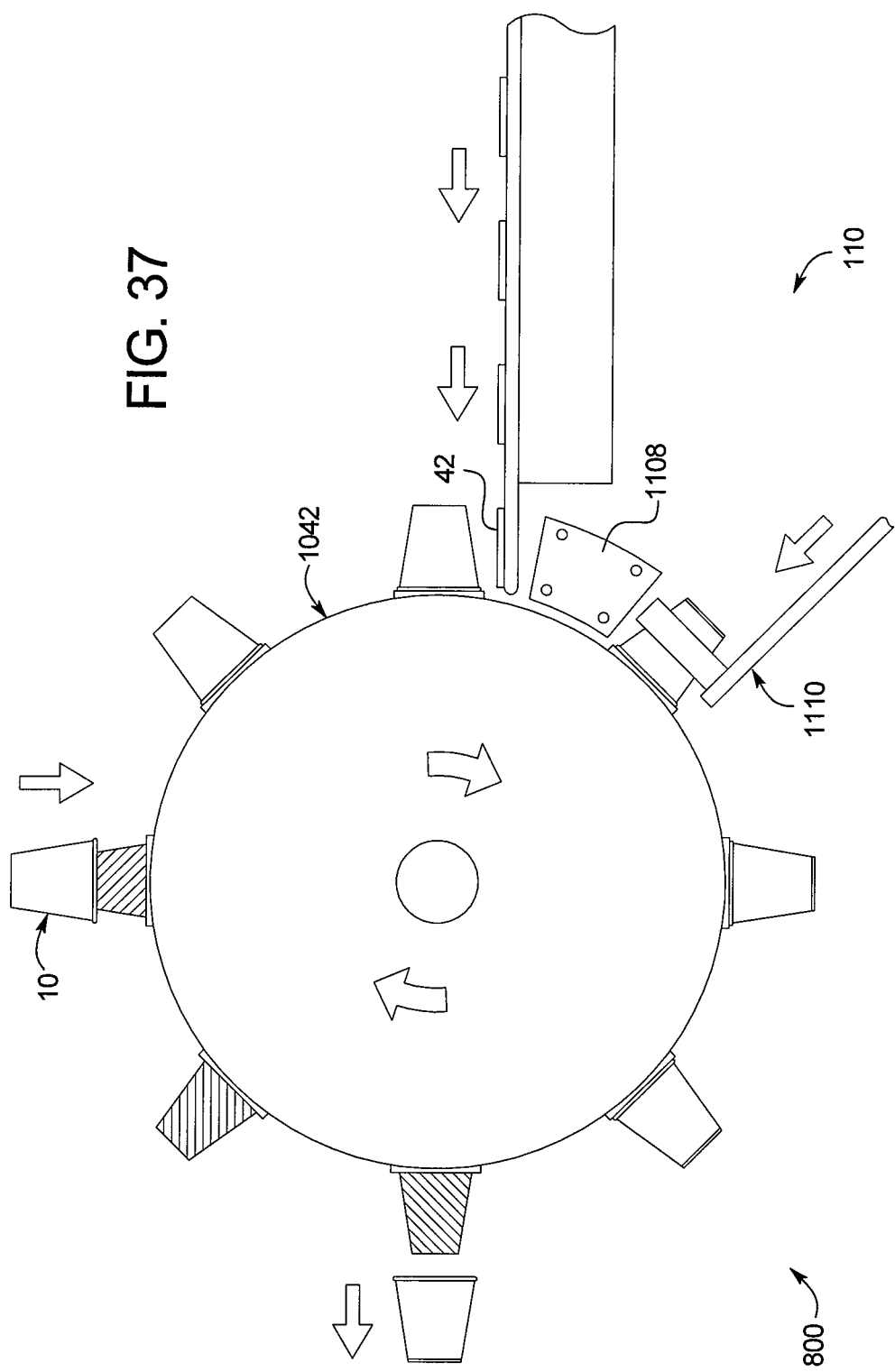
FIG. 37 is a diagrammatic partially fragmentary top plan view of a reinforcing member applicator of another alternative embodiment of the cup reinforcing apparatus disclosed herein.

Turning now to FIG. 37, a substantially different configuration of the cup reinforcing apparatus in accordance with the present disclosure is generally illustrated. In this embodiment, the cup conveyor (not shown) is configured to deposit each cup on a cup turntable 1042 and move each cup 10 into alignment with a reinforcing member 42 held by the reinforcing member applicator 1100. The reinforcing member applicator preheats the central portion of the reinforcing member prior to the cup engaging that reinforcing member. The cup 10 is attached to the reinforcing member 42 along the heated central portion of the reinforcing member. The cup with the attached reinforcing member is then moved through heatable attachment pads to further heat the adhesive on the reinforcing member and to attach the unattached portions of the reinforcing member to the cup. While one attachment pad 1108 is illustrated in FIG. 37, it should be appreciated that the heatable attachment pads on both sides of the cup is preferably employed in this embodiment. These attachment pads remain engaged with the reinforcing member until the adhesive is sufficiently heated or activated to the bond strength range for the adhesive to be fully activated. Additionally, in the illustrated embodiment, movable attachment arms such as attachment arm 1110 is used to ensure that the edges of the reinforcing member are fully attached to the cup on the opposite side of the central portion of the reinforcing member. Thus, it should be appreciated, that in this illustrated embodiment, the reinforcing member applicator applies heat to respective portions of each reinforcing member in multiple different locations and at sequential points in time. It should also be appreciated from this embodiment, that the cup or container transporter and the reinforcing member applicator of the present disclosure be alternatively configured to apply the desired heat at desired positions of the reinforcing member and at desired times.

It should be appreciated that in one embodiment, the cup reinforcing apparatus of the present disclosure utilizes one or more brushes (not shown) to engage the sidewall of each cup or reinforcing member on the cup to enhance the movement of each cup.

It should also be appreciated that the cup reinforcing apparatus of the present disclosure can include one or more sensors (not shown) configured for determining and or verifying the relative locations of the cups and the reinforcing members. The sensors may be any suitable sensor, including but not limited to optical sensors or ultrasonic sensors.

Due to the need to accurately apply the reinforcing members to the respective cups (along the centered vertical axis of the reinforcing member), the processor of the cup reinforcing apparatus may need to check (and adjust if necessary) the relative speeds which the cup turntable and the reinforcing member turntables are moving to insure that the cups moving on the cup turntable and the reinforcing members are moving on the reinforcing member turntable(s) in a coordinated manner such that each reinforcing member comes into contact with the respective cup at the appropriate time and location such that the centered vertical axis of the reinforcing member is applied to the cup on a consistent basis with a range of error of less than plus or minus 0.1 inches.

It should further be appreciated that although the cup reinforcing apparatus is illustrated herein with only one reinforcing member applicator, more than one reinforcing member applicator may be employed in accordance with the present disclosure.

In other embodiments, it should be appreciated that one or more reinforcing member application pads are movable and suitably operable to attach, either sequentially or simultaneously, the leading and trailing portions of the reinforcing member to the side wall of the cup.

In another embodiment, the reinforcing member is initially attached to the sidewall of the cup not along the center portion of the reinforcing member. In this embodiment, the reinforcing member is applied along an off-centered portion of the reinforcing member and the methods described above are suitably modified to compensate for the off-centered attachment. In another embodiment, the reinforcing member is initially attached to the sidewall of the cup along the leading edge of the reinforcing member. Accordingly, it should be appreciated that any suitable method and apparatus operable to target or attach a specific spot or location on the reinforcing member to a specific spot or location on the cup may be utilized in the cup reinforcing apparatus disclosed herein.

As mentioned above, it should be appreciated that the structure of the cup reinforcing apparatus illustrated in FIG. 8 may be suitably reversed. That is, rather than the cup mover 212 rotating in a counter-clockwise direction, the cup mover rotates in a clockwise direction. It should be appreciated that in this embodiment, the individual rotations of each cup holding station would be modified to accommodate for the change in direction of the cup mover. It should also be appreciated that the reinforcing member movers or turntables would move in opposite directions to the directions described above.

It should be appreciated that the methods and apparatus described above may also be utilized to apply a reinforcing member or otherwise suitably wrap any other container (besides a cup), such as a bowl, a bottle, a carton, a dish, a jar, a mug, or a pitcher especially where the container has an angled wall is fragile or flexible. It should be further appreciated that the methods and apparatus described above may also be utilized to apply a reinforcing member or otherwise suitably wrap a non-plastic foam container, such as a paper container or another type of plastic container.

It should be appreciated from the above that various methods of manufacturing a reinforced cup includes: (a) the various steps of positioning the cup; (b) positioning the reinforcing member into an attachment position; (c) heating a central portion of the reinforcing member with one type of heater while positioning the reinforcing member into the attachment position; (d) partially attaching the reinforcing member to cup, along that central portion; and (e) then attaching the leading and trailing portions of the reinforcing member while heating the adhesive on the leading and trailing portions of the reinforcing member. The methods as described above include positioning the cup in an upside-down position and also positioning the reinforcing member adjacent to the cup in an upside-down position and at an angle (offset from a vertical plane) which corresponds with the angle (offset from a vertical plane) of the side wall of the cup. It should be appreciated that in other embodiments, the attachment can be performed with the cup right-side up.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of making a reinforced container, said method comprising:
(a) providing a reinforcing member configured to be attached to a substantial portion of an outer surface of a side wall of a body of a container, said reinforcing member having an inner surface completely coated with a heat activated adhesive;
(b) heating the adhesive at a central portion of the reinforcing member;
(c) attaching the central portion of the reinforcing member to the outer surface of the side wall of the body of the container; and
(d) thereafter,
(i) heating the adhesive on a trailing portion of the reinforcing member and attaching the trailing portion of the reinforcing member to the outer surface of the side wall of the body of the container; and
(ii) heating the adhesive on a leading portion of the reinforcing member and attaching the leading portion of the reinforcing member to the outer surface of the side wall of the body of the container.

2. The method of claim 1, which includes providing the reinforcing member from a stack of reinforcing members.

3. The method of claim 1, which includes heating the adhesive at the central portion of the reinforcing member while moving the reinforcing member from a reinforcing member supply to an attachment position at which the central portion of the reinforcing member is attached to the outer surface of the side wall of the body of the container.

4. The method of claim 1, wherein heating the adhesive at the central portion of the reinforcing member includes heating a central portion of an outer surface of the reinforcing member from a position adjacent the reinforcing member and opposite a portion of the inner surface of the reinforcing member carrying the adhesive.

5. The method of claim 1, which includes simultaneously heating the adhesive on the trailing portion of the reinforcing member while attaching the trailing portion of the reinforcing member to the outer surface of the side wall of the body of the container.

6. The method of claim 1, wherein heating the adhesive on the trailing portion of the reinforcing member includes heating a trailing portion of an outer surface of the reinforcing member from a position adjacent the reinforcing member and opposite a portion of the inner surface of the reinforcing member carrying the adhesive.

7. The method of claim 1, which includes simultaneously heating the adhesive on the leading portion of the reinforcing member while attaching the leading portion of the reinforcing member to the outer surface of the side wall of the body of the container.

8. The method of claim 1, wherein heating the adhesive on the leading portion of the reinforcing member includes heating a leading portion of an outer surface of the reinforcing member from a position adjacent the reinforcing member and opposite a portion of the inner surface of the reinforcing member carrying the adhesive.

9. The method of claim 1, which includes heating the adhesive at the central portion of the reinforcing member with a first type of heater and heating the adhesive on the leading portion and the trailing portion of the reinforcing member with a second different type of heater.

10. The method of claim 1, which includes pre-heating the adhesive on the reinforcing member.

11. The method of claim 1, wherein the container includes a cup.

12. The method of claim 1, wherein the container includes a foam cup.

13. The method of claim 1, wherein the container includes a plastic foam cup.

14. A method of making a reinforced container, said method comprising:
   (a) providing a reinforcing member configured to be attached to a substantial portion of an outer surface of a side wall of a body of a container, said reinforcing member having an inner surface completely or substantially completely coated with a heat activated adhesive;
   (b) heating the adhesive at a central portion of the reinforcing member by heating a central portion of an outer surface of the reinforcing member from a position adjacent the reinforcing member and opposite a portion of the inner surface of the reinforcing member carrying the adhesive;
   (c) thereafter attaching the heated adhesive at the central portion of the reinforcing member to the outer surface of the side wall of the body of the container; and
   (d) thereafter,
      (i) heating the adhesive on a trailing portion of the reinforcing member and attaching the trailing portion of the reinforcing member to the outer surface of the side wall of the body of the container; and
      (ii) heating the adhesive on a leading portion of the reinforcing member and attaching the leading portion of the reinforcing member to the outer surface of the side wall of the body of the container.

15. The method of claim 14, which includes providing the reinforcing member from a stack of reinforcing members.

16. The method of claim 14, which includes heating the adhesive at the central portion of the reinforcing member while moving the reinforcing member from a reinforcing member supply to an attachment position at which the central portion of the reinforcing member is attached to the outer surface of the side wall of the body of the container.

17. The method of claim 14, which includes simultaneously heating the adhesive on the trailing portion of the reinforcing member while attaching the trailing portion of the reinforcing member to the outer surface of the side wall of the body of the container.

18. The method of claim 14 wherein heating the adhesive on the trailing portion of the reinforcing member includes heating a trailing portion of an outer surface of the reinforcing member from a position adjacent the reinforcing member and opposite a portion of the inner surface of the reinforcing member carrying the adhesive.

19. The method of claim 14, which includes simultaneously heating the adhesive on the leading portion of the reinforcing member while attaching the leading portion of the reinforcing member to the outer surface of the side wall of the body of the container.

20. The method of claim 14, wherein heating the adhesive on the leading portion of the reinforcing member includes heating a leading portion of an outer surface of the reinforcing member from a position adjacent the reinforcing member and opposite a portion of the inner surface of the reinforcing member carrying the adhesive.

21. The method of claim 14, which includes heating the adhesive at the central portion of the reinforcing member with a first type of heater and heating the adhesive on the leading portion and the trailing portion of the reinforcing member with a second different type of heater.

22. The method of claim 14, which includes pre-heating the adhesive on the reinforcing member.

23. The method of claim 14, wherein the container includes a cup.

24. The method of claim 14, wherein the container includes a foam cup.

25. The method of claim 14, wherein the container includes a plastic foam cup.

26. A method of making a reinforced container, said method comprising:
   (a) providing a reinforcing member configured to be attached to a substantial portion of an outer surface of a side wall of a body of a container, said reinforcing member having an inner surface completely or substantially completely coated with a heat activated adhesive;
   (b) heating the adhesive at a central portion of the reinforcing member;
   (c) thereafter attaching the heated adhesive at the central portion of the reinforcing member to the outer surface of the side wall of the body of the container;
   (d) thereafter heating the adhesive on a trailing portion of the reinforcing member and attaching the trailing portion of the reinforcing member to the outer surface of the side wall of the body of the container; and
   (e) thereafter heating the adhesive on a leading portion of the reinforcing member and attaching the leading portion of the reinforcing member to the outer surface of the side wall of the body of the container.

27. The method of claim 26, which includes providing the reinforcing member from a stack of reinforcing members.

28. The method of claim 26, which includes heating the adhesive at the central portion of the reinforcing member while moving the reinforcing member from a reinforcing member supply to an attachment position at which the central portion of the reinforcing member is attached to the outer surface of the side wall of the body of the container.

29. The method of claim 26, wherein heating the adhesive at the central portion of the reinforcing member includes heating a central portion of an outer surface of the reinforcing member from a position adjacent the reinforcing member and opposite a portion of the inner surface of the reinforcing member carrying the adhesive.

30. The method of claim 26, which includes simultaneously heating the adhesive on the trailing portion of the reinforcing member while attaching the trailing portion of the reinforcing member to the outer surface of the side wall of the body of the container.

31. The method of claim 26 wherein heating the adhesive on the trailing portion of the reinforcing member includes heating a trailing portion of an outer surface of the reinforcing member from a position adjacent the reinforcing member and opposite a portion of the inner surface of the reinforcing member carrying the adhesive.

32. The method of claim 26, which includes simultaneously heating the adhesive on the leading portion of the reinforcing member while attaching the leading portion of the reinforcing member to the outer surface of the side wall of the body of the container.

33. The method of claim 26, wherein heating the adhesive on the leading portion of the reinforcing member includes heating a leading portion of an outer surface of the reinforcing member from a position adjacent the reinforcing member and opposite a portion of the inner surface of the reinforcing member carrying the adhesive.

34. The method of claim 26, which includes heating the adhesive at the central portion of the reinforcing member with a first type of heater and heating the adhesive on the leading portion and the trailing portion of the reinforcing member with a second different type of heater.

35. The method of claim 26, which includes pre-heating the adhesive on the reinforcing member.

36. The method of claim 26, wherein the container includes a cup.

37. The method of claim 26, wherein the container includes a foam cup.

38. The method of claim 26, wherein the container includes a plastic foam cup.

\* \* \* \* \*